US005469281A

United States Patent [19]

Katakura et al.

[11] Patent Number: 5,469,281

[45] Date of Patent: Nov. 21, 1995

[54] DRIVING METHOD FOR LIQUID CRYSTAL DEVICE WHICH IS NOT AFFECTED BY A THRESHOLD CHARACTERISTIC CHANGE

[75] Inventors: Kazunori Katakura, Atsugi; Shinjiro Okada, Isehara; Yutaka Inaba, Kawaguchi, all of Japan

[73] Assignee: Canon Kabushiki Kaisha, Tokyo, Japan

[21] Appl. No.: 111,509

[22] Filed: Aug. 24, 1993

[30] Foreign Application Priority Data

| | | | |
|---|---|---|---|
| Aug. 24, 1992 | [JP] | Japan | 4-246021 |
| Aug. 24, 1992 | [JP] | Japan | 4-246022 |
| Aug. 24, 1992 | [JP] | Japan | 4-246023 |
| Aug. 24, 1992 | [JP] | Japan | 4-246027 |

[51] Int. Cl.$^6$ .... G02F 1/1343

[52] U.S. Cl. .... 359/56; 345/97

[58] Field of Search .... 359/56; 345/97, 345/101

[56] References Cited

U.S. PATENT DOCUMENTS

| | | | |
|---|---|---|---|
| 4,712,877 | 12/1987 | Okada et al. | 350/350 S |
| 4,763,994 | 8/1988 | Kaneko et al. | 350/336 |
| 4,765,720 | 8/1988 | Toyono et al. | 350/350 S |
| 4,796,980 | 1/1989 | Kaneko et al. | 350/350 |
| 4,836,656 | 6/1989 | Mouri et al. | 350/350 |
| 4,932,759 | 6/1990 | Toyono et al. | 350/350 |
| 4,958,912 | 9/1990 | Inaba et al. | 350/333 |
| 5,061,044 | 10/1991 | Matsunaga | 359/75 |
| 5,132,818 | 7/1992 | Mouri et al. | 359/56 |
| 5,136,282 | 8/1992 | Inaba et al. | 340/784 |
| 5,225,919 | 7/1993 | Nakao et al. | 359/54 |
| 5,317,437 | 5/1994 | Katakura | 359/87 |

FOREIGN PATENT DOCUMENTS

| | | | |
|---|---|---|---|
| 0453856 | 10/1991 | European Pat. Off. | 345/97 |
| 2637407 | 4/1990 | France | 345/97 |
| 62-133426 | 6/1987 | Japan . | |

OTHER PUBLICATIONS

Takeda et al., "Molecular Crystals and Liquid Crystals," vol. 94 No. 1 and 2, pp. 213–233 (1983).

*Primary Examiner*—Anita Pellman Gross
*Assistant Examiner*—Charles Miller
*Attorney, Agent, or Firm*—Fitzpatrick, Cella, Harper & Scinto

[57] ABSTRACT

A liquid crystal device of the type including pixels, comprises a liquid crystal having a first and a second stable state, and which is stably driven for gradation display regardless of a change in threshold characteristic due to a temperature change, etc. The driving method includes the steps of: providing a pixel showing a transmittance (Ts) smaller than a prescribed transmittance (Tm), resetting the pixel to the first stable state and then applying at least two signals of alternating polarities to the pixel to obtain the transmittance (Ts); and providing a pixel showing a transmittance (T1) larger than the prescribed transmittance (Tm), resetting the pixel to the second stable state and then applying at least two signals of alternating polarities to the pixel to obtain the transmittance (T1).

11 Claims, 38 Drawing Sheets

DRIVING METHOD FOR LIQUID CRYSTAL DEVICE WHICH IS NOT AFFECTED BY A THRESHOLD CHARACTERISTIC CHANGE

FIELD OF THE INVENTION AND RELATED ART

The present invention relates to a display method for a liquid crystal device for use in a display apparatus, such as a television receiver, a computer terminal, a video camera view finder, etc., or a light valve for a liquid crystal printer, a projection apparatus, etc.

The methods of optical transmittance control, particularly analog optical transmittance control as used in gradation display, etc., may be representatively classified into a type of controlling transmittance of a pixel as a whole, and a type of controlling an areal ratio between a transmissive region and a non-transmissive region within a pixel.

A method of the type of controlling a pixel as a whole is adopted in a liquid crystal device of the well-known active matrix-type display using a TFT (thin film transistor) as a pixel switch.

On the other hand, a method of the type of controlling an areal ratio of the transmissive region and the non-transmissive region within a pixel is described in detail in U.S. Pat. No. 4,796,980 entitled "FERROELECTRIC LIQUID CRYSTAL OPTICAL MODULATION DEVICE WITH REGIONS WITHIN PIXELS TO INITIATE NUCLEATION AND INVERSION" and issued to Kaneko et al. This method may be applied to a liquid crystal device using a liquid crystal material such as a twisted nematic liquid crystal (TN-LC) or a ferroelectric liquid crystal (FLC). A known display device using FLC may be constituted by disposing and fixing a pair of opposing glass plats each provided on an inner surface with transparent electrodes and an aligning treatment so as to retain a cell gap on the order of 1–3 μm, thus forming a cell, and filling the cell with a ferroelectric liquid crystal.

In the display device using FLC, since an FLC molecule has a spontaneous polarization, a force of coupling between an external electric field and the spontaneous polarization can be utilized for switching, and the switching can be performed by the polarity of the external electric field because the longer axis direction of an FLC molecule corresponds to the direction of the spontaneous polarization in a one-to-one relationship.

The ferroelectric liquid crystal is generally used in a chiral smectic phase (SmC* SmH*) and therefore the liquid crystal molecular long axes form helixes in a bulk state. However, if the ferroelectric liquid crystal is enclosed within a cell having a cell gap on the order of 1–3 μm as described above, the helixes of liquid crystal molecular long axes are released (N. A. Clark, et al., MCLC, 1983, Vol. 94, pp. 213–214).

A ferroelectric liquid crystal cell has been constituted by using simple matrix electrode substrates 111, e.g., as shown in FIGS. 1A (sectional view) and 1B (a plan view of one matrix electrode substrate). Referring to these figures, the cell includes a pair of oppositely disposed glass plates 112, each having an inner surface provided with stripe electrodes 113 of ITO (indium tin oxide), an insulating film of $SiO_2$, and an alignment film 114 of polyimide. The cell is constituted by disposing a liquid crystal 116 between the substrates 111 and scaling the periphery of the substrates with a sealing member 115 of, e.g., an epoxy resin.

The ferroelectric liquid crystal has been principally used for a display device providing binary (white and black) display states formed by light-transmissive and light-interrupting states based on two stable states but can provide multiple display states including halftone states. One of the halftone display methods is the above-mentioned method wherein an intermediate light-transmissive state by controlling the areal proportion of a transmissive region. Hereinbelow, this method (area modulation method) will be described in some detail.

FIG. 2 is a graph schematically illustrating a relationship between a switching pulse amplitude (V) and a transmittance (T) of a ferroelectric liquid crystal pixel, i.e., plots of transmittances (T) shown by a pixel when the pixel initially placed in a completely light-interrupting (black) state (as shown at FIG. 3(*a*)) is supplied with single pulses of varying amplitudes (V) and a constant width. If the pulse amplitude V is below a threshold Vth (V<Vth), the transmittance T does not change, and the resultant pixel state is as shown at FIG. 3(*b*) which is not different from FIG. 3(*a*) prior to the pulse application. If the pulse amplitude V exceeds the threshold (Vth<V<Vsat), a portion within a pixel is transformed into the other stable state (i.e., a light-transmissive state) as shown in FIG. 3(*c*), thus showing an intermediate transmittance. If the pulse amplitude is further increased to exceed a saturation voltage Vsat (Vsat< V), the whole pixel is placed in the light-transmissive state so that the transmittance becomes constant.

In this way, in the area modulation method, the pulse amplitude V is controlled to satisfy Vth<V <Vsat, thereby displaying a halftone level.

The area modulation method however involves a technical problem to be solved as will be described below. That is, the voltage-transmittance relationship depends on the cell thickness (a gap between a pair of substrates) and the temperature, so that different gradation levels are displayed in response to an identical voltage amplitude if a display panel includes a cell thickness distribution or a temperature distribution. This is illustrated in FIG. 4 which is a graph showing a relationship between voltage amplitude V and transmittance T similarly as FIG. 2 but includes two curves showing relationships at different temperatures, i.e., a curve H showing a relationship at a higher temperature and curve L showing a relationship at a lower temperature. In case of a display panel of a large size, it is not very unusual that a temperature distribution is present over the panel area. As a result, even if a voltage Vap is applied to display a certain halftone level, the halftone level actually fluctuates in the range of $T_1$ to $T_2$, so that it is difficult to effect a uniform display. A ferroelectric liquid crystal generally shows a switching voltage which is high at a low temperature and low at a high temperature, and the difference in switching voltage is generally larger by far than a conventional TN-liquid crystal as it depends on the temperature-dependence of liquid crystal viscosity. Accordingly, the fluctuation in gradation level due to a temperature distribution is by far larger than in the case of TN-liquid crystal, and this is the greatest factor of difficulty in realizing the gradational display by a ferroelectric liquid crystal device.

Further, the fluctuation in voltage (V)—transmittance (T) characteristic is promoted if the panel size is enlarged, because the fluctuations in cell thickness and temperature are liable to be increased. Accordingly, it has been considered very difficult to effect an analog gradation display by a large-sized FLC panel.

Further, if a portion of poor linearity (non-linear portion) as enclosed by a dashed line circle CC is present, the compensation for temperature and/or cell thickness fluctuation cannot be accurately effected in some cases.

SUMMARY OF THE INVENTION

In view of the above-mentioned technical problems, a principal object of the present invention is to provide a driving method for a liquid crystal device which is not readily affected by a threshold change even if caused due to a temperature distribution, a cell thickness distribution, etc., of the liquid crystal device.

Another object of the present invention is to provide a driving method for a liquid crystal device capable of effecting a halftone display with a good reproducibility even if there is a non-linear portion in voltage-transmittance characteristic.

According to the present invention, there is provided a driving method for a liquid crystal device of the type including pixels comprising a liquid crystal showing a first and a second stable state, comprising the steps of:

for providing a pixel showing a transmittance (Ts) smaller than a prescribed transmittance (Tm), resetting the pixel to the first stable state and then applying at least two signals of alternating polarities to the pixel to obtain the transmittance (Ts), and for providing a pixel showing a transmittance (Tl) larger than the prescribed transmittance (Tm), resetting the pixel to the second stable state and then applying at least two signals of alternating polarities to the pixel to obtain the transmittance (Tl).

According to another aspect of the present invention, there is provided a driving method for a liquid crystal device of the type including pixels comprising a liquid crystal having a first and a second stable state, comprising the steps of:

(A) providing a pixel having a transmittance (Ts) smaller than a prescribed transmittance (Tm), and sequentially applying to the pixel:

a first signal of a first polarity for resetting to the first stable state, a second signal of a second polarity for inverting to the second stable state, a third signal of the first polarity for inverting to the first stable state, and a fourth signal of the second polarity not causing inversion, and (B) providing a pixel showing a transmittance (Tl) larger than the prescribed transmittance (Tm), and sequentially applying to the pixel:

a first signal of the first polarity for resetting to the first stable state, a second signal of the second polarity for resetting to the second stable state, a third signal of the first polarity for inverting to the first stable state, and a fourth signal of the second polarity for inverting to the second stable state.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

In the present invention, a pixel showing a desired medium transmittance (Te or Ts) may be formed in the following manner. In order to obtain a medium transmittance (Tl) which is larger than a prescribed medium transmittance (Tm), a pixel concerned is once reset to one stable state and then written and rewritten (compensated)-to obtain the desired transmittance (Tl; Tm<Tl<100). On the other hand, in order to obtain a medium transmittance (Ts) which is smaller than the prescribed medium transmittance, a pixel concerned is once reset to the other stable state and then written and rewritten (compensated) to obtain the desired transmittance (Ts; Ts<Tm<100). In other words, depending on whether the desired medium transmittance is larger or smaller than a prescribed value (Tm), a pixel concerned is reset to one or the other of two reset states. Incidentally, in case where the prescribed medium transmittance (Tm) per se is desired, a pixel concerned can be reset to either one of the two reset states.

Hereinbelow, a liquid crystal device having pixels each having a continuous threshold gradient in one direction within one pixel is taken as an example for convenience of explanation.

Figure 1A:
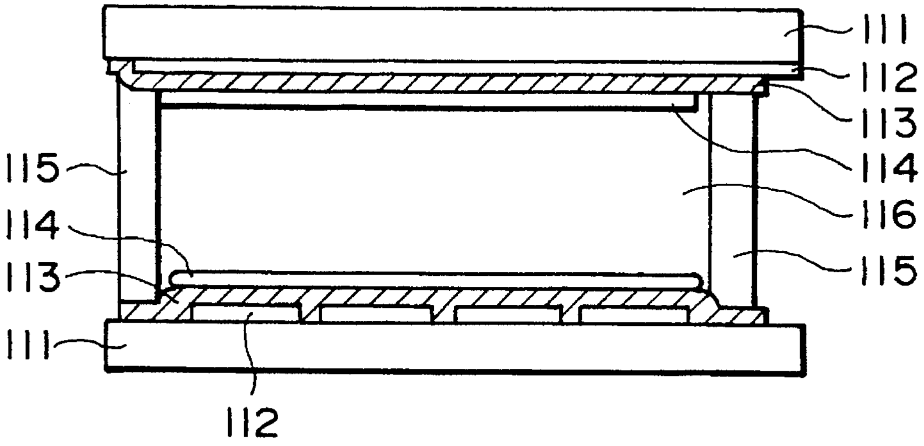
FIG. 1A is a schematic sectional view of a liquid crystal device.
Figure 1B:
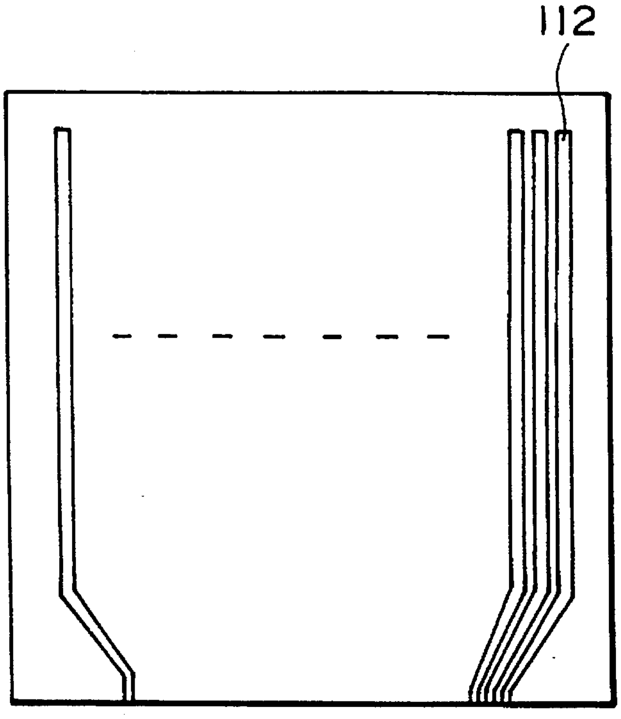
FIG. 1B is a plan view showing an electrode pattern on a substrate.
Figure 2:
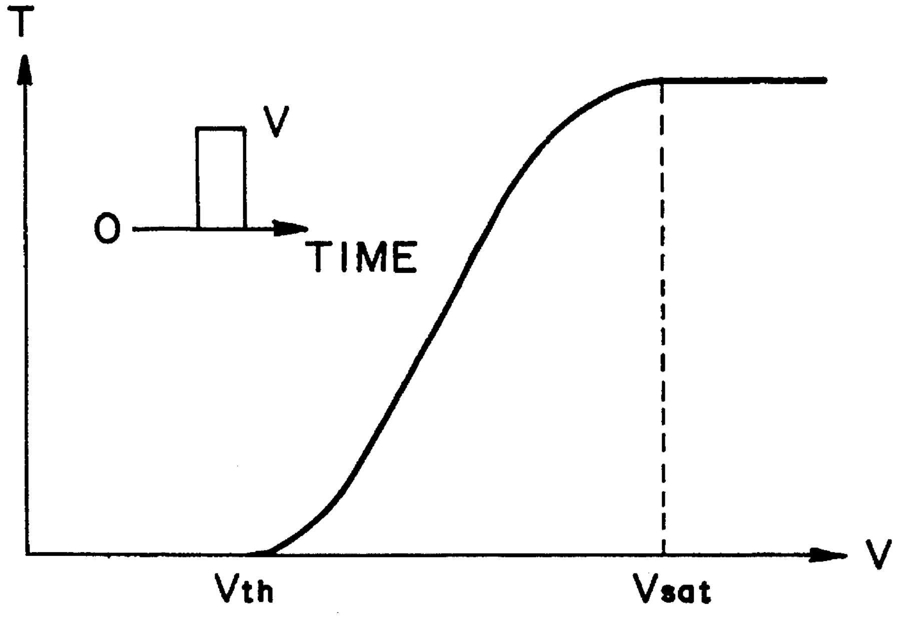
FIG. 2 is a graph showing an applied voltage—transmittance characteristic (V-T characteristic).
Figure 3:
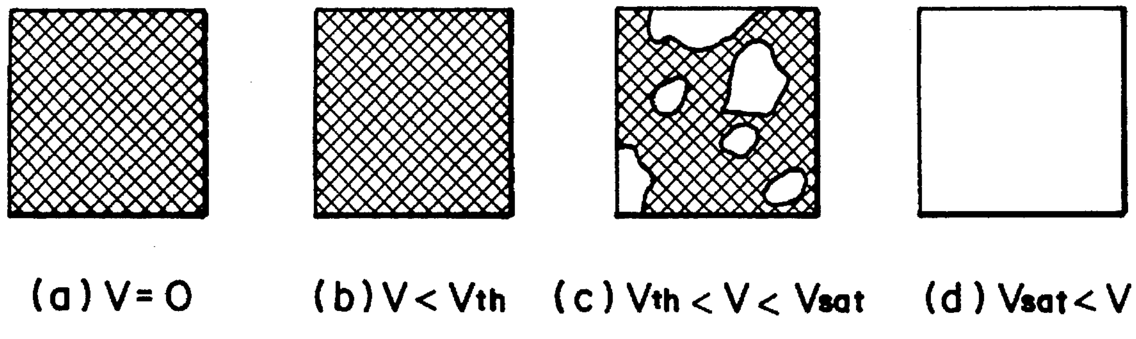
FIG. 3 is a set of plan views showing different pixel states according to the area modulation method.
Figure 4:
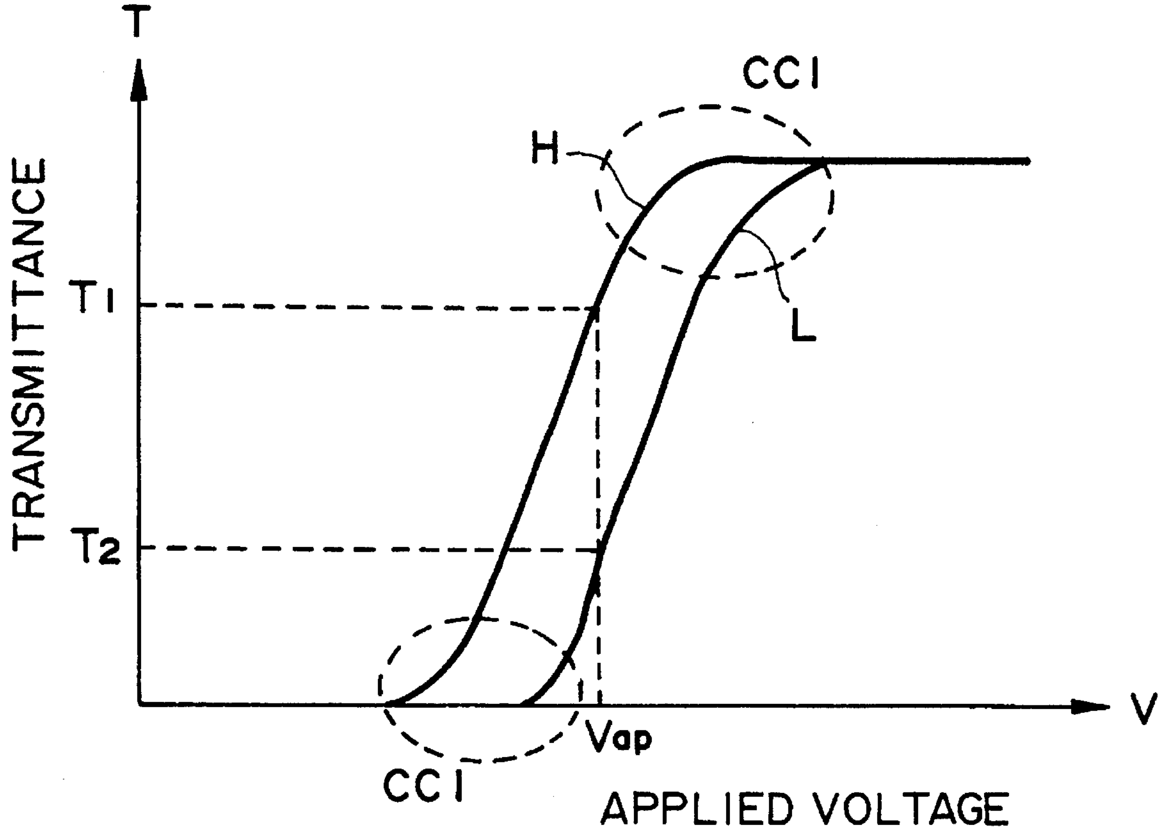
FIGS. 4 and 5 are respective graphs showing V-T characteristics.
Figure 5:
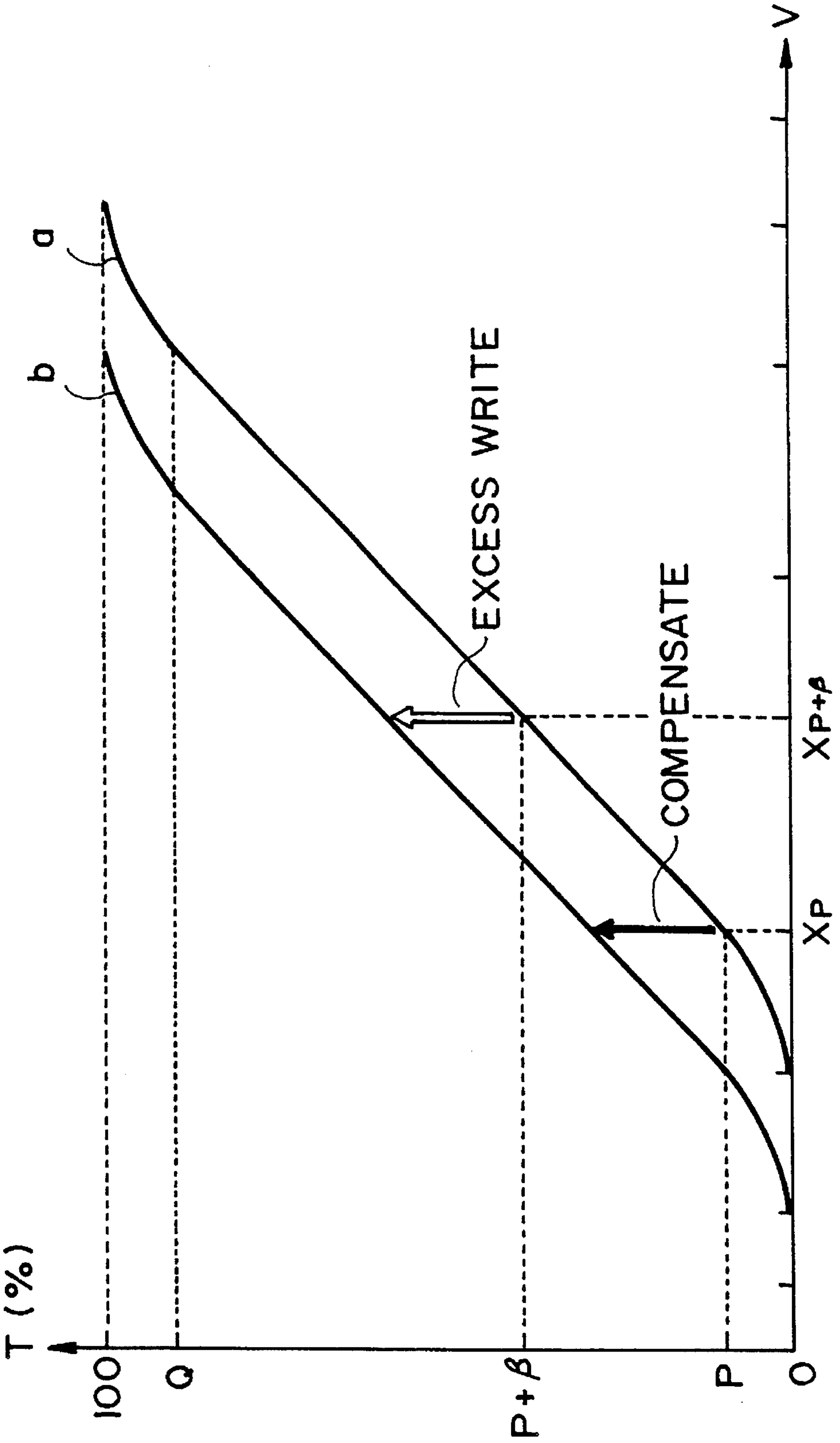
Figure 6:
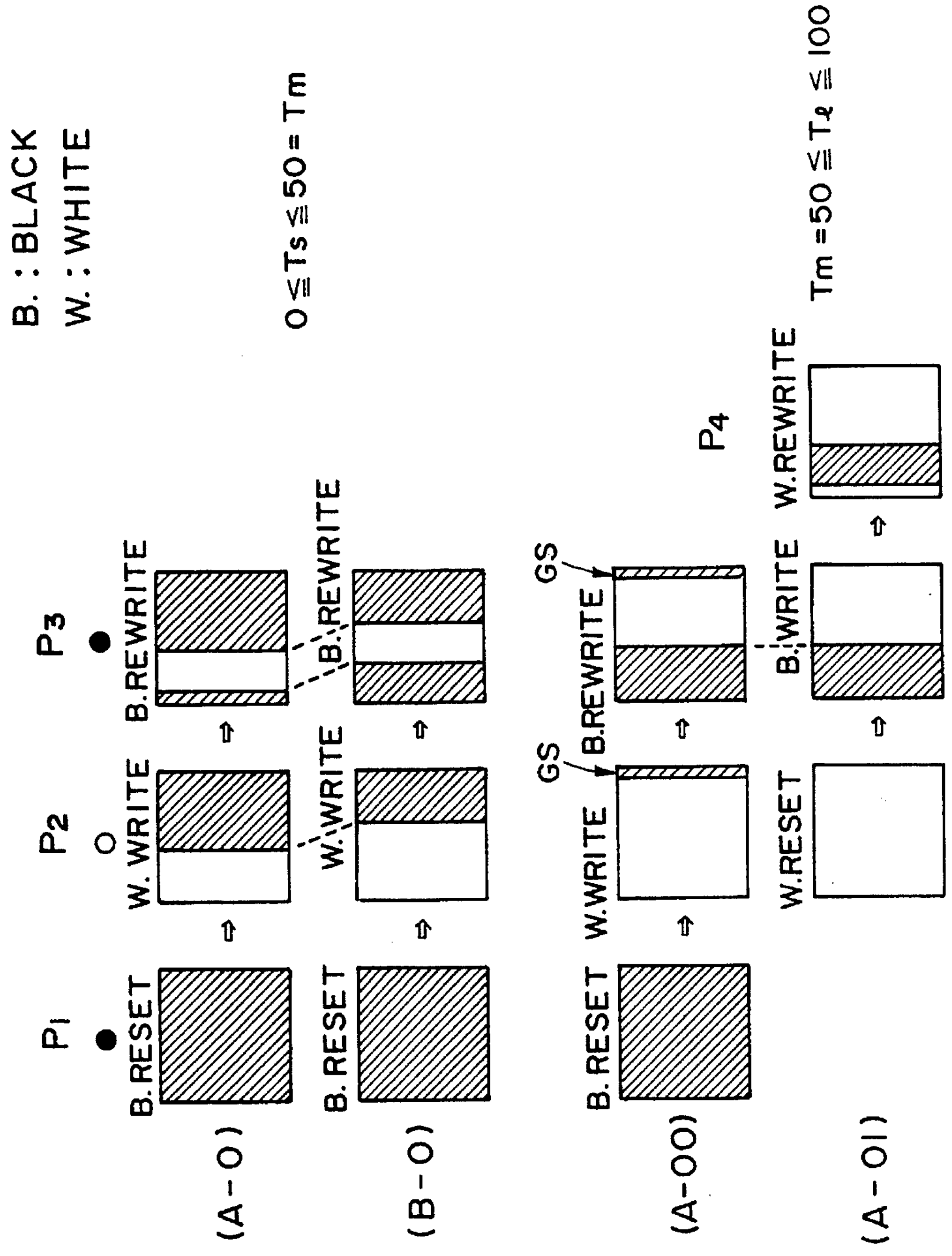
FIG. 6 is a set of plan views showing pixel states for halftone display according to the invention.

FIG. 5 is a graph showing an applied voltage (V)—transmittance (T) characteristic and FIG. 6 is a set of plan views each showing a state of inversion in a pixel, respectively, presented for description of a basic technical concept. FIG. 6 shows pixels each having a structure providing a threshold which gradually increases from the left side toward the right side. As shown in FIG. 5, the V-T characteristic is non-linear below a transmittance P% and above a transmittance Q%.

Further, as the temperature increases, the V-T characteristic is shifted from a curve a toward a curve h due to temperature-dependence of the inversion threshold. Accordingly, taking a fluctuation in transmittance into consideration, at least two signals are applied to a pixel in a reset state so as to provide a desired transmittance.

As shown at (A-O) of FIG. 6, a pixel once reset to a black state as one stable state is supplied with a signal P2 which is designed to provide an excessive transmittance in addition to a desired transmittance to be partly but excessively written in a white state as the other stable state. The thus-written pixel is excessively white, so that the excessive portion is changed to a black state by applying a signal P3 for rewriting (compensation). If a desired transmittance is written by application of at least two signals in this way, the resultant transmittance is not affected by a change in threshold value, e.g., due to a temperature change. This is further explained with reference to pixel states at (B-O) in FIG. 6.

The pixel states at (B-O) are presented for illustrating a writing in case where the V-T characteristic is shifted to a curve b in FIG. 5. More specifically, a pixel excessively written into white by the shift owing to application of a signal P2 is then written excessively into black by the shift owing to subsequent application of a signal P3, whereby the pixel is finally written in a proportion of white (transmittance) identical to that obtained in the case of (A-O) according to the V-T characteristic curve a.

If the V-T characteristic of a liquid crystal device is approximately linear in the while transmittance range of 0–100%, a sufficient compensation for a change in threshold can be effected by a two-step writing scheme as described above.

However, the actual V-T characteristic is not linear in the transmittance regions of O–P% and Q-100%, so that an accurate compensation cannot be effected in the case of obtaining a transmittance (Tl) larger than a medium value of transmittance (Tm) in a linear region.

For example, as shown at (A-00), even if writing of a wholly white state is desired by application of a signal P2, a portion GS failing to assume white actually remains due to the presence of a non-linear region of Q-100%. As a result, after rewriting (compensation) into black by application of P3, the portion GS remains to provide a transmittance which is smaller than the objective value.

Accordingly, in such a case, in the present invention, a pixel is reset into a white state instead of a black state as shown at (A01), then written into a black state by application of a signal B3 and then partially rewritten (compensated) into a white state by application of a signal P4. In this way, it is not necessary to write or rewrite into a non-linear region of transmittance by any of signals P2–P4, so that a medium transmittance can be obtained accurately.

In the above example, Tm is taken at 50%, but the Tm may be any value in a linear region. For example, if the linear region is 20–100%. Tm may appropriately be 60%, and if the linear region is 0–80%, Tm may appropriately be 40%.

The liquid crystal device used in the present invention may suitably have a unit pixel structure providing a V-T characteristic showing a linear region which may preferably be at least 50% between a maximum transmittance and a minimum transmittance in the linear region.

Figure 7:
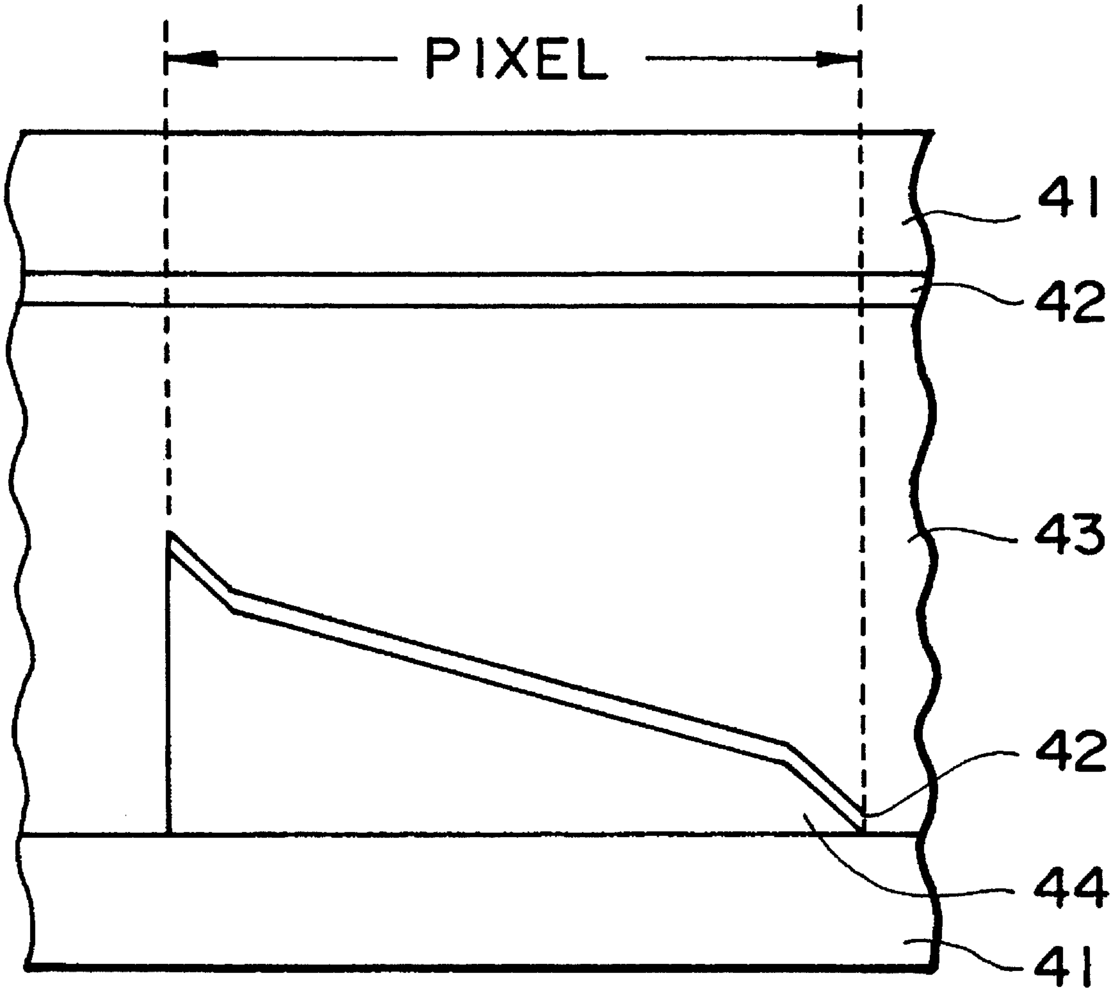
FIG. 7 is a sectional view of an example of one pixel of a liquid crystal device used in the present invention.

A preferred example of such a cell structure is one having a cell thickness gradient as shown in FIG. 7 but may also be a type wherein an applied electric field is caused to have a gradient or a type provided with a linear V-T characteristic by regulation of an alignment control force as described in the above-mentioned U.S. Pat. No. 4,796,980.

Referring to FIG. 7, the unit pixel is constituted by a pair of glass substrates 41, each coated with a transparent electrode 42, and a liquid crystal 43 disposed between the substrates is provided with a varying thickness due to a varying thickness of a UV-cured resin layer 44 formed on one substrate.

Figure 9:
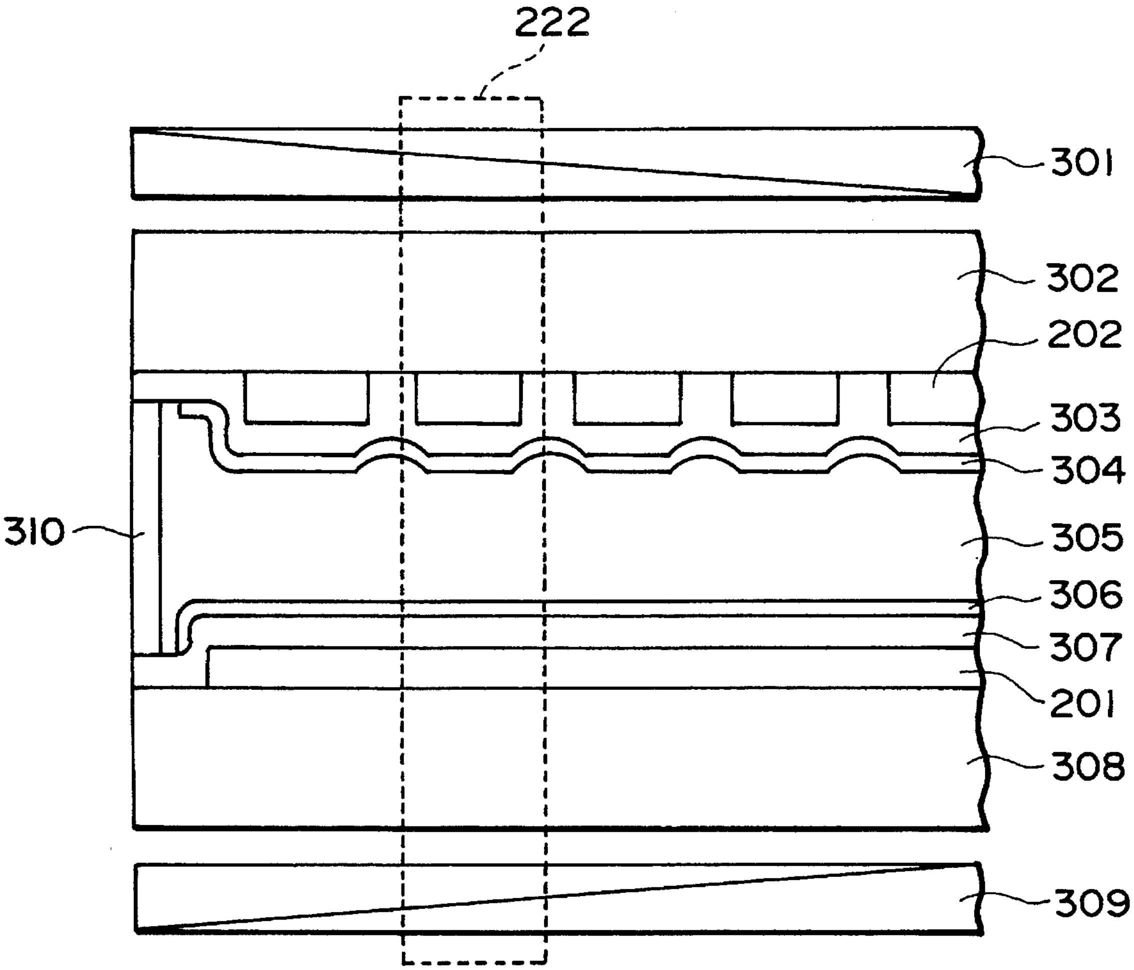
FIG. 9 is a schematic sectional view of a liquid crystal display device used in the invention.

The liquid crystal to be used in the present invention may be one assuming two stable states, which may suitably be a ferroelectric liquid crystal. A particularly suitable ferroelectric liquid crystal may be a multi-component liquid crystal composition containing a phenylbenzoate type liquid crystal as a principal constituent. A suitable liquid crystal device may be formed by injecting such a liquid crystal in its isotropic phase between substrates as shown in FIG. 7 or FIG. 9, followed by cooling into smectic C phase and voltage application to provide a good alignment state.

In case of using a liquid crystal device including two-dimensionally arranged pixels formed by matrix electrodes, a desired transmittance is obtained by a combination of a signal applied to a scanning electrode and a signal applied to a data electrode, so that the transmittance of pixels having a common scanning electrode or a common data electrode must be considered.

Accordingly, there are described hereinbelow specific embodiments of a driving method whereby adverse effects of crosstalk are obviated while effecting switching of reset states as described above.

In the following description, a first stable state is assumed to be a black state (black display) and a second stable state is assumed to be a white state (white display) for convenience of description, but it will be apparent that the same function and effect are accomplished by reverse correspondences.

First Embodiment

According to a first embodiment of the present invention, a liquid crystal apparatus includes a display unit comprising a ferroelectric liquid crystal sandwiched between a pair of oppositely disposed electrode substrates so as to form a plurality of pixels is driven for gradation display by at least four steps of writing by application of sequentially polarity-inverted pulses, wherein each pixel is selectively subjected depending on given gradation data to either one of a first gradation display sequence including sequential application of a pulse for resetting to a first stable state, a writing pulse, a compensation pulse and a pulse not associated with display, and a second gradation display sequence including sequential application of a pulse for resetting to a first stable state, a pulse for resetting to a second stable state, a writing pulse and a compensation pulse.

Among the four steps of writing pulses, the second to fourth writing pulses may preferably be applied non-continuously, optionally with a spacing of at least 100 μs.

In the first gradation display sequence, pixels in a black-reset state are first supplied with signals corresponding to objective gradation display levels based on a pixel having the highest threshold and then supplied with a signal for compensating objective gradation displays at pixels having a lower threshold due to a shift in threshold characteristic, thereby correcting display irregularity. On the other hand, in the second gradation display sequence, pixels are sequentially subjected to black-resetting and white-resetting, and then written based on a pixel having the highest threshold and then compensated for pixels having lower thresholds. Accordingly, four steps of signal application are required and, in the first gradation display sequence, a small value-signal not affecting the display is applied in the fourth step.

Whether a particular pixel is subjected to the first gradation display sequence or the second gradation display sequence is determined depending on the objective gradation display level of the pixel, i.e., it is preferred that the first gradation display sequence is adopted for a pixel expected to display a level comprising 50–100% of the first stable state and the second gradation display sequence is adopted for a pixel expected to display a level comprising 50–100% of the second stable state. A pixel expected to display 50% each of the first and second stable states may be subjected to either the first or second gradation display sequence.

According to the above embodiment of the present invention, gradation display can be effected while compensating for fluctuation in threshold characteristic.

Figure 11:
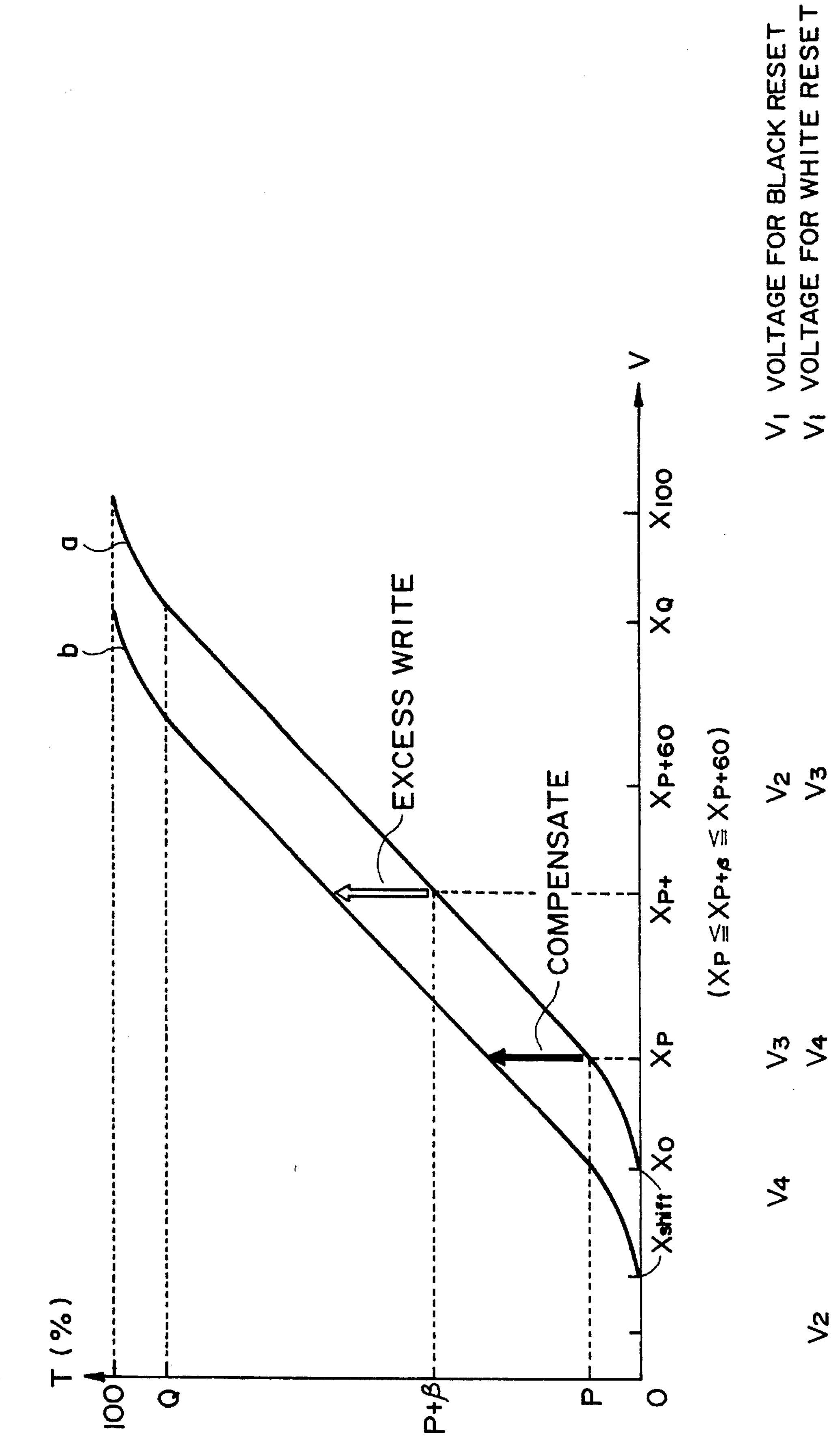
FIG. 11 is a graph showing a V-T characteristic of a liquid crystal device used in a first embodiment of the invention.

With reference to FIG. 11, pixels A and B having different V-T characteristics represented by curves a and b, respectively, which are linear within the transmittance region P–Q%, are taken as exemplary. The pixel A has a threshold voltage $X_O$, and $X_p$, $X_{P+\beta}$ and $X_Q$ represent voltages for writing P%, P+β% and Q%, respectively, in the pixel A. $X_{100}$ denotes the saturation voltage of the pixel A. The transmittance is assumed to be 0% in a wholly black state and 100% in a wholly white state of a pixel.

Figure 12:
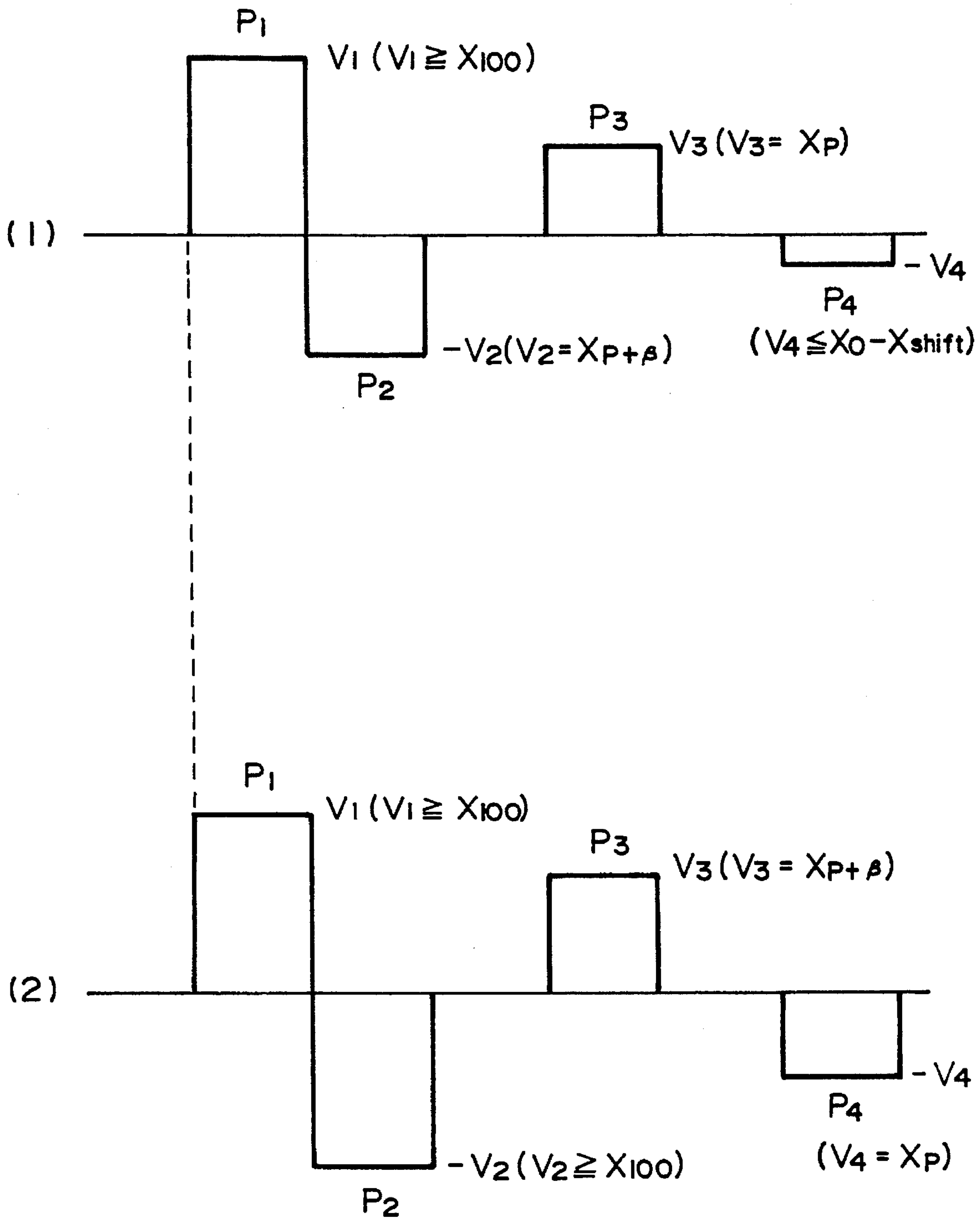
FIG. 12 is a waveform diagram showing drive signals used in the first embodiment of the invention.

In case where an objective transmittance α% is $0 \leqq \alpha \leqq 50$, β is taken as equal to α and a waveform of (1) in FIG. 12 is applied. On the other hand, in case where $50 \leqq \alpha \leqq 100$, β is taken as equal to 100-α and a waveform at (2) in FIG. 12 is applied.

The case of $0 \leqq \alpha \leqq 50$ is first described.

Figure 13:
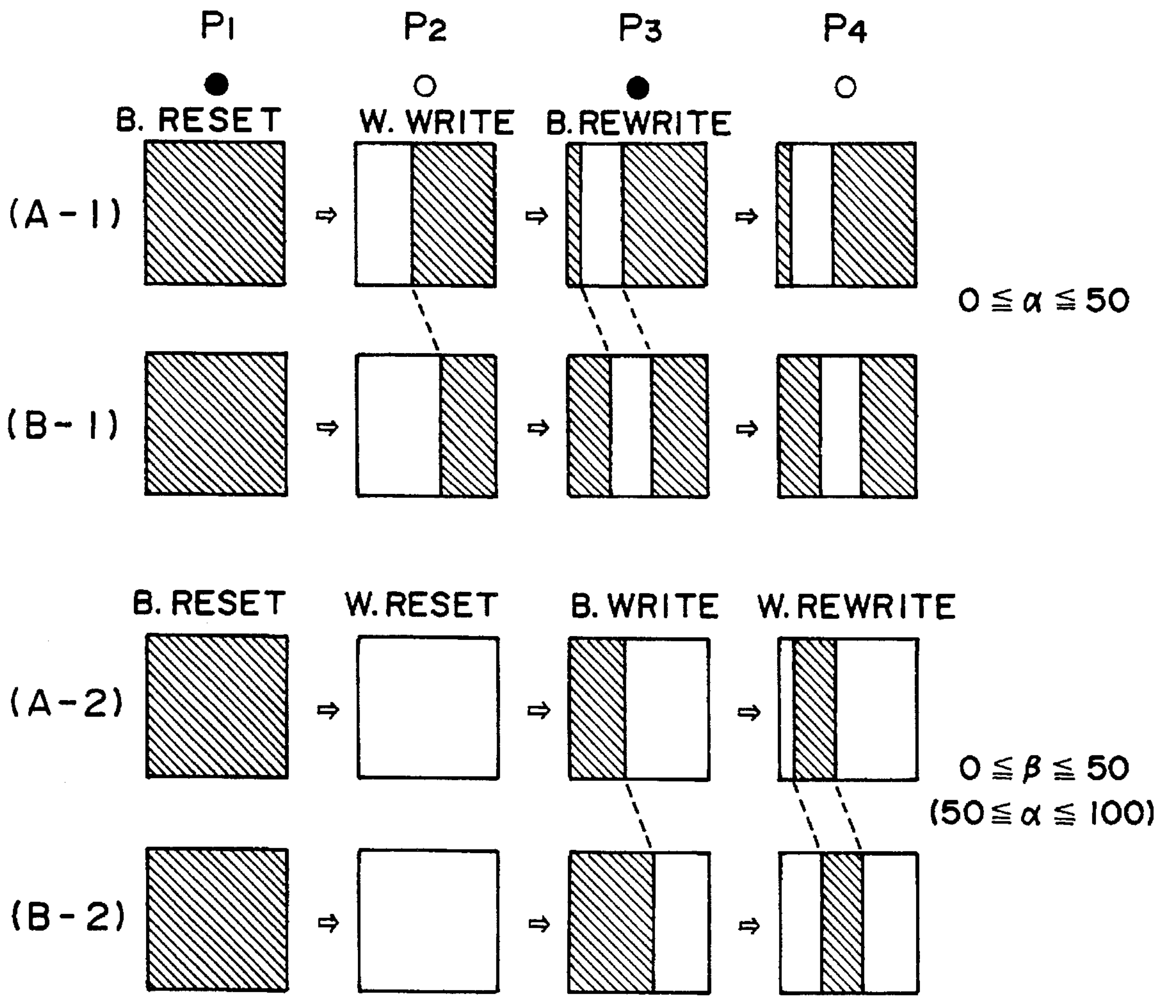
FIG. 13, views (A-1), (B-1), (A-2) and (B-2) are a set of plan views showing pixel states for halftone display according to the first embodiment.

A pixel A having a threshold characteristic represented by a curve a in FIG. 11 is supplied with a waveform at FIG. 12(1). Signals P1–P4 are assumed to have voltages, of which the absolute values are $V_1$–$V_4$. As shown at (A-1) of FIG. 13, along with the application of signals P1–P4, the pixel A is reset to black by pulse P1 and written by pulses P2 and P3, and the written gradation state of α% is retained even after the application of pulses P4. On the other hand, when a pixel B having a threshold characteristic as represented by a curve b in FIG. 11 is supplied with a waveform at FIG. 12(1), the pixel state sequence as shown at FIG. 13 (B-1) results, whereby a gradation of α% similarly as the pixel A is displayed with a parallel shift of a white region of β% (=α%). Accordingly, the pixels A and B show an identical transmittance.

Next, the case of $50 \leqq \alpha \leqq 100\%$ will be described.

The pixel A is supplied with a waveform at FIG. 12(2) whereby, along with application of pulses P1–P4 as shown at (A-2) of FIG. 13, the pixel A is reset to white by pulse P2 and written by pulses P3 and P4 to leave α% (=100-α%) of black domain, thus providing a transmittance of α%. Similarly, when the pixel B is supplied with the waveform at FIG. 12(2), the pixel state sequence as shown at FIG. 13(B-2) results, whereby a gradation of α% similarly as the pixel A is displayed with a parallel shift of a black region of β% (=100-α%).

Figure 8:
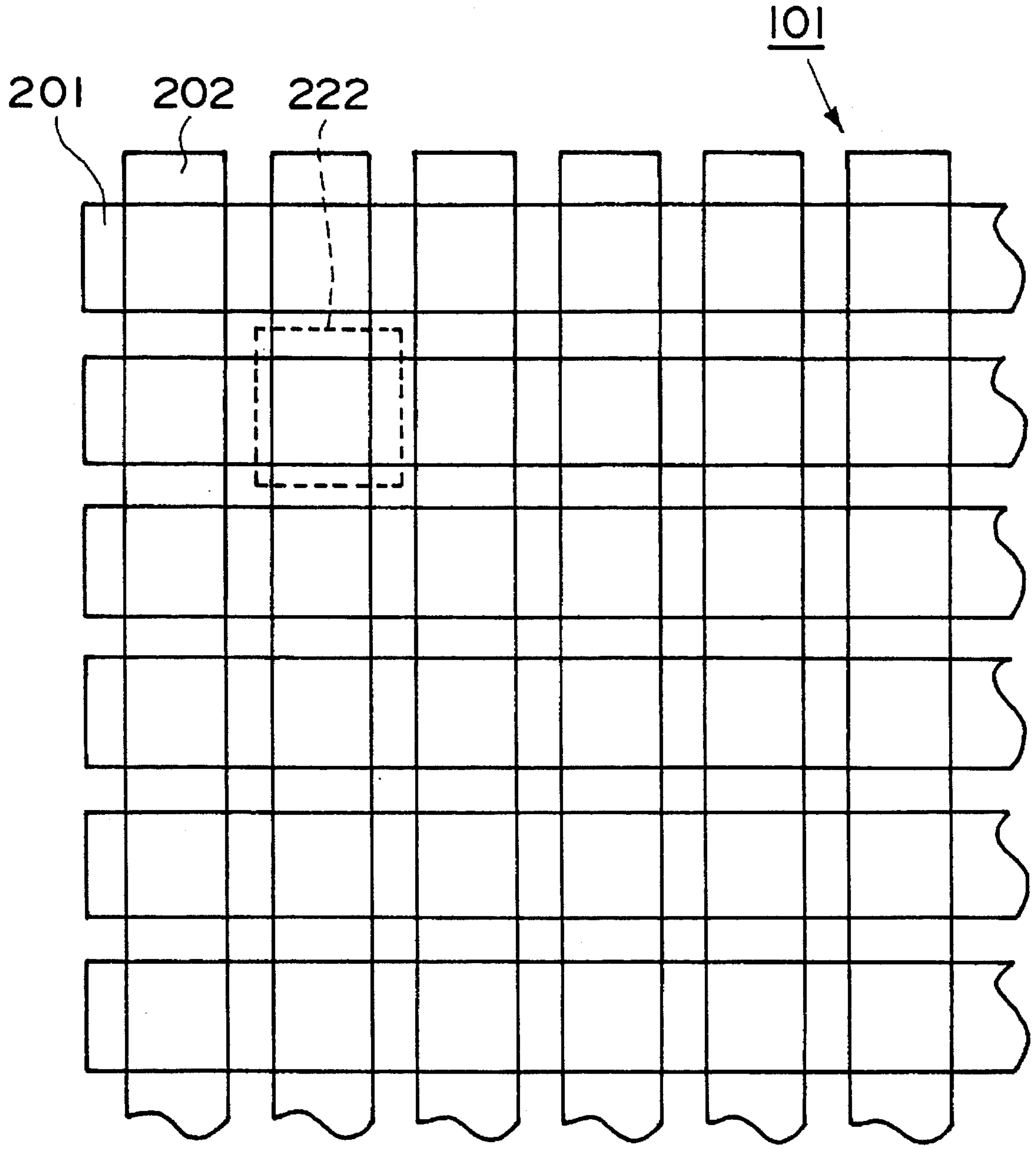
FIG. 8 is a schematic plan view showing an electrode pattern in a liquid crystal display device used in the invention.

Next, a case of applying combined voltage waveforms as shown at FIGS. 12(1) and (2) by using an electrode matrix as shown in FIG. 8 will be described.

Pulse P1 for resetting all the pixels on a scanning line has an amplitude $$V_1 \geqq X_{100},$$

pulse P2 for writing P+β% in pixel A or resetting pixel A to white satisfies $$X_P \leqq V_2 \leqq X_{P+50} \text{ or } V_2 \geqq X_{100},$$

pulse P3 for writing P% or P+β% in pixel A satisfies $$V_3 = X_p \text{ or } X_P \leqq V_3 \leqq X_{P+50}, \text{ and}$$

pulse P4 for not writing in pixel A or writing P% in pixel A (with the proviso that X shift $\leqq X_Q - X_{P+50}$) satisfies $$V_4 \leqq X_O - (X_Q - X_{P+50}) \text{ or } V_4 = X_P.$$

Figure 14:
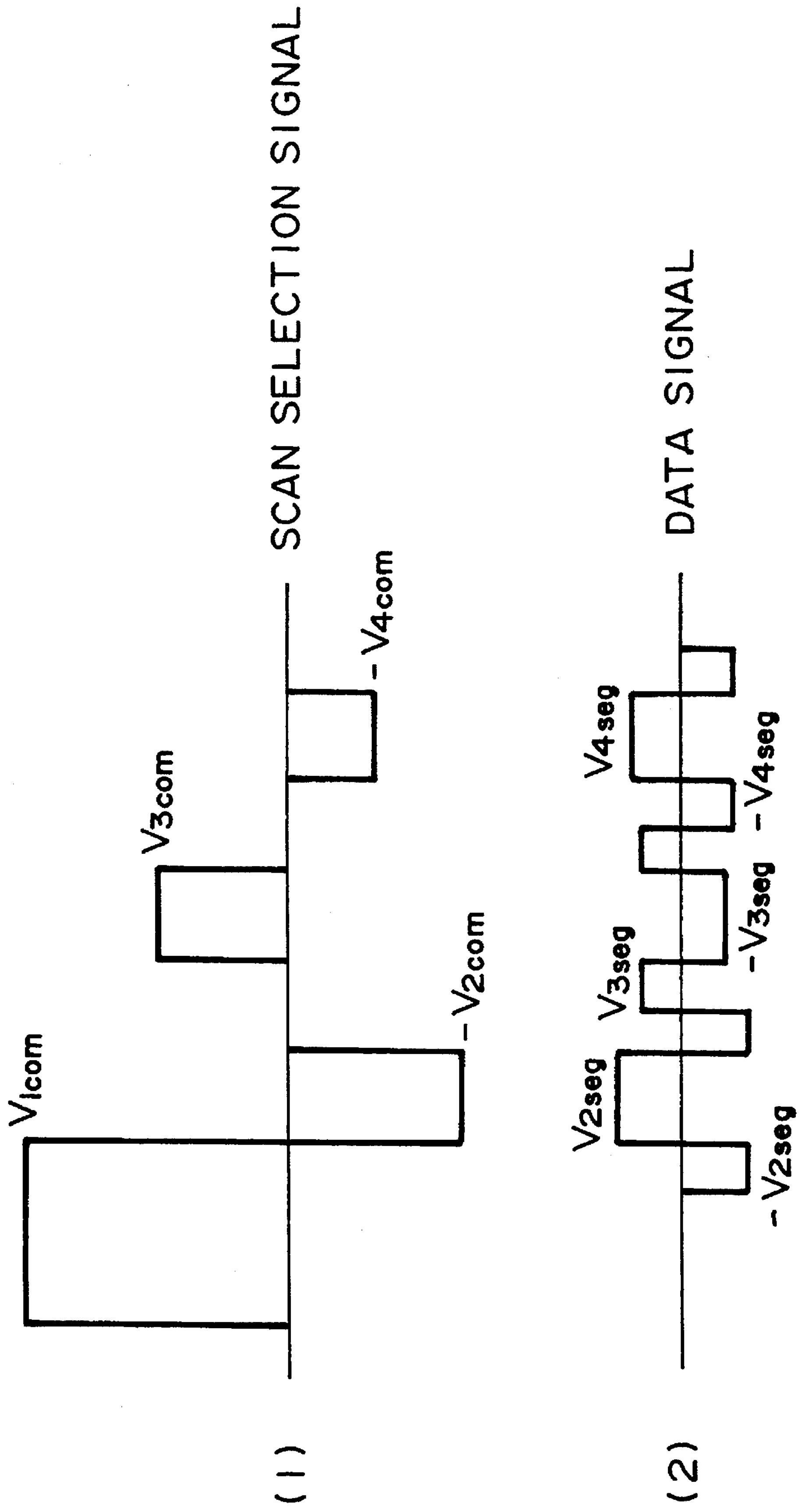
FIG. 14 is a waveform diagram showing drive signals used in matrix drive according to the first embodiment.

FIG. 14 shows an example of a scanning selection signal (1) and a data signal (2) satisfying the above-mentioned requirements.

In FIG. 14, the respective signals have the following amplitudes:

$$V_{1com} = 1.3X_{100}$$

$$V_{2com} = ½(X_{100} + X_P)$$

$V_{3com}=½(X_{P+50}+X_P)$ $$V_{4com} = ½[X_P + \{X_0 - (X_Q - X_{P+50})\}] -$$
$$½(X_{100} - X_P) \leqq V_{2seg} \leqq ½(X_{100} - X_P) -$$
$$½(X_{P+50} - X_P) \leqq V_{3seg} \leqq ½(X_{P+50} - X_P) -$$
$$½[X_P - \{X_0 - (X_Q - X_{P+50})\}] \leqq V_{4seg} \leqq$$
$$½[X_P - \{X_0 - (X_Q - X_{P+50})\}].$$

Further, in order to retain the transmittance at pixel B in a scanning non-selection period, the following conditions must be satisfied:

$$X_0-X_{Shift}\geqq V_{2seg}$$

$$X_0-X_{Shif}\geqq V_{3seg}$$

$$X_0-X_{Shift}\geqq V_{4seg}.$$

Figure 10:
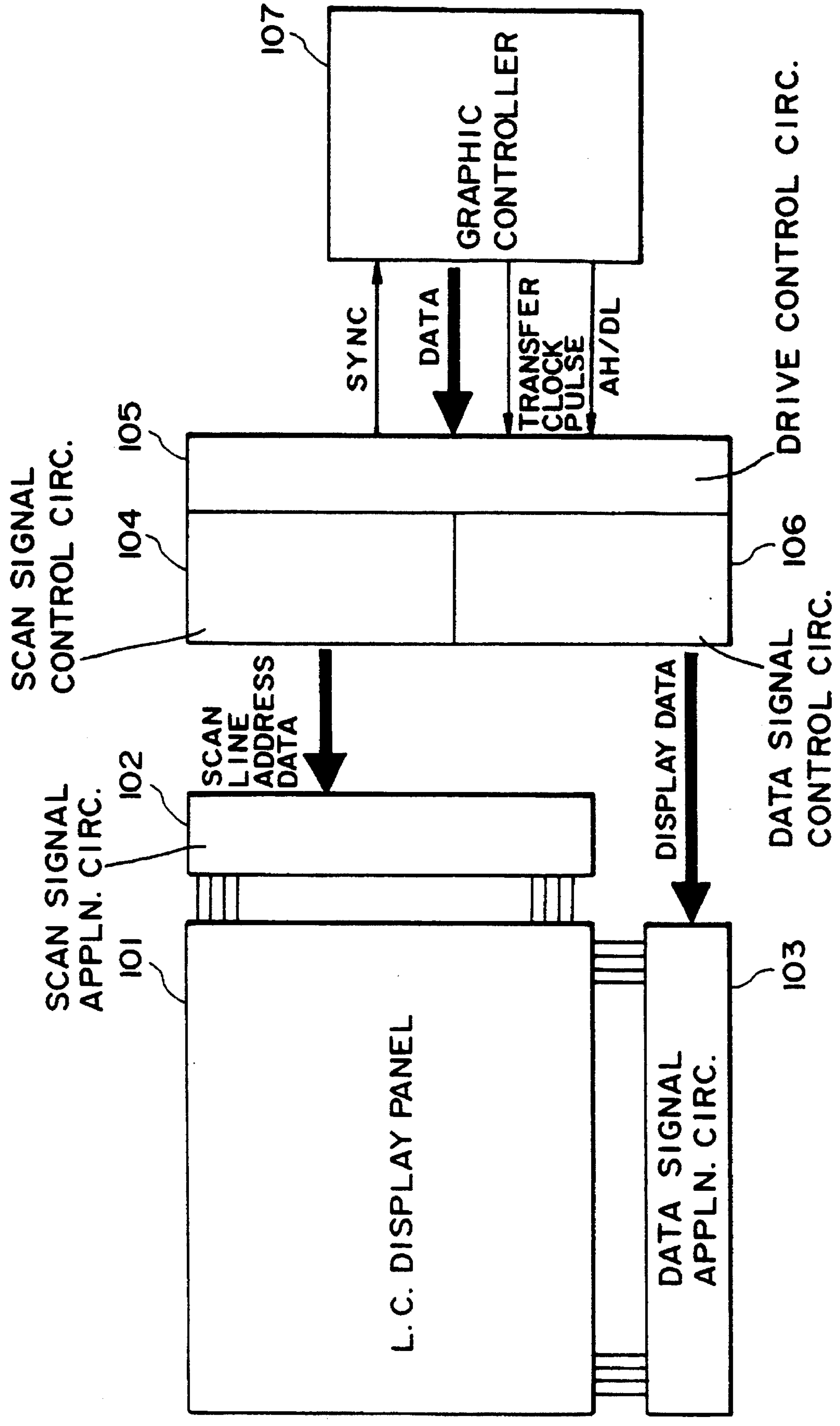
FIG. 10 is a control system block diagram of a liquid crystal display apparatus used in the invention.
Figure 15:
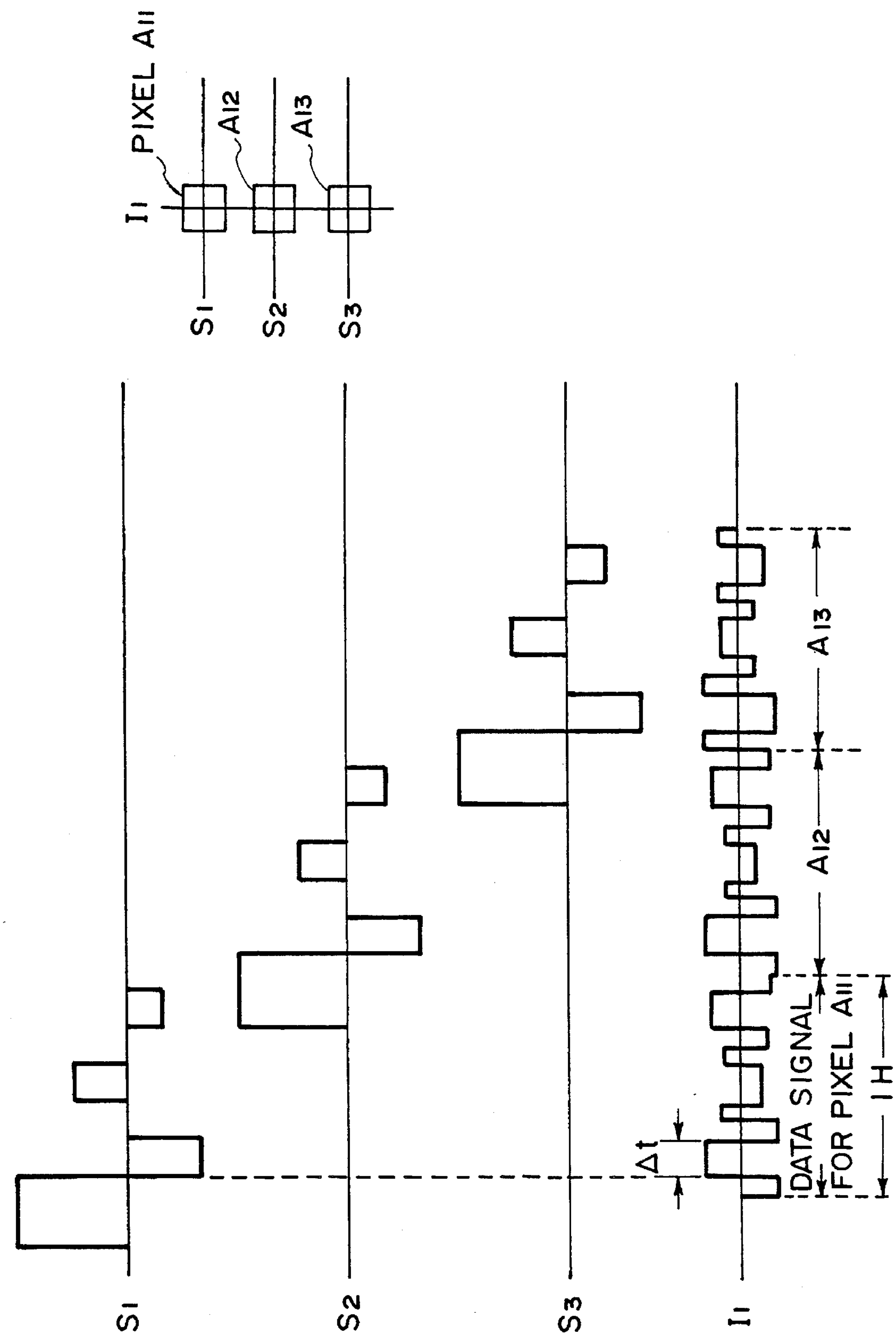
FIGS. 15 and 16 each are respective show an examples of time-serial waveform diagram used in matrix drive according to the first embodiment and a partial view of the matrix.

FIG. 15 is a set of time-serial driving waveforms based on signal waveforms shown in FIG. 14 are used in an apparatus shown in FIG. 10. Referring to FIG. 15, at $S_1$–$S_3$ are scanning signal waveforms applied to scanning electrodes $S_1$–$S_3$ and at $I_1$ is shown a data signal waveform applied to a data electrode $I_1$ in synchronism with the scanning signals $S_1$–$S_3$. As is apparent from the figure, a period 1H for display at one pixel is 6 times one writing pulse width (=Δt), i.e., 6Δt.

Figure 16:
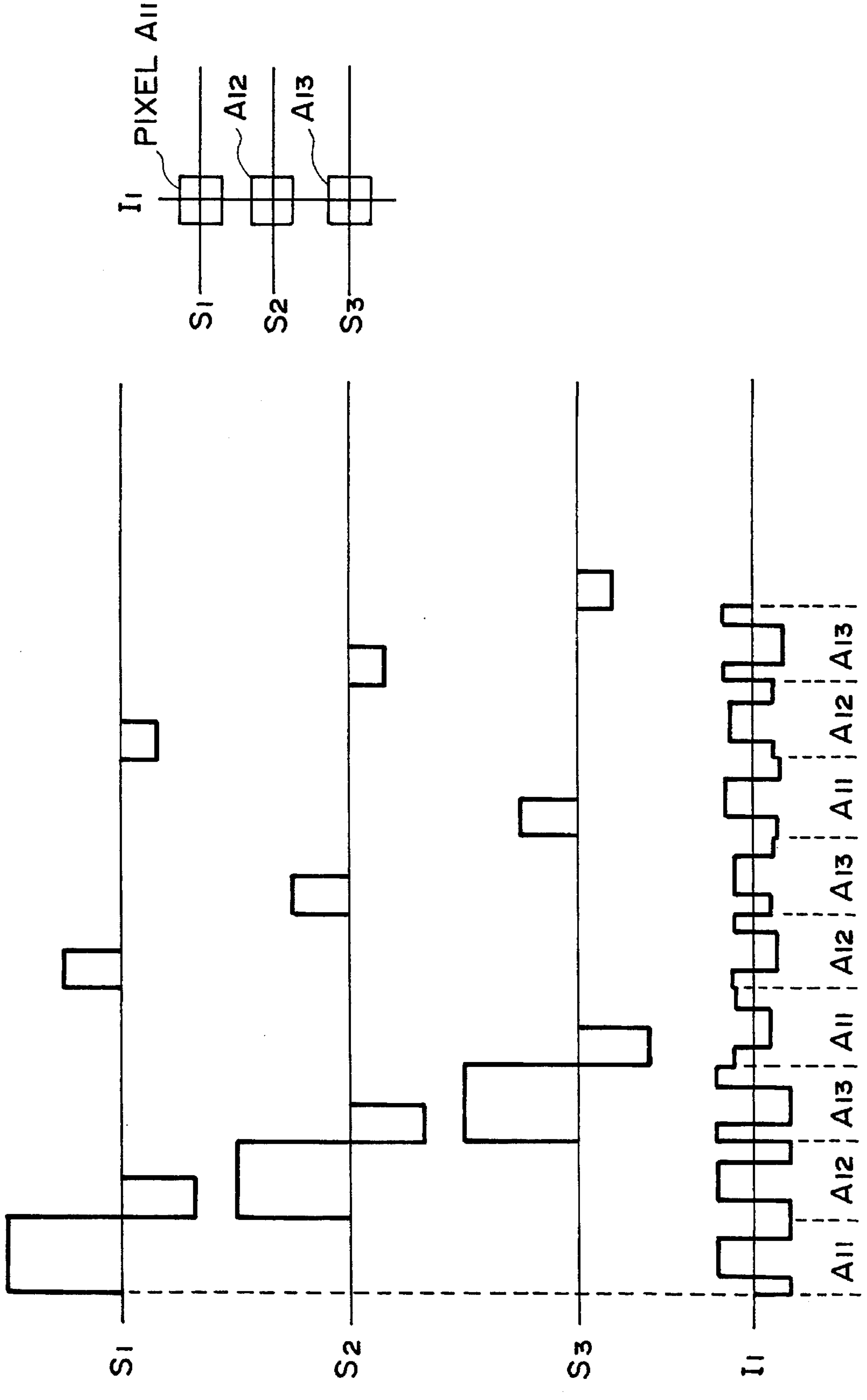

FIG. 16 is a set of time-serial waveforms in case where a pixel is not written continuously.

In the cases of FIGS. 14, 15 and 16, it is possible to effect a stable gradation display even if accompanied with a temperature difference of about 4 ° C., by using the following set of conditions:

ΔT=50 μs, $V_{1com}$=24.0 V, $V_{2com}$=15.2 V, $V_{3com}$=13.5 V, $V_{4com}$=10.3 V, $|V_{2seg}|\leqq 3.5$ V, $|V_{3seg}|\leqq 1.7$ V, $|V_{4seg}|\leqq 2.0$ V.

The above-mentioned embodiment of compensated gradation display method exhibit the utmost compensation effect under the following conditions:

(1) The threshold characteristic curve (V-T curve) has an approximately linear portion. A larger proportion of the linear portion provides a wider range of complete compensation.

(2) The threshold characteristic change due to, e.g., an environmental temperature change or a temperature distribution over a panel, may be represented by a parallel shift along a coordinate axis, which may have a linear scale or logarithmic scale.

(3) In case of writing with pulse P2 or P3 with reference to FIGS. 11 and 12, the transmittances P and Q and the threshold shift $V_{shift}$ between pixels A and B satisfy the following relations:

$$Q\geqq P+\beta(0\leqq\beta\leqq 50)$$

$$X_Q-X_{P+\beta}\geqq X_{shift}.$$

(4) The transmittance in response to a pulse below $X_{100}$ can be calculated by addition and/or subtraction. More specifically, a pixel having a transmittance of 0%, when supplied sequentially with a 60% white-writing pulse and a 30% black-writing pulse, is approximately caused to have a transmittance of 30% (=60–30%).

Second Embodiment

This embodiment is particularly effective in case where the shift of V-T characteristic due to a temperature change, etc., is significant.

Figure 17:
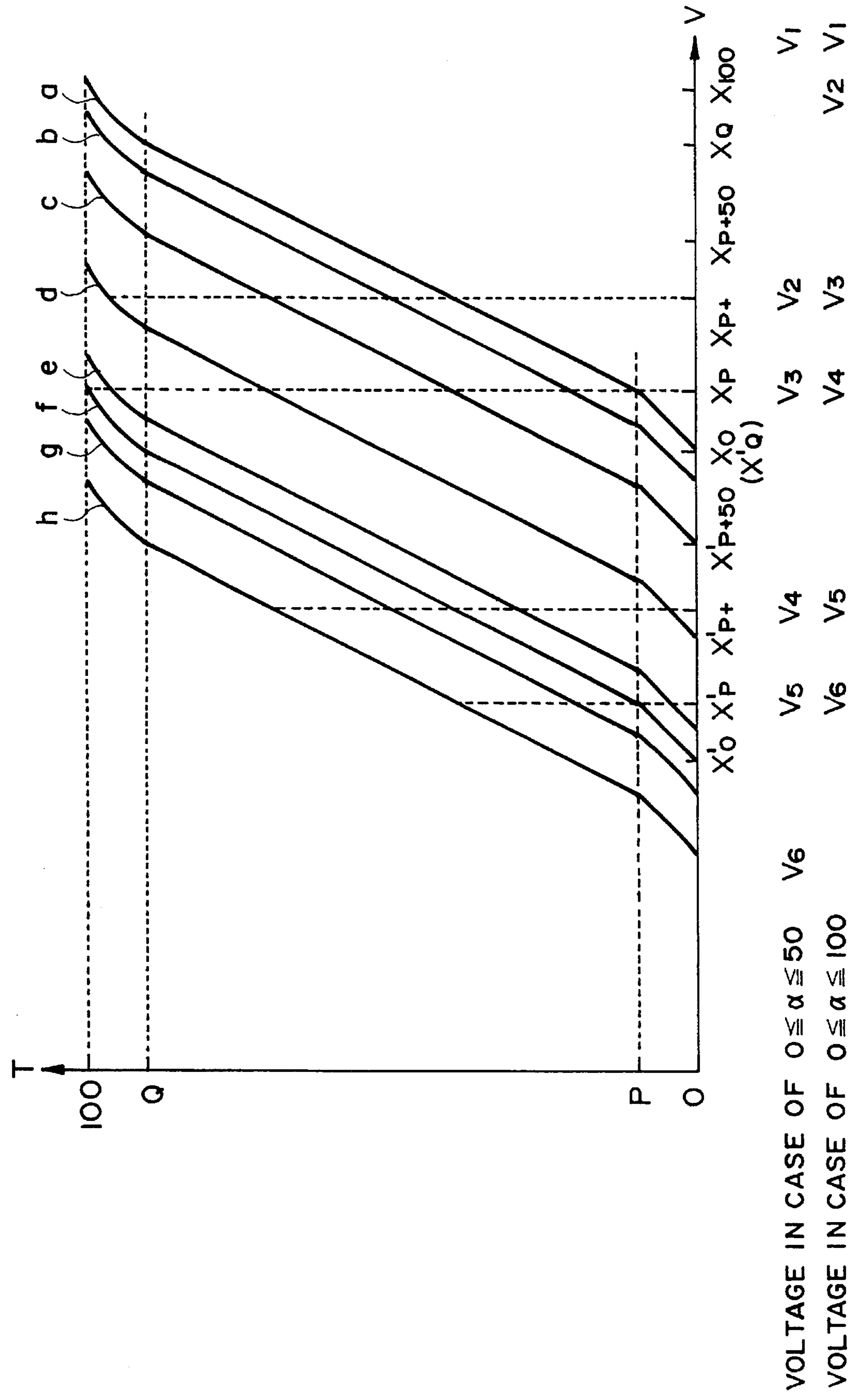
FIG. 17 is a graph showing a V-T characteristic of a liquid crystal device used in a second embodiment of the invention.

For example, with reference to FIG. 17, the above-mentioned first embodiment is effective for a device in which the V-T characteristic is shifted from a curve a to a curve c, but may not be sufficient for a device in which the V-T characteristic is shifted significantly, such as from the curve a to a curve h.

The above point is improved by this embodiment (second embodiment).

According to the second embodiment of the present invention, a liquid crystal apparatus includes a display unit comprising a ferroelectric liquid crystal sandwiched between a pair of oppositely disposed electrode substrates so as to form a plurality of pixels is driven for gradation display by plural steps of writing by application of sequentially polarity-inverted signals, wherein each pixel is selectively subjected depending on given gradation data to either one of a first gradation display sequence including sequential application of a signal for resetting to a first stable state, a writing signal, plural compensation signals and a signal not associated with display, and a second gradation display sequence including sequential application of a signal for resetting to a first stable state, a signal for resetting to a second stable state, writing signal and plural compensation signals.

Whether a particular pixel is subjected to the first gradation display sequence or the second gradation display sequence is determined depending on the objective gradation display level of the pixel, i.e., it is preferred that the first gradation display sequence is adopted for a pixel expected to display a level comprising 50–100% of the first stable state and the second gradation display sequence is adopted for a pixel expected to display a level comprising 50– 100% of the second stable state. A pixel expected to display 50% each of the first and second stable states may be subjected to either the first or second gradation display sequence.

In this embodiment, the above-mentioned compensation pulses (signals) may preferably be applied three or more times, and the second and subsequent writing pulses (including the compensation pulses) may preferably be applied non-continuously, optimally with a spacing of at least 100 μps.

In the first gradation display sequence, pixels in a black-reset state are first supplied with signals corresponding to objective gradation display levels based on a pixel having the highest threshold and then supplied plural times with a signal for compensating objective gradation displays at pixels having lower threshold due to a shift in threshold characteristic, thereby correcting display irregularity. This sequence is effective for providing pixels having a black portion of at least 50% and below 100%. On the other hand, in the second gradation display sequence for providing pixels having a white portion of at least 50% and below 100%, pixels are sequentially subjected to black-resetting and white-resetting, and then similarly written based on a pixel having the highest threshold and then compensated for pixels having lower thresholds. Accordingly, in the first gradation display sequence for displaying at least 50% and below 100% of black, a small value-signal not affecting the display is applied in the final step.

According to the second embodiment of the present invention, gradation display can be effected while compensating for fluctuation in threshold characteristic.

With reference to FIG. 17, pixels A to H having different V-T characteristics represented by curves a–h, respectively, which are linear within the transmittance region P–Q%, are taken for example. The pixel A has a threshold voltage $X_O$, and $X_P$, $X_{P+\beta}$ and $X_Q$ represent voltages for writing P%, P+β% and Q%, respectively, in the pixel S. $X_{100}$ denotes the saturation voltage of the pixel A. $X'_0$, $X'_P$, $X'_{P+\beta}$ *and* $X'_Q$ are voltages satisfying the relationships of:

$$X_0-X'_0=X_P-X'_P=X_{P+\beta}-X'_{P+\beta}=X_Q-X_0,\ X'_Q=X_0.$$

The transmittance is assumed to be 0% in a wholly black state and 100% in a wholly white state of a pixel.

Figure 18:
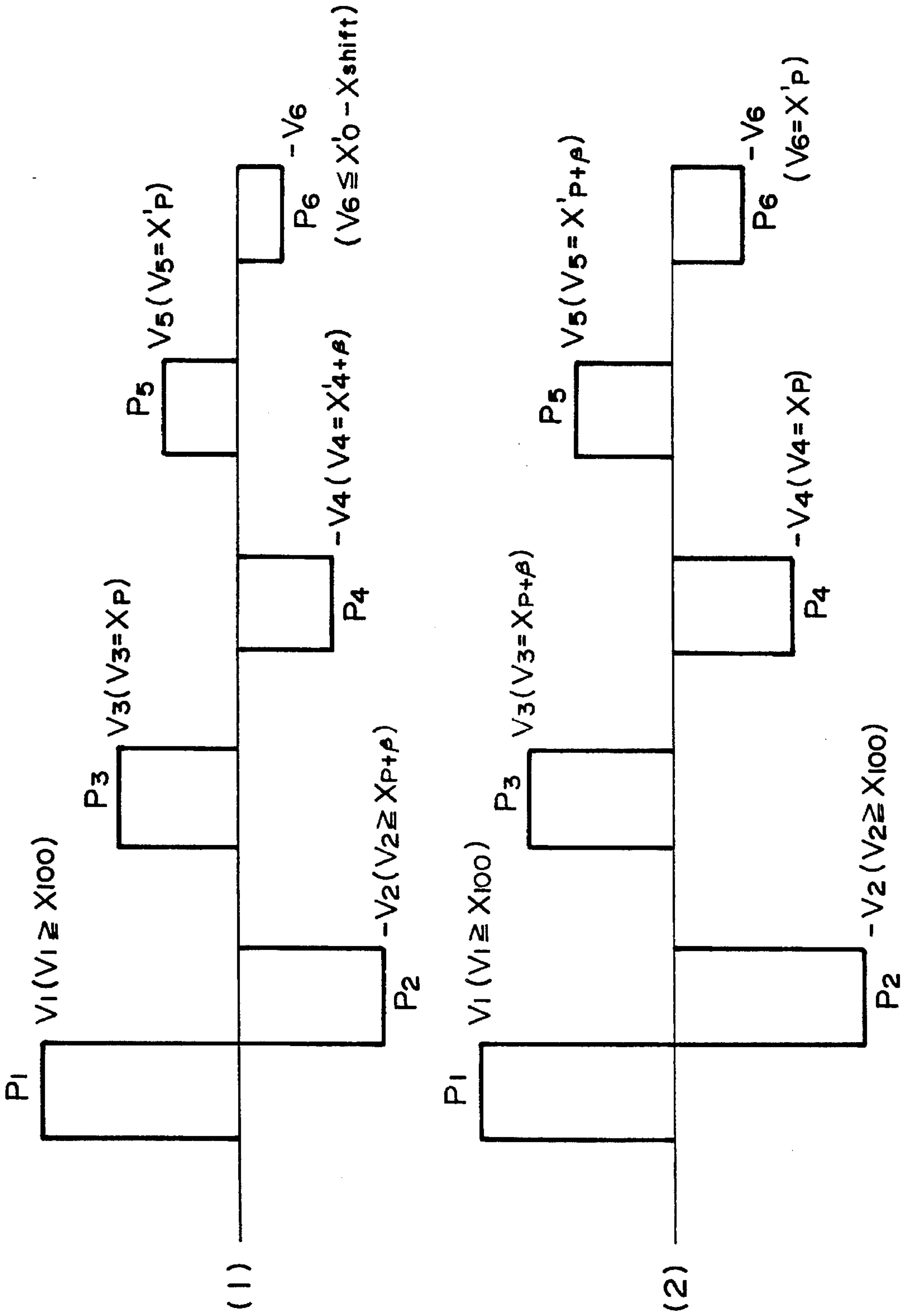
FIG. 18 is a waveform diagram showing drive signals used in the second embodiment of the invention.

Pixels having such threshold characteristics are supplied selectively with either one of waveforms at FIGS. 18(1) and (2). More specifically, in case where an objective transmittance α% is 0≦α≦50, β is taken as equal to α and a waveform at (1) in FIG. 18 is applied. On the other hand, in case where 50≦ α≦100, β is taken as equal to 100-α and a waveform at (2) in FIG. 18 is applied.

The case of applying the waveform at FIG. 8(1) (0≦α≦50) is first described.

Figure 19:
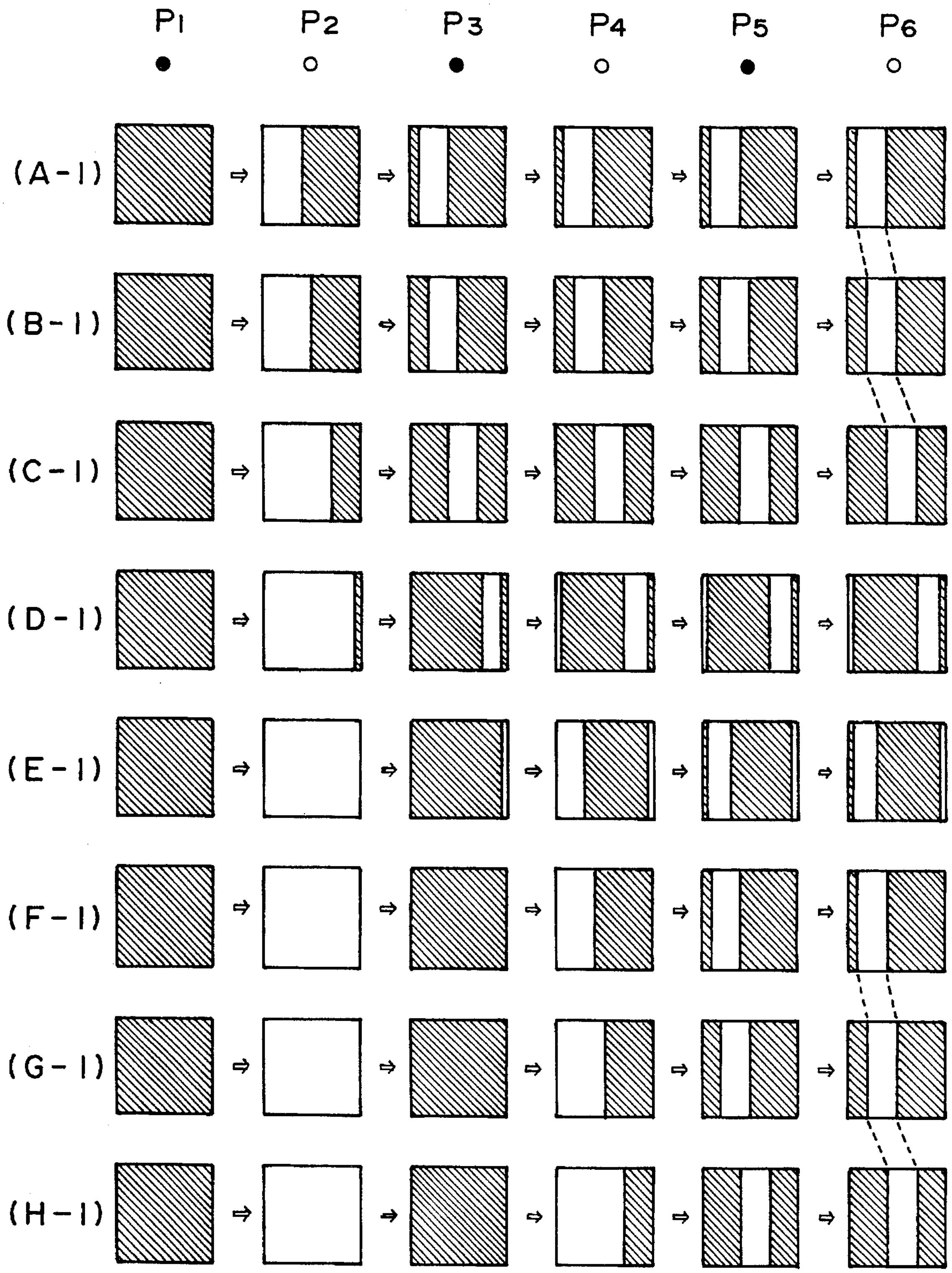
FIG. 19, views (A-1) to (N-1) and FIG. 20, views (A-2) to (H-1) in combination provide a set of plan views showing pixel states for a halftone display according to the second embodiment.

A pixel A having a threshold characteristic represented by a curve a in FIG. 17 is supplied with a waveform at FIG. 18(1). Signals P1–P6 are assumed to have voltages, of which the absolute values are $V_1$–$V_6$. As shown at (A-1) of FIG. 19, along with the application of signals P1–P6, the pixel A is reset to black by pulse P1 and written by pulses P2 and P3, and the written gradation state of β% (=α%) is retained even after the application of pulses P4–P6. On the other hand, when pixels B and C having threshold characteristics as represented by curves b and c in FIG. 17 are supplied with-a waveform at FIG. 18(1), the pixel state sequences as shown at FIG. 19(B-1) and (C-1) result, whereby a gradation of α% similarly as the pixel A is displayed with a parallel shift of a white region of β% (=α%). Further, when pixels F, G and H having threshold characteristics as represented by curves f, g and h in FIG. 17 are supplied with the waveform at FIG. 18(1), the pixel state sequences as shown at (F-1), (G-i) and (H-i) of FIG. 19 result along with application of pulses P1–P6, i.e., the pixels are reset to black by pulse P1, substantially reset to white by pulse P2, substantially reset to black by pulse P3, written by pulses P4 and P5, and the written state is retained even after the application of pulse P6. The resultant transmittance will be understood to be β% (=α%) as the pulses P3–P5 for the pixels F, G and H are identical in function of causing transmittance changes to the pulses P1–P3 for the pixels A, B and C.

In other words, pixels having lower thresholds are substantially reset by writing pulses for pixels having higher thresholds and actually written by subsequent compensation pulses.

In the meantime, when a pixel D having a threshold characteristic represented by a curve d in FIG. 17 is supplied with the waveform at FIG. 18(1), a pixel state sequence at (D-1) of FIG. 19 results along with application of pulses P1–P6 , i.e., the pixel is reset to black by pulse P1, is written by pulses P2–P4, and retains the written state even after application of pulses P5 and P6. The resultant transmittance depends on the shape in the transmittance region of O–P% and the shape in the transmittance region of Q-100% of the curve d, but the transmittance approaches closer to β% as the pulses P2, P3 and P4 are applied in the order.

Further, when a pixel E having a threshold characteristic represented by a curve e in FIG. 17 is supplied with the waveform at FIG. 18(1), a pixel state sequence at (E-1) of FIG. 19 results along with application of pulses P1–P6, i.e., the pixel is reset to black by pulse P1, substantially reset to white by pulse P2, written by pulses P3–P5 and retains the resultant state even after application of pulse P6. The resultant transmittance depends on the shapes in the transmittance regions of O–P% and Q-100% of the curve e, but the transmittance approaches to β% as the pulses P3, P4 and P5 are applied in the order.

Next, the case of applying a waveform at FIG. 18(2) (50≦α≦100%) will be described.

Figure 20:
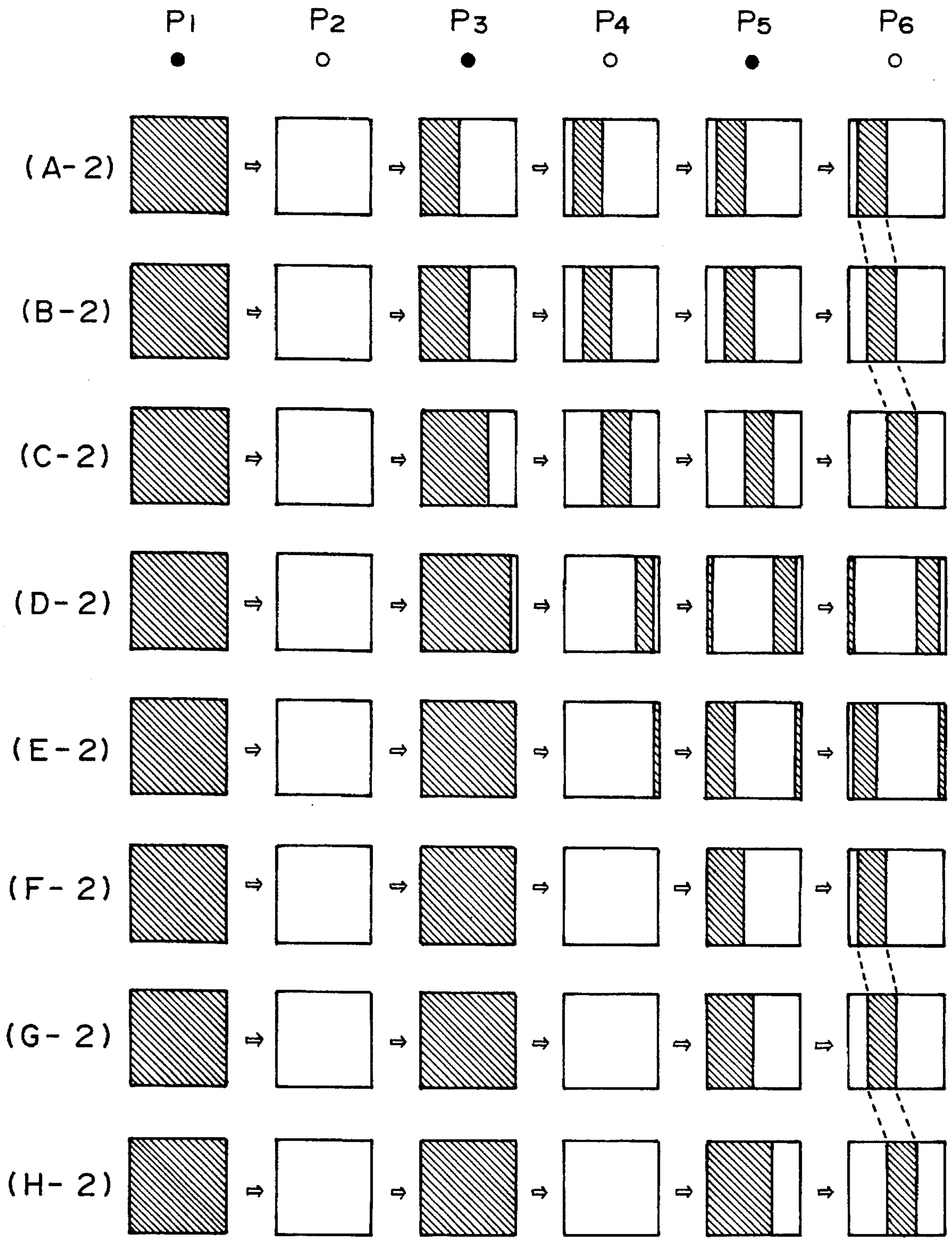

The pixel A is supplied with a waveform of FIG. 18(2) whereby, along with application of pulses P1–P6 as shown at (A-2) of FIG. 20, the pixel A is reset to black by pulse P1, reset to white by pulse P2, written by pulses P3 and P4 and retain the resultant transmittance of 100-β% (=α%) even after application of pulses P5 and P6. Similarly, when pixels B and C having threshold characteristics represented by curves b and c are supplied with the waveform at FIG. 18(2), the pixel B is caused to display a gradation of 100-β% (=α%) only with a parallel shift of a black region of β%. Further, when pixels F, G and H having threshold characteristics f, g and h in FIG. 17 are supplied with the waveform at FIG. 18(2), the pixels are reset to black by pulse P1, reset to white by pulse P2, reset to black by pulse P3, reset to white by pulse P4 and written by pulses P5 and P6 as shown at (B-2), (C-2) and (D-2) of FIG. 20. The resultant transmittance is understood to be 100-β% (=α%) as the pulses P2–P4 for pixels A–C and pulses P4–P6 for pixels F–H show identical contribution to transmittance changes.

Now, when a pixel D having a threshold characteristic represented by a curve d in FIG. 17 is supplied with the waveform at FIG. 18(2), a pixel state sequence at (D-2) of FIG. 20 results along with application of pulses P1–P6 , i.e., the pixel is reset to white by pulse P2, is written by pulses P3 –P5, and retains the written state even after application of pulse P6. The resultant transmittance depends on the shape in the transmittance region of O–P% and the shape in the transmittance region of Q-100% of the curve d, but the transmittance approaches closer to 100-β% as the pulses P3, P4 and P5 are applied in the order.

Further, when a pixel E having a threshold characteristic represented by a curve e in FIG. 17 is supplied with the waveform at FIG. 18(2), a pixel state sequence at (E-2) of FIG. 20 results along with application of pulses P1–P6, i.e., the pixel is reset to black by pulse P3 and written by pulses P4 P6. The resultant transmittance depends on the Shapes in the transmittance regions of O–P% and Q-100% of the curve e, but the transmittance approaches to 100-β% as the pulses P4, P5 and P6 are applied in the order.

The relationships among the above-mentioned threshold characteristic (V-T curve), applied pulses and gradation data are summarized in the following Table 1.

TABLE 1

| | | Applied pulses | | |
|---|---|---|---|---|
| Gradation level | V-T curve | Reset pulses | Writing pulses | Pulses below threshold |
| 0–50% | a | P1 | P2, P3 | P4, P5, P6 |
| | b | P1 | P2, P3 | P4, P5, P6 |
| | c | P1 | P2, P3 | P4, P5, P6 |
| | d | P1 | P2, P3, P4 | P5, P6, |
| | e | P1, P2 | P3, P4, P5 | P6 |
| | f | P1, P2, P3 | P4, P5 | P6 |
| | g | P1, P2, P3 | P4, P5 | P6 |
| | h | P1, P2, P3 | P4, P5 | P6 |
| 50–100% | a | P1, P2 | P3, P4 | P5, P6 |
| | b | P1, P2 | P3, P4 | P5, P6 |
| | c | P1, P2 | P3, P4 | P5, P6 |
| | d | P1, P2 | P3, P4, P5 | P6 |
| | e | P1, P2, P3 | P4, P5, P6 | |
| | f | P1, P2, P3, P4 | P5, P6 | |

TABLE 1-continued

| Gradation level | V-T curve | Applied pulses: Reset pulses | Writing pulses | Pulses below threshold |
|---|---|---|---|---|
| | g | P1, P2, P3, P4 | P5, P6 | |
| | h | P1, P2, P3, P4 | P5, P6 | |

In the above table, the applied pulses are classified into the reset pulses, writing pulses and pulses below threshold based on their actual functions for the respective pixels. Accordingly, in this embodiment, for the gradation level of 0–50%, P1 is reset pulse, P2 is a gradation display pulse, P3–P5 and compensation pulses and P6 is a dummy pulse not related with display. On the other hand, for the gradation level of 50–100%, P1 and P2 are reset pulses, P3 is a gradation display pulse, and P4–P6 are compensation pulses.

As is understood from Table 1, for pixels having threshold characteristics represented by curves d and e, it is intended to display a gradation by application of three writing pulses.

The above-mentioned embodiment of a compensated gradation display method exhibit the utmost compensation effect under the following conditions:

(1) The threshold characteristic curve (V-T curve) has an approximately linear portion. A larger proportion of the linear portion provides a wider range of complete compensation.

(2) The threshold characteristic change due to, e.g., an environmental temperature change or a temperature distribution over a panel, may be represented by a parallel shift along a coordinate axis, which may have a linear scale or logarithmic scale.

(3) In case of writing with pulse P2 or P3 with reference to FIGS. 17 and 18, the transmittances P and Q and the threshold shift $X_{shift}$ of a certain pixel satisfy the following relations:

$$Q \geqq P+\beta (0 \leqq \beta \leqq 50), \text{ and}$$

$$X_Q - X_{P+\beta} \geqq X_{shift} \text{ or}$$

$$X_Q - X'_Q \leqq X_{shift} \leqq X_Q - X'_{P+\beta}$$

(4) The transmittance in response to a pulse below $X_{100}$ can be calculated by addition and/or subtraction. More specifically, a pixel having a transmittance of 0%, when supplied sequentially with a 60% white-writing pulse and a 30% black-writing pulse, is approximately caused to have a transmittance of 30% (=60–30%).

Further, for a pixel showing a threshold characteristic as represented by the curve d or e and a threshold shift $X_{shift}$ satisfying $X_Q - X_{P+\beta} \leqq X_{shift} \leqq X_Q - X'_Q$, the objective transmittance of α% is substantially realized if the following conditions are satisfied.

(5) If a threshold curve in the transmittance range of O–P% is represented by f(v), a voltage of writing a transmittance of O–P% from 0% by $V_A$, a threshold curve in the transmittance range of P–Q% by g(v), a voltage of writing a transmittance of P–Q% from 0% by $V_B$, a threshold curve in the transmittance range of Q-100% by h(v), and a voltage of writing a transmittance of Q-100% from 0% by $V_C$, g'(VB)=f'($V_A$)+h'($V_C$), wherein f'(v), g'(v) and h'(v) represent differential curves of f(v), g(v) and h(v), respectively.

This means that the excessive writing into Q-100% is compensated by writing in a reverse polarity in P–Q% and the compensation is completed by writing in O–P% in the same polarity as in the first writing.

(6) The V-T curve in the range of O–P% and the V-T curve in the range of Q-100% identical lengths of projection onto the voltage axis.

Next, a case of applying combined voltage waveforms as shown at FIGS. 18(1) and (2) by using an electrode matrix as shown in FIG. 8 will be described.

Pulse P1 for resetting all the pixels on a scanning line has an amplitude $$V_1 \geqq X_{100},$$

pulse P2 for writing P+β% in pixel A or setting pixel A to white satisfies $$X_P \leqq V_2 \leqq X_{P+50} \text{ or } V_2 \geqq X_{100},$$

pulse P3 for writing P% or P+β% in pixel A satisfies $$V_3 = X_P \text{ or } X_P \leqq V_3 \leqq X_{P+50},$$

pulse P4 for providing a potential of $X'_{P+\beta}$ or writing P% in a pixel A satisfies $$X'_P \leqq V_4 \leqq X_{P+50} \text{ or } V_4 = X_P,$$

pulse P5 for providing a potential of $X'_P$ or a potential of $X'_{P+\beta}$ satisfies $$V_5 = X'_P, \text{ or } X'_P \leqq V_5 \leqq X'_{P+50}, \text{ and}$$

pulse $P_6$ for not writing in pixel H or providing a potential of $X'_P$ satisfies $$V_6 \leqq X'_0 - (X_1 - X_{P+50}), \text{ or } V_6 = X'_P.$$

Figure 21:
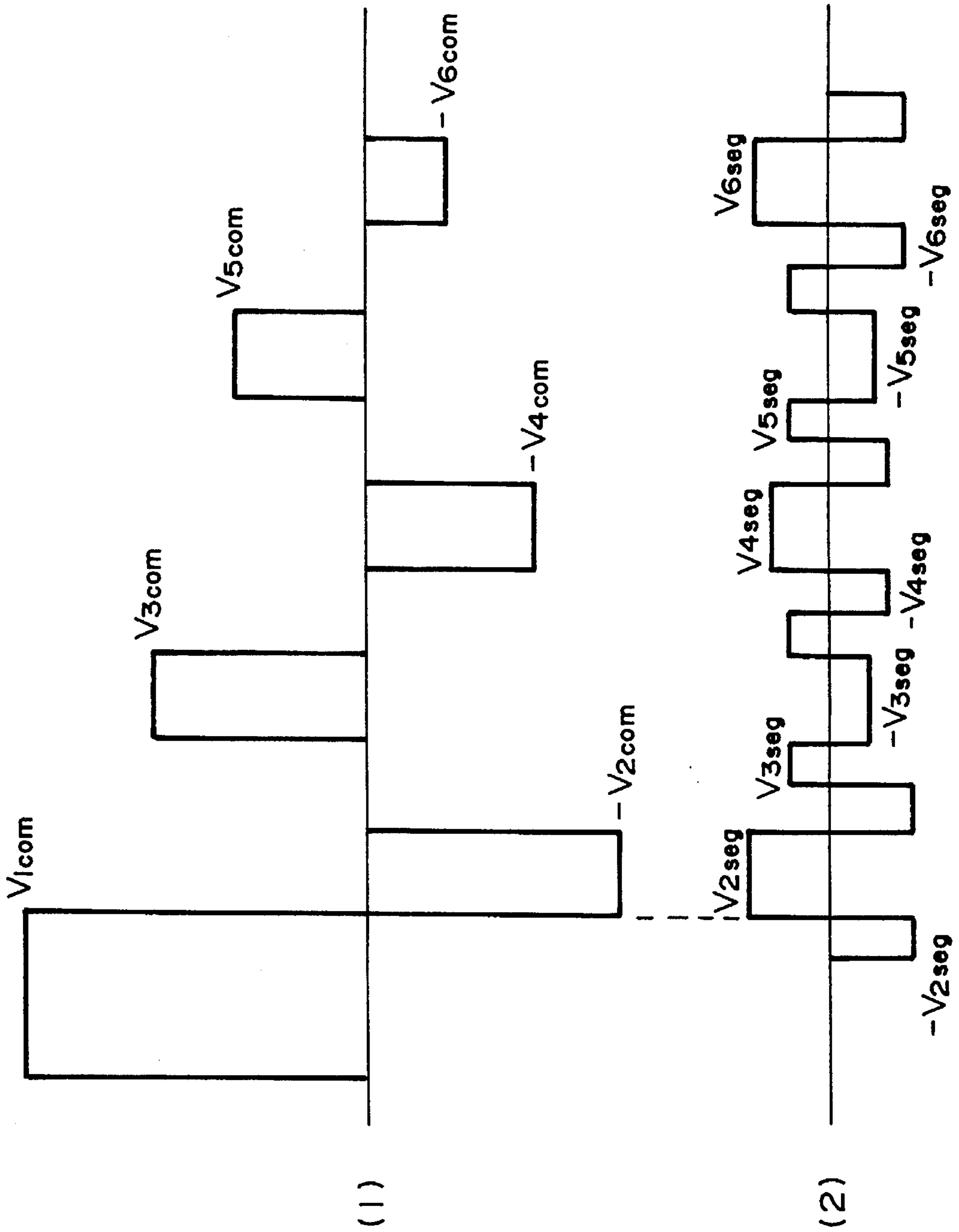
FIG. 21 is a waveform diagram showing drive signals used in a matrix drive according to the second embodiment.

FIG. 21 shows an example of a scanning selection signal (1) and a data signal (2) satisfying the above-mentioned requirements.

In FIG. 21, the respective signals have the following amplitudes.

$$V_{1com} = 1.3X_{100}$$

$$V_{2com} = \tfrac{1}{2}(X_{100} + X_P)$$

$$V_{3com} = \tfrac{1}{2}(X_{P+50} + X_P)$$

$$V_{4com} = \tfrac{1}{2}(X_P + X'_P)$$

$$V_{5com} = \tfrac{1}{2}(X'_{P+50} + X'_P)$$

$$V_{6com} = \tfrac{1}{2}[X'_P + \{X'_0 - (X_q - X_{P+50})\}] -$$
$$\tfrac{1}{2}(X_{100} - X_P) \leqq V_{2seg} \leqq \tfrac{1}{2}(X_{100} - X_P) -$$
$$\tfrac{1}{2}(X_{P+50} - X_P) \leqq V_{3seg} \leqq \tfrac{1}{2}(X_{P+50} - X_P) -$$
$$\tfrac{1}{2}(X_P - X'_P) \leqq V_{4seg} \leqq \tfrac{1}{2}(X_P - X'_P) -$$
$$\tfrac{1}{2}(X'_{P+50} - X'_P) \leqq V_{5seg} \leqq \tfrac{1}{2}(X'_{P+50} - X'_P) -$$
$$\tfrac{1}{2}[X'_P - \{X'_0 - (X_Q - X_{P+50})\}] \leqq V_{6seg} \leqq$$
$$\tfrac{1}{2}[X'_P - \{X'_0 - (X_Q - X_{P+50})\}]$$

As described above, $X'_0$, $X'_P$, $X'_{P+50}$ and $X'_Q$ are voltages satisfying.

$$X_0 - X'_0 = X_P - X'_P = X_{P+50} - X_{P+50} = X_Q - X_0 \; X'_0 = X_0.$$

Further, in order to retain the transmittance at pixel B in a scanning nonselection period, the following conditions must be satisfied:

$$X_0 = X_{shift} \geqq V_{2seg}$$

$$X_0 = X_{shift} \geqq V_{3seg}$$

$$X_0 = X_{shift} \geqq V_{4seg}$$

$$X_0 = X_{shift} \geqq V_{5seg}$$

$X_0 = X_{shift} \geqq V_{6seg}$

In case where different electric field intensities are required for converting the first stable state into the second stable state and for converting the second stable state into the first stable state, it is possible to obtain a stable display by applying a certain level of offset to pulses P2–P6 shown in FIG. 18.

Figure 22:
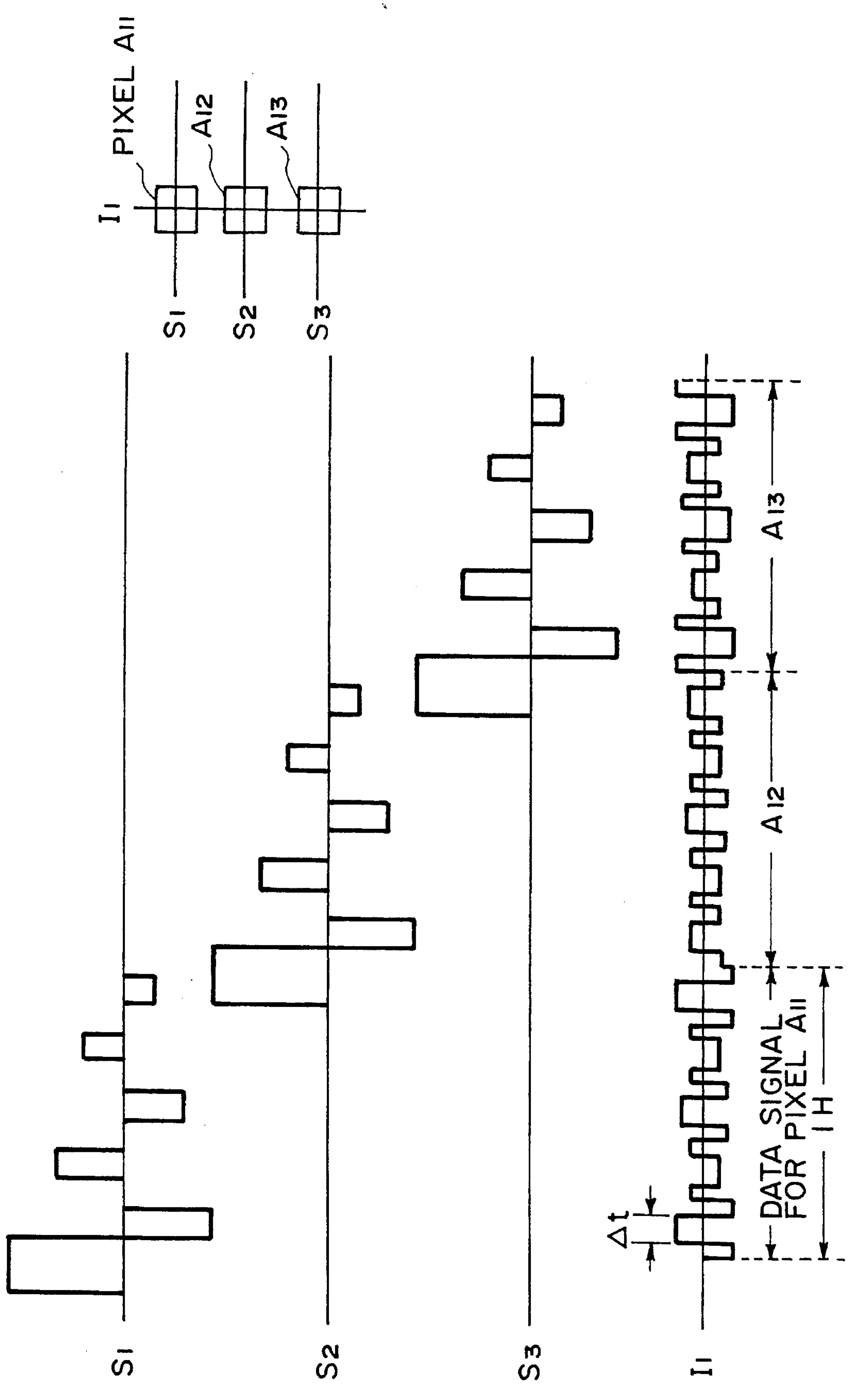
FIGS. 22 and 23 each are respective show an examples of time-serial waveform diagram used in matrix drive according to the second embodiment and a partial view of the matrix.

FIG. 22 is a set of time-serial driving waveforms based on signal waveforms shown in FIG. 21 are used in an apparatus shown in FIG. 10. Referring to FIG. 22, at $S_1$–$S_3$ are scanning signal waveforms applied to scanning electrodes $S_1$–$S_3$ and at $I_1$ is shown a data signal waveform applied to a data electrode $I_1$ in synchronism with the scanning signals $S_1$–$S_3$. As is apparent from the figure, a period 1H for display at one pixel is 10 times one writing pulse width (=Δt), i.e., 10Δt.

Figure 23:
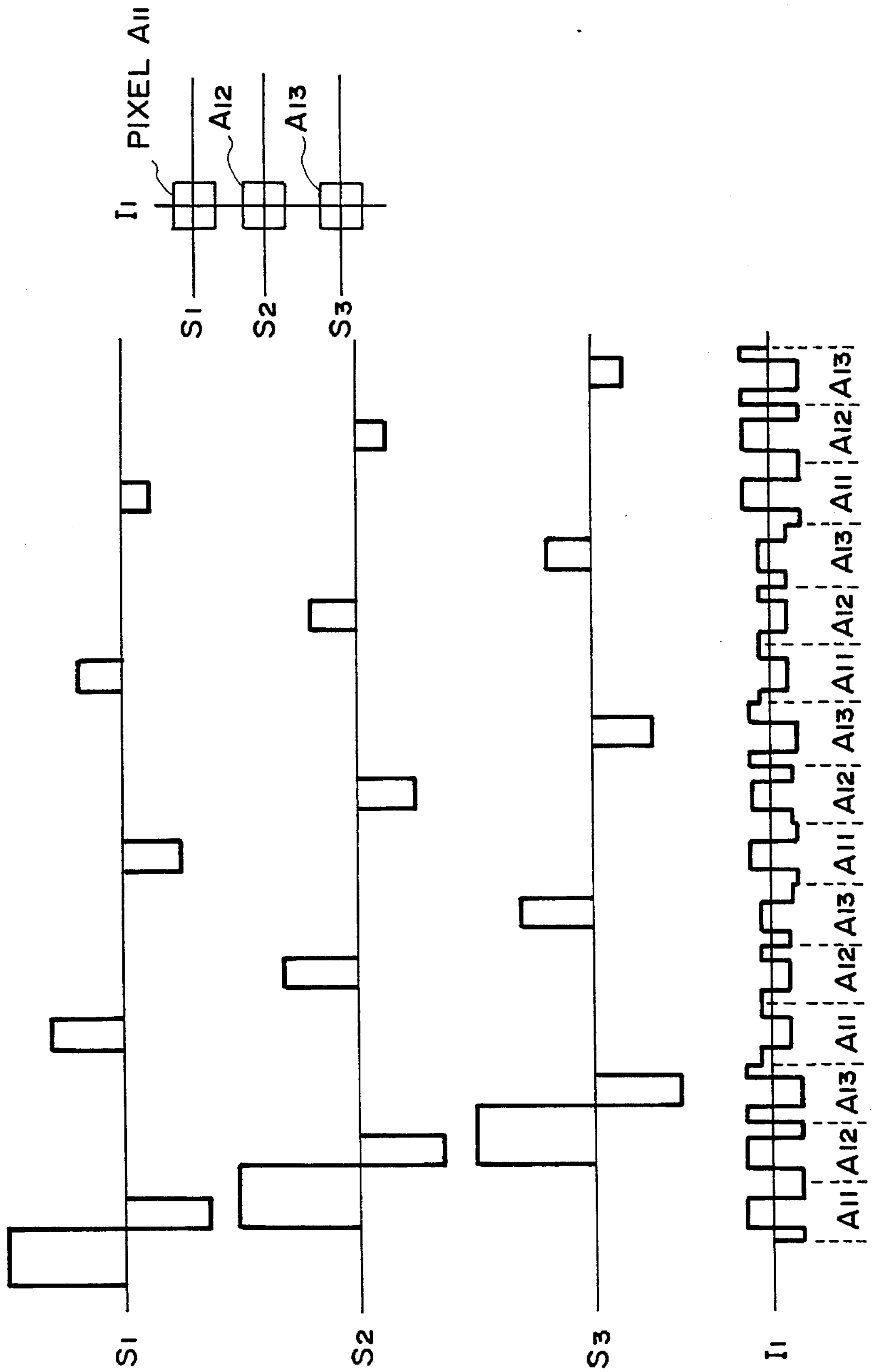

FIG. 23 is a set of time-serial waveforms in case where a pixel is not written continuously.

In the cases of FIGS. 21, 22 and 23, it is possible to effect a stable gradation display even if accompanied with a temperature difference of about 16° C., by using the following set of conditions:

ΔT=50 μ, $V_{1com}=24.0$ V<$V_{2com}=15.2$ V, $V_{3com}=13.5$ V, $V_{4com}=8.8$ V, $V_{5com}=7.1$ V, $V_{6com}=4.0$ V;

$|V_{2seg}| \leqq 3.5$ V, $|V_{3seg}| \leqq 1.7$ V, $|V_{4seg}| \leqq 3.2$ V, $|V_{5seg}| \leqq 1.7$ V, $|V_{6seg}| \leqq 1.7$ V.

Incidentally, if a pixel is divided into a plurality of sub-pixels and each sub-pixel is driven for display according to the above-described embodiment, a wider range of threshold change can be compensated. For example, a stable gradation display is possible even when accompanied with a temperature change of about 18° C. if a pixel is divided into two equal sub-pixels and about 19° C. if a pixel is divided into three equal sub-pixels.

Third Embodiment

According to a third embodiment of the present invention, a liquid crystal apparatus includes a display unit comprising a ferroelectric liquid crystal sandwiched between a pair of oppositely disposed electrode substrates so as to form a plurality of pixels each divided into plural (n≧20 sub-pixels of equal areas is driven for gradation display by plural steps of writing by application of sequentially polarity-inverted pulses to each sub-pixel, wherein each sub-pixel is selectively subjected depending on given gradation data to any one of a first gradation display sequence including sequential application of a pulse for resetting to a first stable state, a writing pulse, a compensation pulse and a pulse not associated with display, a second gradation display sequence including sequential application of a pulse for resetting to a first stable state, a pulse for resetting to a second stable state, writing pulse and a compensation pulse, and a uniform display sequence of sequentially applying pulses for resetting to a first or a second stable state.

In this embodiment, the above-mentioned gradation data may preferably be selected based on 100 ×m/n% and 100× m/(n+1)% (m=0, 1, 2 . . . n) assuming that the transmittance at a pixel is 0% in the darkest state and 100% in the brightest state. Further, the second and subsequent pulses may preferably be applied non-continuously, optimally with a spacing of at least 100 μs.

According to this embodiment, gradation display can be effected while compensating for fluctuation in threshold characteristic. This is explained with reference to FIGS. 11–13 already mentioned.

FIG. 11 is a graph showing a voltage (V) 5 transmittance (T) characteristic, in which transmittance axis (ordinate) is scaled at 0% in the darkest state (black) and at 100% in the brightest state (white), respectively, of a sub-pixel under drive.

With reference to FIG. 11, sub-pixels A and B having different V-T characteristics represented by curves a and b, respectively, which are linear within the transmittance region P–Q%, are taken for example. The sub-pixel A has a threshold voltage $X_O$, and $X_p$, $X_{p+\beta}$ and $X_Q$ represent voltages for writing P%, P+β% and Q%, respectively, in the sub-pixel A. $X_{100}$ denotes the saturation voltage of the sub-pixel A.

Sub-pixels having such threshold characteristics are supplied with waveforms shown at FIG. 12(1) and (2) including pulses P1–P4 having absolute values of $V_1$–$V_4$, respectively.

The case of applying the waveform at FIG. 12(1) is first described.

A sub-pixel A having a threshold characteristic represented by a curve a in FIG. 11 is supplied with a waveform at FIG. 12(1). As shown at (A-1) of FIG. 13, along with the application of signals P1–P4, the sub-pixel A is reset to black by pulse P1 and written by pulses P2 and P3, and the written gradation state of β% is retained even after the application of pulses P4. On the other hand, when a sub-pixel B having a threshold characteristic as represented by a curve b in FIG. 11 is supplied with a waveform at FIG. 12(1), the pixel state sequence as shown at FIG. 13 (B-1) results, whereby a gradation of β% similarly as the sub-pixel A is displayed with a parallel shift of a white region of β%.

Next, the case of applying the waveform at FIG. 12(2) will be described.

The sub-pixel A is supplied with a waveform of FIG. 12(2) whereby, along with application of pulses P1–P4 as shown at (A-2) of FIG. 13, the sub-pixel A is reset to black by pulse P1, reset to white by pulse P2 and written by pulses P3 and P4 to leave β% of black domain, thus providing a transmittance of 100-β%. Similarly, when the sub-pixel B is supplied with the waveform at FIG. 12(2), the pixel state sequence as shown at FIG. 13(B-2) results, whereby a gradation of 100-β% similarly as the sub-pixel A is displayed with a parallel shift of a black region of β%.

In the above-described manner, stable gradation display can be effected at each sub-pixel regardless of threshold change. As a result, in case of constituting one pixel with two sub-pixels (n=2), objective transmittances of α% are always displayed regardless of threshold changes at respective pixels by the following setting of value β and application of waveforms depending on the values of α.

(i) in case of 0≦α≦100/3,

The first sub-pixel is supplied with the waveform at FIG. 12(1) with β=α, and the second sub-pixel is supplied with the waveform at FIG. 12(1) with β=α, (ii) in case of 100/3≦α≦50

The first sub-pixel is supplied with the waveform at FIG. 12(2) with β=100–2α,

The second sub-pixel is supplied with the waveform at FIG. 12(1) with β=0, (iii) in case of 50≦α≦200/3

The first sub-pixel is supplied with the waveform at FIG. 12(1) with $\beta=2\alpha-100$, and the second sub-pixel is supplied with the waveform at FIG. 12(2) with $\beta=0$, (iv) in case of $200/3 \leqq \alpha \leqq 100$ The first sub-pixel is supplied with the waveform at FIG. 12(2) with $\beta=100-\alpha$, The second sub-pixel is supplied with the waveform at FIG. 12(2) with $\beta=100-\alpha$, The reason for the above will be understood from the following analysis.

(i) in the case of $0 \leqq \alpha \leqq 100/3$

The first sub-pixel shows a transmittance of $\alpha\%$ ($=\beta\%$) and the second sub-pixel shows a transmittance of $\alpha\%$ ($=\beta\%$), thus providing an overall transmittance through the whole pixel of $\alpha\%$.

(ii) in the case of $100/3 \leqq \alpha \leqq 50$

The first sub-pixel shows $2\alpha\%$ ($=100-\beta$) and the second sub-pixel shows 0% ($=\beta$), thus providing $\alpha\%$ for the whole pixel.

(iii) in the case of $50 \leqq \alpha \leqq 200/3$

The first sub-pixel shows $2\alpha-100\%$ ($=\beta$) and the second sub-pixel shows 100% ($=100-\beta$), thus providing $\alpha\%$ for the whole pixel.

(iv) in the case of $200/3 \leqq \alpha \leqq 100$

The first sub-pixel shows $\alpha\%$ ($=100-\beta$) and the second sub-pixel shows $\alpha\%$ ($=100-\beta$), thus providing $\alpha\%$ for the whole pixel.

Figure 24:
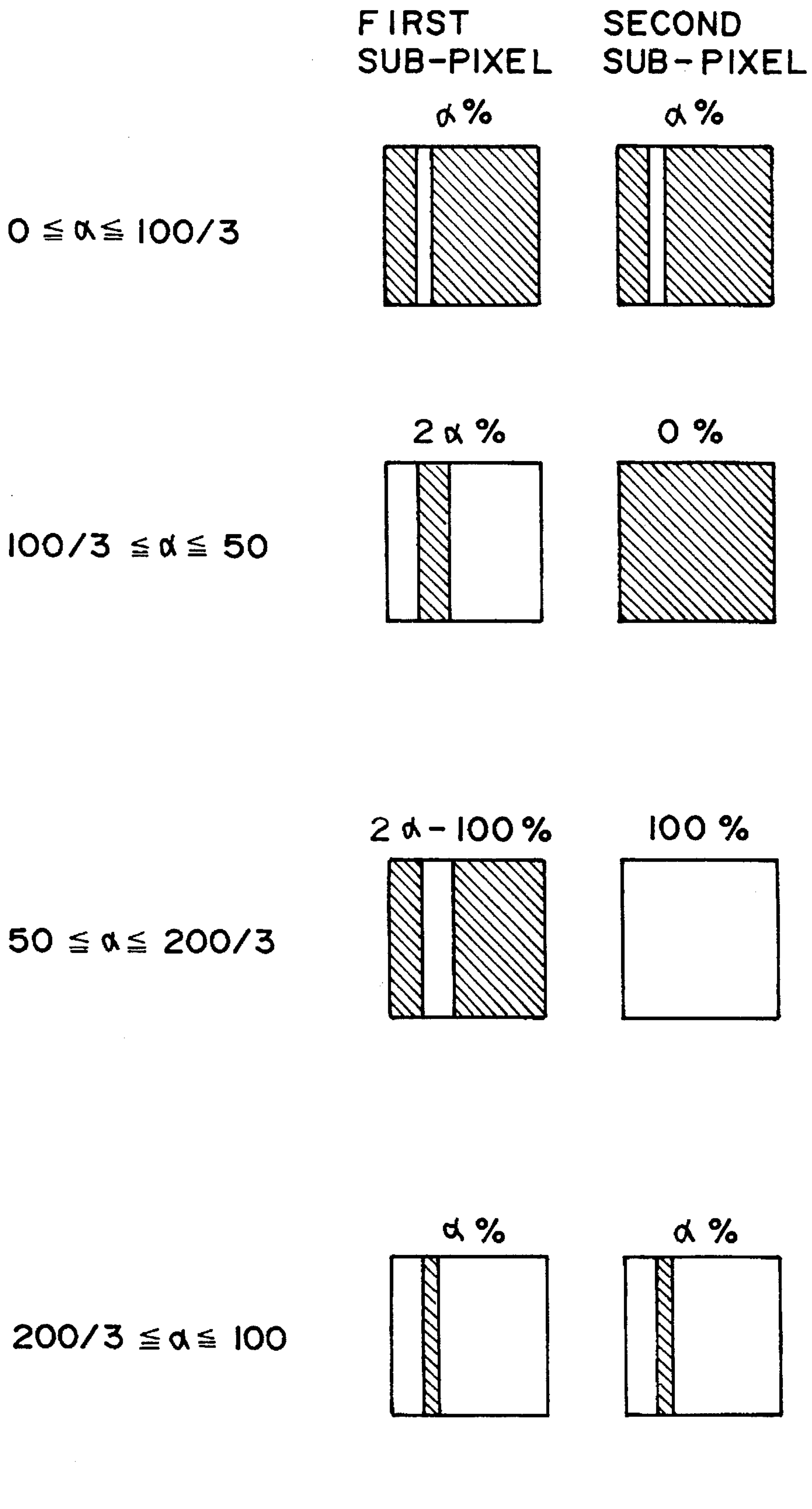
FIGS. 24 and 25 are respective plan views showing pixel states according to the third embodiment of the invention.

The appearances of the respective pixels in the above described states are shown in FIG. 24. In all the cases, $0 \leqq \beta \leqq 100/3$.

Further, in case of constituting one pixel with three sub-pixels (n=3), objective transmittances of $\alpha\%$ are always displayed regardless of threshold changes at respective pixels by the following setting of value $\beta$ and application of waveforms depending on the values of $\alpha$.

(i) in case of $0 \leqq \alpha \leqq 25$

The first sub-pixel is supplied with the waveform at FIG. 12(1) with $\beta=\alpha$, the second sub-pixel is supplied with the waveform at FIG. 12(1) with $\beta=\alpha$, and the third sub-pixel is supplied with the waveform at FIG. 12(1) with $\beta=\alpha$.

(ii) in case of $25 \leqq \alpha \leqq 100/3$

The first sub-pixel is supplied with the waveform at FIG. 12(2) with $\beta=100-3\alpha$, the second sub-pixel is supplied with the waveform at FIG. 12(1) with $\beta=0$, and the third sub-pixel is supplied with the waveform at FIG. 12(1) with $\beta=0$.

(iii) in case of $100/3 \leqq \alpha \leqq 50$

The first sub-pixel is supplied with the waveform at FIG. 12(1) with $\beta=(3\alpha-100)/2$ the second sub-pixel is supplied with the waveform at FIG. 12(1) with $\beta=(3\alpha-100)/2$, and the third sub-pixel is supplied with the waveform at FIG. 12(2) with $\beta=0$.

(iv) in case of $50 \leqq \alpha \leqq 200/3$

The first sub-pixel is supplied with the waveform at FIG. 12(2) with $\beta=100-3\alpha/2$, the second sub-pixel is supplied with the waveform at FIG. 12(2) with $\beta=100-3+/2$, and the third sub-pixel is supplied with the waveform at FIG. 12(1) with $\beta=0$.

(v) in case of $200/3 \leqq \alpha \leqq 75$

The first sub-pixel is supplied with the waveform at FIG. 12(1) with $\beta=3\alpha-200$, the second sub-pixel is supplied with the waveform at FIG. 12(2) with $\beta=0$, and the third sub-pixel is supplied with the waveform at FIG. 12(2) with $\beta=0$.

(vi) in case of $75 \leqq \alpha \leqq 100$

The first sub-pixel is supplied with the waveform at FIG. 12(2) with $\beta=100-\alpha$, the second sub-pixel is supplied with the waveform at FIG. 12(2) with $\beta=100-\alpha$, and the third sub-pixel is supplied with the waveform at FIG. 12(2) with $\beta=100-\alpha$.

The reason for the above is analyzed as follows.

(i) in the case of $0 \leqq \alpha \leqq 25$

The first sub-pixel shows $\alpha\%$, the second sub-pixel shows $\alpha\%$ and the third sub-pixel shows $\alpha\%$, thus providing $\alpha\%$ for the whole pixel.

(ii) in the case of $25 \leqq \alpha \leqq 100/3$

The first sub-pixel shows $3\alpha\%$, the second sub-pixel shows 0%, and the third sub-pixel shows 0%, thus providing $\alpha\%$ for the whole pixel.

(iii) in the case of $100/3 \leqq \alpha \leqq 50$

The first sub-pixel shows $(3\alpha-100)/2\%$, the second sub-pixel shows $(3\alpha-100)/2\%$, and the third sub-pixel shows 100%, thus providing $\alpha\%$ for the whole pixel.

(iv) in the case of $50 \leqq \alpha \leqq 200/3$

The first sub-pixel shows $3\alpha/2\%$, the second sub-pixel shows $3\alpha/2\%$ and the third sub-pixel shows 0%, thus providing $\alpha\%$ for the whole pixel.

(v) in the case of $200/3 \leqq \alpha \leqq 75$

The first sub-pixel shows $3\alpha-200\%$, the second sub-pixel shows 100%, and the third sub-pixel shows 100%, thus providing $\alpha\%$ for the whole pixel.

(vi) in the case of $75 \leqq \alpha \leqq 100$

The first sub-pixel shows $\alpha\%$, the second sub-pixel shows $\alpha\%$, and the third sub-pixel shows $\alpha\%$, thus providing $\alpha\%$ for the whole pixel.

Figure 25:
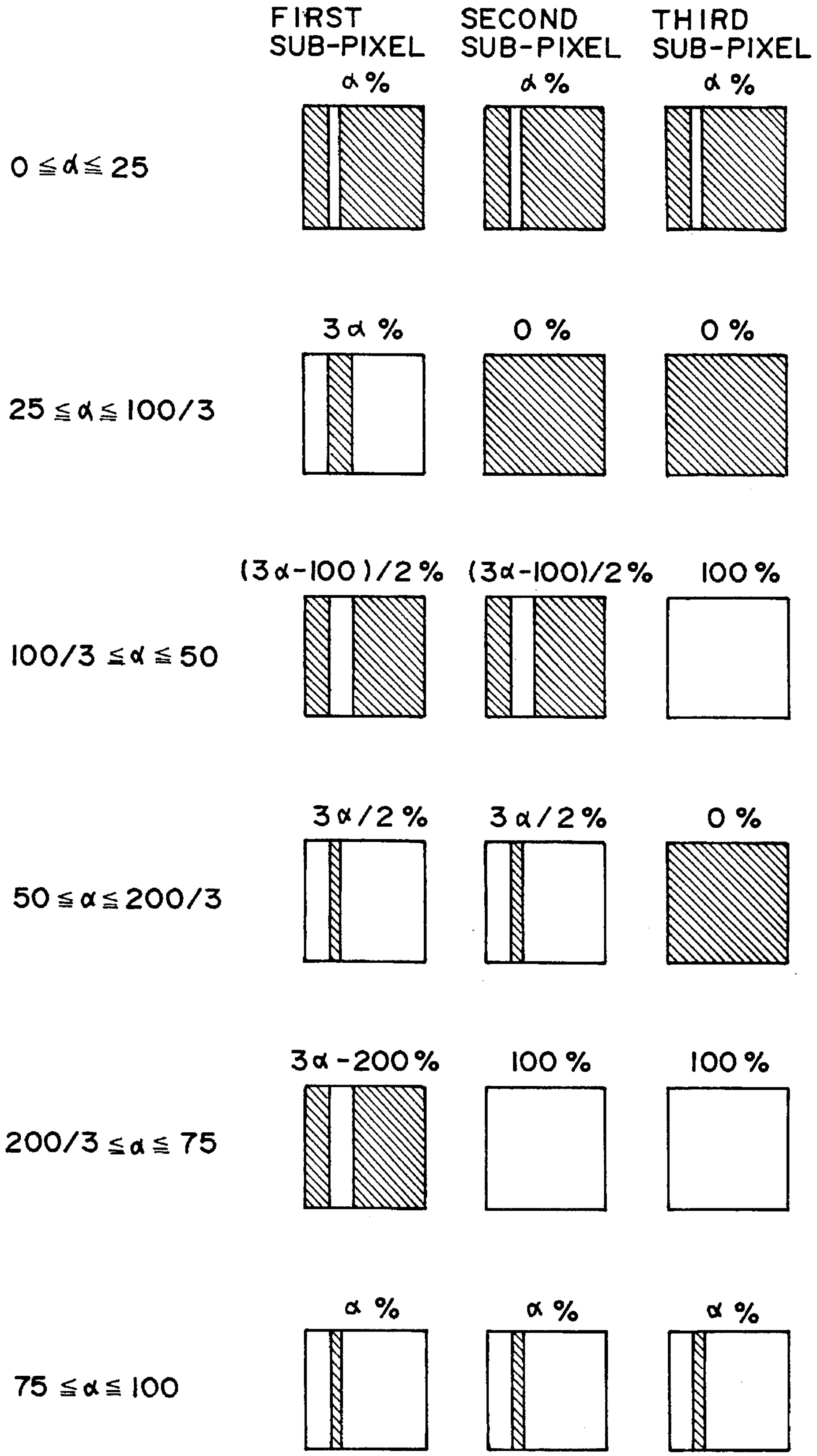

The appearances of the respective pixels in the above-described states are shown in FIG. 25. In all the cases, $0 \leqq \beta \leqq 25$.

The above-mentioned embodiment of compensated gradation display method exhibit the utmost compensation effect under the following conditions:

(1) The threshold characteristic curve (V-T curve) has an approximately linear portion. A larger proportion of the linear portion provides a wider range of complete compensation.

(2) The threshold characteristic change due to, e.g., an environmental temperature change or a temperature distribution over a panel, may be represented by a parallel shift along a coordinate axis, which may have a linear scale or logarithmic scale.

(3) In case of writing with pulse P2 or P3 with reference to FIGS. 11 and 12, the transmittances P and Q and the threshold shift $X_{shift}$ between sub-pixels A and B satisfy the following relations:

$$Q \geqq P+\beta$$

$$X_Q - X_{P+\beta} \geqq X_{shift}.$$

In this instance, a smaller $X_{P+\beta}$ provides a large range of compensation, so that a smaller value of $\beta$ is desirable. In the case of division into n sub-pixels, the range allowed for $\beta$ for displaying $\alpha\%$ is expressed by $0 \leqq \beta \leqq 100/(n+1)$, so that it will be understood that the division into a large number of sub-pixels provide a larger range of compensation.

(4) The transmittance in response to a pulse below $X_{100}$ can be calculated by addition and/or subtraction. More specifically, a pixel having a transmittance of 0%, when supplied sequentially with a 60% white-writing pulse and a 30% black-writing pulse, is approximately caused to have a transmittance of 30% (=60–30%).

An example of the liquid crystal device satisfying the above-mentioned conditions may be obtained by using a multi-component liquid crystal composition comprising a phenyl benzoate liquid crystal as a principal constituent and subjected to a voltage treatment.

Next, a case of applying combined voltage waveforms as shown at FIGS. 12(1) and (2) by using an electrode matrix will be described. As mentioned above, the range allowed for β in case of division into n sub-pixels, the range allowed for β is expressed by $0 \leqq \beta \leqq 100/(n+1)$. Accordingly, in case of two-division, $0 \leqq \beta \leqq 100/3$ and, in case of three-division, $0 \leqq \beta \leqq 25$.

The case of two-division is first described.

Pulse P1 .for resetting all the pixels on a scanning line has an amplitude $$V_1 \geqq X_{100},$$

pulse P2 for writing P+β% in sub-pixel A or setting sub-pixel A to white satisfies $$X_P \leqq V_2 \leqq X_{P+}100/3 \text{ or } V_2 \geqq X_{100},$$

pulse P3 for writing P% or P+β% in sub-pixel A satisfies $$V_3 = X_P \text{ or } X_P \leqq V_3 \leqq X_{P+50}, \text{ and}$$

pulse P4 for not writing in sub-pixel A or writing P% in sub-pixel A (with the proviso that X shift $\leqq X_Q - X_{P+\ 100/3}$) satisfies $$V_4 \leqq X_0 - (X_1 - X_{P+}100/3) \text{ or } V_4 = X_P.$$

Next, the case of three division is described.

Pulse P1 for resetting all the pixels on a scanning line has an amplitude $$V_1 \geqq X_{100},$$

pulse P2 for writing P+β% in sub-pixel or setting a sub-pixel to white satisfies $$X_P \leqq V_2 \leqq X_{P+25} \text{ or } V_2 \geqq X_{100},$$

pulse P3 for writing P% or P+α% in sub-pixel satisfies $$V_3 = X_P \text{ or } X_P \leqq V_3 \leqq X_{P+25}, \text{ and}$$

pulse P4 for not writing in sub-pixel or writing P% in a sub-pixel (with the proviso that X shift $\leqq X_Q - X_{P+25}$) satisfies $$V_4 \leqq X_0 - (X_1 - X_{P+25}) \text{ or } V_4 = X_P.$$

Figure 26:
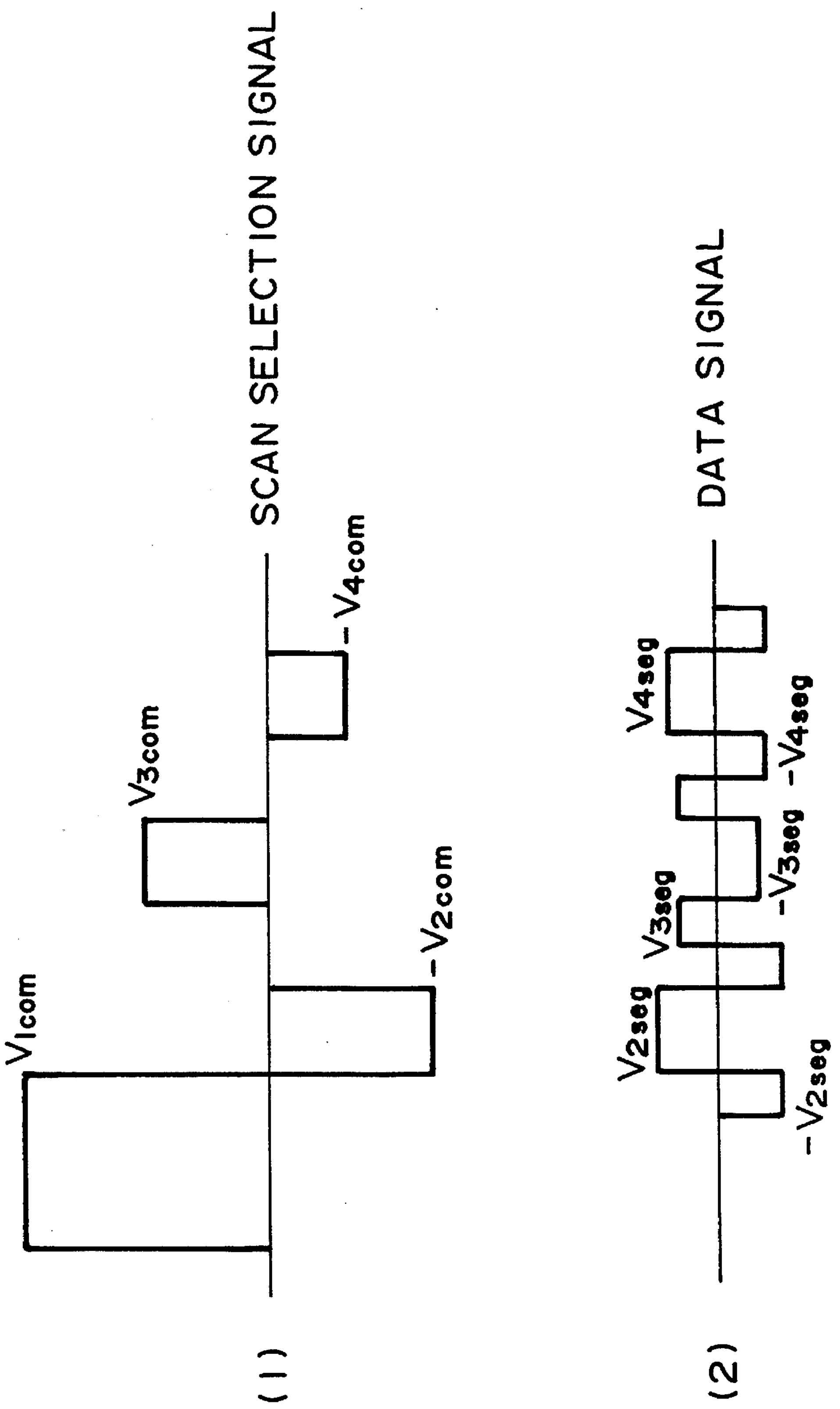
FIG. 26 is a waveform diagram showing drive signals used in matrix drive according to the third and fourth embodiments of the invention.

FIG. 26 shows an example of a scanning selection signal (1) and a data signal (2) satisfying the above-mentioned requirements.

In FIG. 26, the respective signals have the following amplitudes:

$$V_{1com} = 1.3X_{100}$$

$$V_{2com} = \tfrac{1}{2}(X_{100} + X_P)$$

$$V_{3com} = \tfrac{1}{2}(X_{P+100/3} + X_P)$$

$$V_{4com} = \tfrac{1}{2}[X_P + \{X_0 - (X_Q - X_{P+100/3})\}] - \tfrac{1}{2}(X_{100} - X_P) \leqq V_{2seg} \leqq \tfrac{1}{2}(X_{100} - X_P) - \tfrac{1}{2}(X_{P+100/3} - X_P \leqq V_{3seg} \leqq \tfrac{1}{2}(X_{P+100/3} - X_P) - \tfrac{1}{2}[X_P - \{X_0 - (X_Q - X_{P+100/3})\}] \leqq V_{4seg} \leqq \tfrac{1}{2}[X_P - \{X_0 - (X_Q - X_{P+100/3})\}].$$

or $$V_{1com} = 1.3X_{100}$$

$$V_{2com} = \tfrac{1}{2}(X_{100} + X_P)$$

$$V_{3com} = \tfrac{1}{2}(X_{P+25} + X_P)$$

$$V_{4com} = \tfrac{1}{2}[X_P + \{X_0 - (X_Q - X_{P+25})\}] - \tfrac{1}{2}(X_{100} - X_P) \leqq V_{2seg} \leqq \tfrac{1}{2}(X_{100} - X_P) - \tfrac{1}{2}(X_{P+25} - X_P \leqq V_{3seg} \leqq \tfrac{1}{2}(X_{P+25} - X_P) - \tfrac{1}{2}[X_P - \{X_0 - (X_Q - X_{P+50})\}] \leqq V_{4seg} \leqq \tfrac{1}{2}[X_P - \{X_0 - (X_Q - X_{P+50})\}].$$

Further, in order to retain the transmittance at pixel β in a scanning non-selection period, the following conditions must be satisfied:

$$X_0 - X_{Shift} \geqq V_{2seg}$$

$$X_0 - X_{Shift} \geqq V_{3seg}$$

$$X_0 - X_{Shift} \geqq V_{4seg}.$$

Figure 27A:
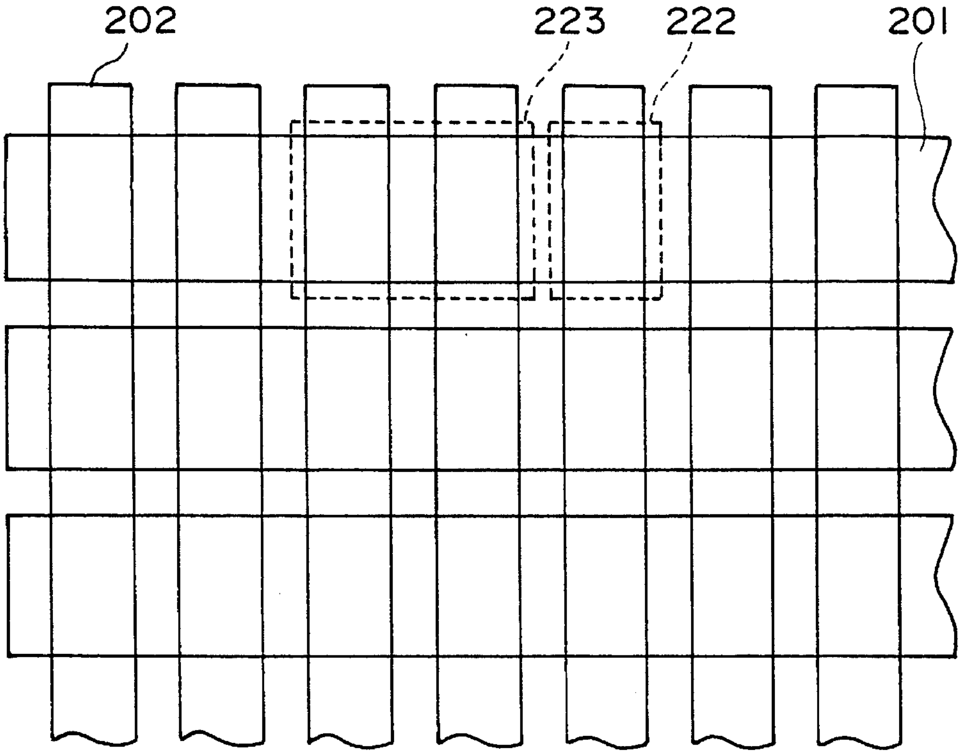
FIGS. 27A and 27B are respective schematic plan views showing a matrix electrode pattern used in the third embodiment of the invention.
Figure 27B:
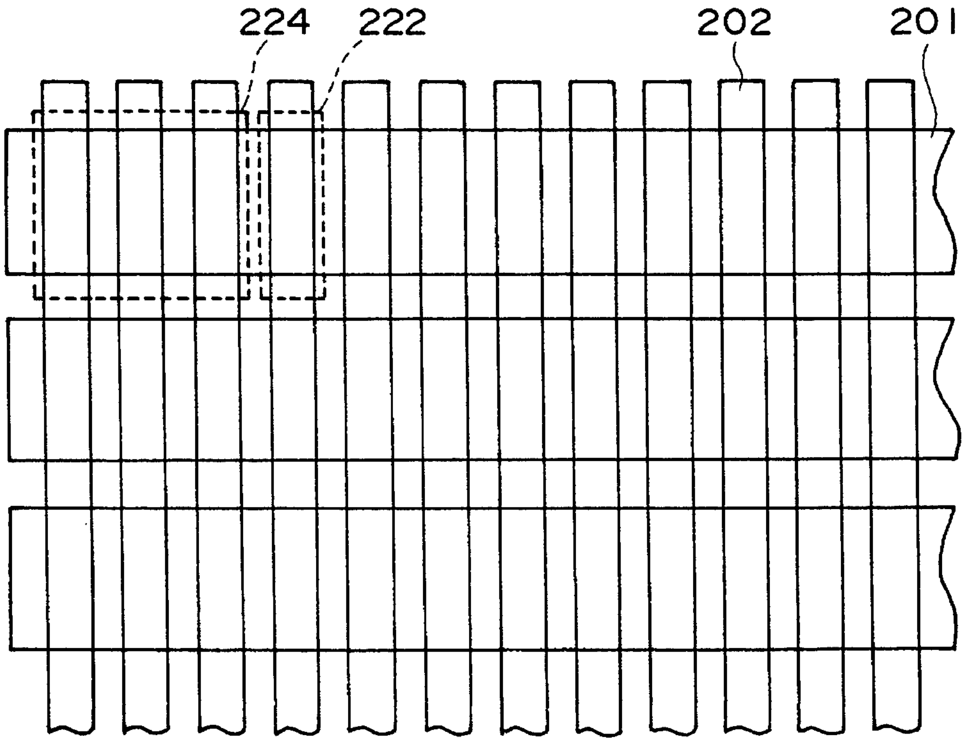

FIG. 27A and 27B are respectively an enlarged partial view of a liquid crystal display unit (panel) 101 in FIG. 10. FIG. 27A shows a panel in which one pixel 223 is constituted by two sub-pixels 222, and FIG. 27B shows a panel in which one pixel 224 is constituted by three sub-pixels 222. Each sub-pixels 222 is constituted at an intersection of a scanning electrode 201 and a data electrode 202.

Figure 28:
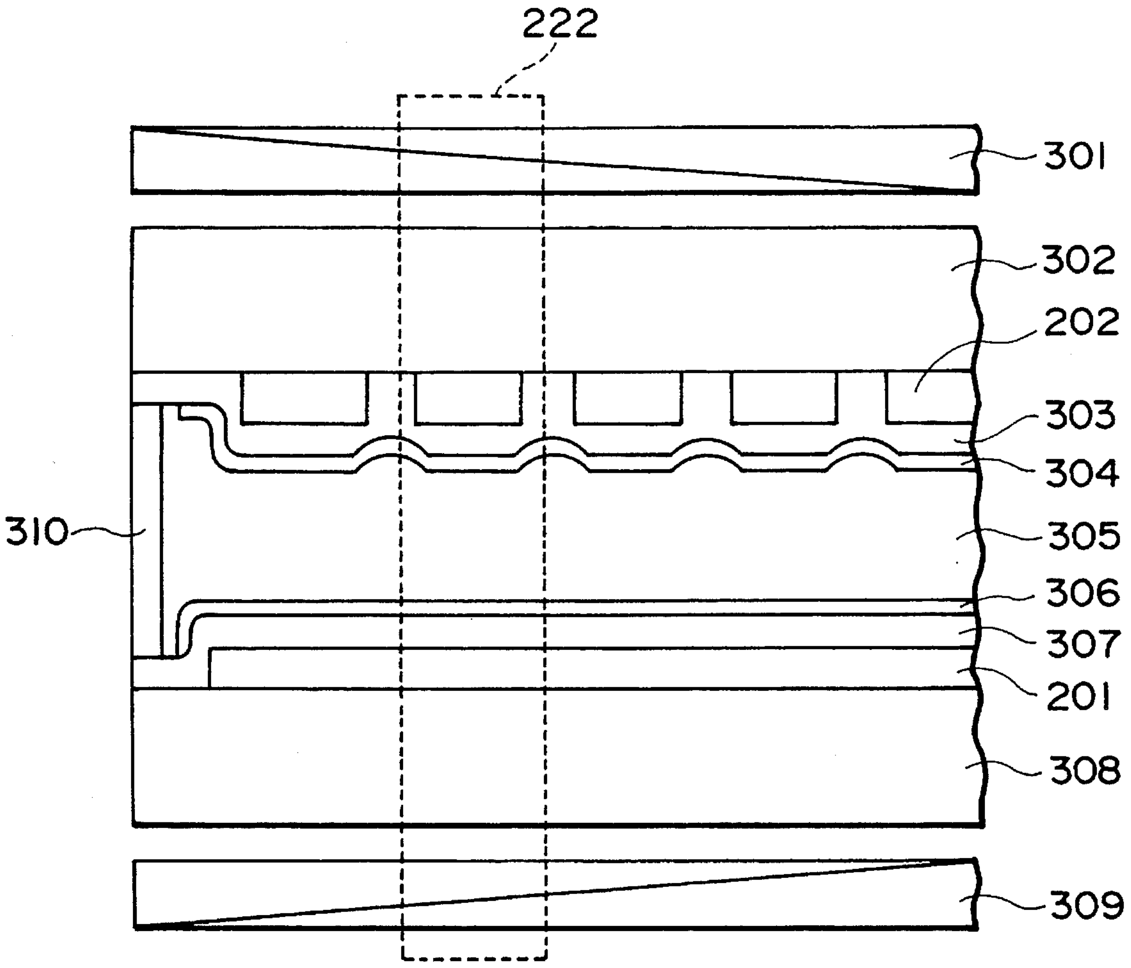
FIG. 28 is a schematic sectional view of a liquid crystal device used in the third and fourth embodiments of the invention.

FIG. 28 is a partial sectional view of the liquid crystal display panel 101, which is constituted by a pair of glass substrates 302 and 308 having thereon scanning electrodes 201 and data electrodes 202, respectively, coated with insulating films 303 and 307 and alignment films 304 and 306, and applied to each other with a ferroelectric liquid crystal 305 disposed therein and sealed with a sealing member 310.

Figure 29:
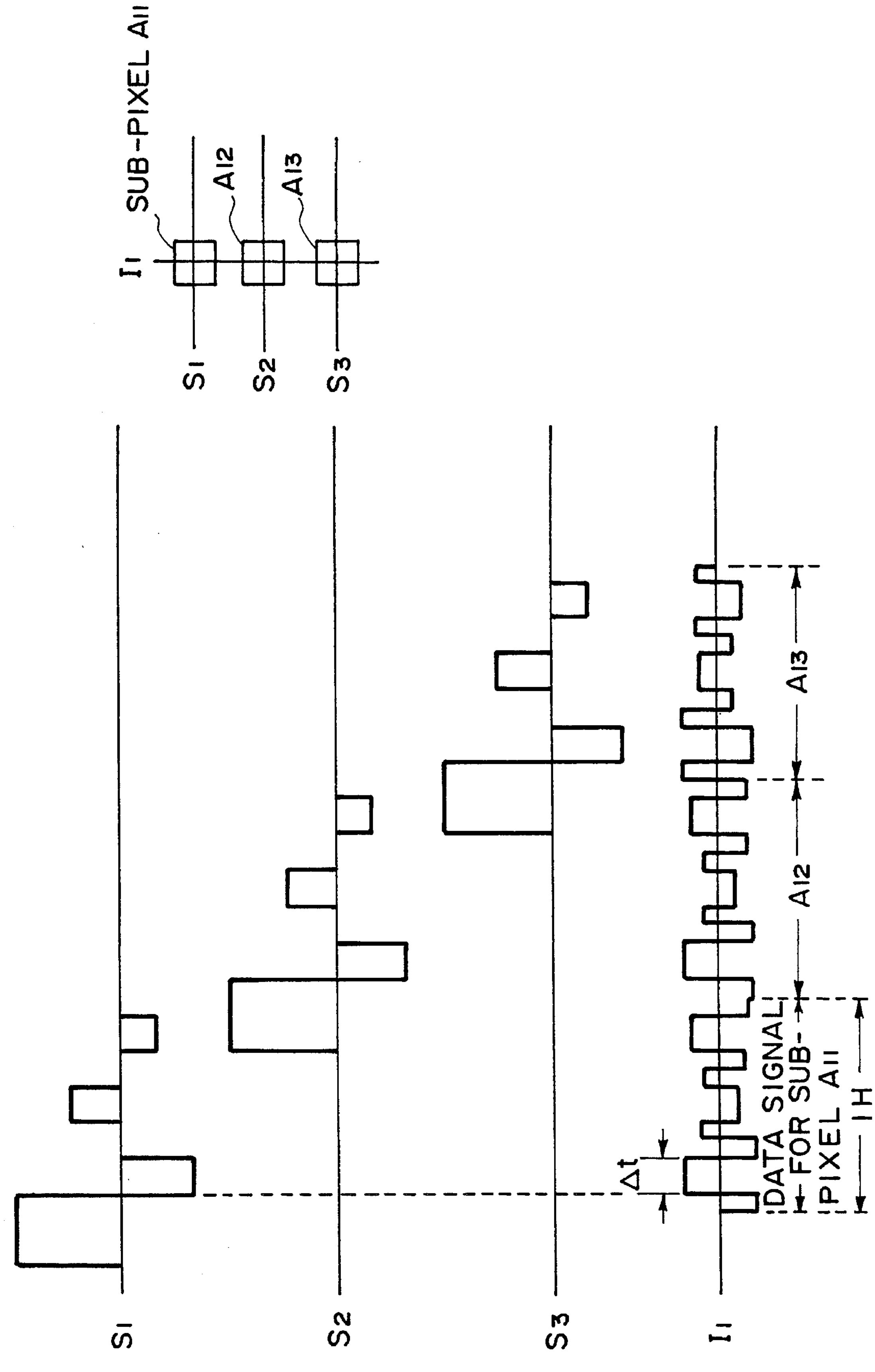
FIGS. 29 and 30 each are respective examples of time-serial waveform diagram used in matrix drive according to the third and fourth embodiments and a partial view of the matrix.

FIG. 29 is a set of time-serial driving waveforms based on signal waveforms shown in FIG. 14 and applied to the device of FIG. 27A or FIG. 27B. Referring to FIG. 29, at $S_1$–$S_3$ are scanning signal waveforms applied to scanning electrodes $S_1$–$S_3$ and at $I_1$ is shown a data signal waveform applied to a data electrode $I_1$ in synchronism with the scanning signals $S_1$–$S_3$. As is apparent from the figure, a period 1H for display at one sub-pixel is 6 times one writing pulse width (=βt), i.e., 6Δt.

Figure 30:
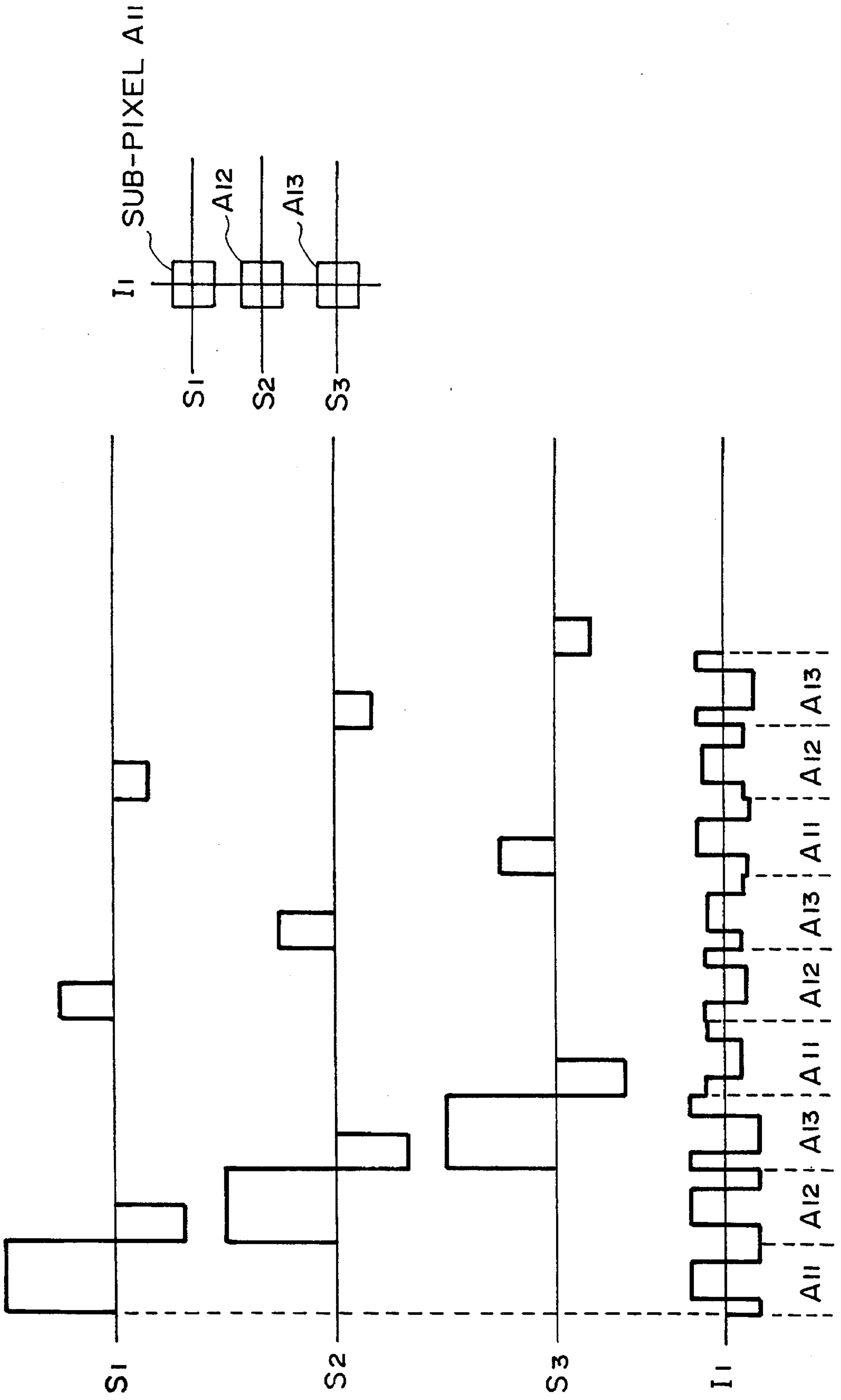

FIG. 30 is a set of time-serial waveforms in case where a sub-pixel is not written continuously.

In the case of division into two sub-pixels with reference to FIGS. 26, 29 and 30, it is possible to effect a stable gradation display even if accompanied with a temperature difference of about 6° C., by using the following set of conditions:

$$\Delta T = 50\ \mu s,$$

$$V_{1com} = 24.0\ V,\ V_{2com} = 15.2\ V,\ V_{3com} = 13.0\ V,\ V_{4com} = 9.7\ V,$$

$$|V_{2seg}| \leqq 3.5\ V,\ |V_{3seg}| \leqq 1.3\ V,\ |V_{4seg}| \leqq 2.6\ V.$$

Further, in the case of division into three sub-pixels with reference to FIGS. 26, 29 and 30, it is possible to effect a stable gradation display even if accompanied with a temperature difference of about 7° C., by using the following set of conditions:

$\Delta T$=50 μs, $V_{1com}$=24.0 V, $V_{2com}$=15.2 V, $V_{3com}$=12.7 V, $V_{4com}$=9.4 V, $|V_{2seg}|\leqq 3.5$ V, $|V_{3seg}|\leqq 1.0$ V, $|V_{4seg}|\leqq 2.8$ v.

Fourth Embodiment

According to a fourth embodiment of the present invention, a liquid crystal apparatus includes a display unit comprising a ferroelectric liquid crystal sandwiched between a pair of oppositely disposed electrode substrates so as to form a plurality of pixels each divided into plural ($n\geqq 2$) sub-pixels of different areas with ratios of 1:2:4: . . . : $2^{n-1}$ is driven for gradation display by plural steps of writing by application of sequentially polarity-inverted pulses to each sub-pixel, wherein each sub-pixel is selectively subjected depending on given gradation data to any one of a first gradation display sequence including sequential application of a pulse for resetting to a first stable state, a writing pulse, a compensation pulse and a pulse not associated with display, a second gradation display sequence including sequential application of a pulse for resetting to a first stable state, a pulse for resetting to a second stable state, a writing pulse and a compensation pulse, and a uniform display sequence of sequentially applying pulses for resetting to a first or a second stable state.

In this embodiment, the above-mentioned gradation data may preferably be selected based on $100\times m/(2^{n-1})$% and $100\times m/2^n$% (m=0, 1, 2 . . . n) assuming that the transmittance at a pixel is 0% in the darkest state and 100% in the brightest state. Further, the second and subsequent pulses may preferably be applied non-continuously, optimally with a spacing of at least 100 μs.

According to this embodiment, gradation display can be effected while compensating for fluctuation in threshold characteristic. This is explained with reference to the drawings.

Sub-pixels are assumed to have a voltage (V) —transmittance (T) characteristic as shown in FIG. 11, in which transmittance axis (ordinate) is scaled at 0% in the darkest state (black) and at 100% in the brightest state (white), respectively, of a sub-pixel under drive.

With reference to FIG. 11, sub-pixels A and having different V-T characteristics represented by curves a and b, respectively, which are linear within the transmittance region P–Q%, are taken for example. The sub-pixel A has a threshold voltage $X_O$, and $X_P$, $X_{P+\beta}$ and $X_Q$ represent voltages for writing P%, P+β% and Q%, respectively, in the sub-pixel A. $X_{100}$ denotes the saturation voltage of the sub-pixel A.

Sub-pixels having such threshold characteristics are supplied with waveforms shown at FIG. 12(1) and (2) including pulses P1–P4 having absolute values of $V_1$–$V_4$, respectively.

The case of applying the waveform at FIG. 12(1) is first described.

A sub-pixel A having a threshold characteristic represented by a curve a in FIG. 11 is supplied with a waveform at FIG. 12(1). As shown at (A-1) of FIG. 13, along with the application of signals P1–P4, the sub-pixel A is reset to black by pulse P1 and written by pulses P2 (turning P+β% into white) and P3 (turning P% into white), and the written gradation state of β% is retained even after the application of pulses P4. On the other hand, when a sub-pixel B having a threshold characteristic as represented by a curve b in FIG. 11 is supplied with a waveform at FIG. 12(1), the pixel state sequence as shown at FIG. 13 (B-1) results, whereby a gradation of β% similarly as the sub-pixel A is displayed with a parallel shift of a white region of β%.

Next, the case of applying the waveform at FIG. 12(2) will be described.

The sub-pixel A is supplied with a waveform at FIG. 12(2) whereby, along with application of pulses P1–P4 as shown at (A-2) of FIG. 13, the sub-pixel A is reset to black by pulse P1, reset to white by pulse P2 and written by pulses P3 (turning P+β% into black) and P4 (turning P% into white) to leave β% of black domain, thus providing a transmittance of 100-β%. Similarly, when the sub-pixel B is supplied with the waveform at FIG. 12(2), the pixel state sequence as shown at FIG. 13(B-2) results, whereby a gradation of 100-β% similarly as the sub-pixel A is displayed with a parallel shift of a black region of β%.

In this way, each sub-pixel can effect good gradation display regardless of change in threshold characteristic. This embodiment of compensated gradation display method exhibits the utmost compensation effect under the following conditions:

(1) The threshold characteristic curve (V-T curve) has an approximately linear portion. A larger proportion of the linear portion provides a wider range of complete compensation.

(2) The threshold characteristic change due to, e.g., an environmental temperature change or a temperature distribution over a panel, may be represented by a parallel shift along a coordinate axis, which may have a linear scale or logarithmic scale.

(3) In case of writing with pulse P2 or P3 with reference to FIGS. 11 and 12, the transmittances P and Q and the largest threshold shift $V_{shift}$ between two sub-pixels satisfy the following relations:

$$Q\geqq P+\beta$$

$$X_Q-X_{P+\beta}\geqq X_{shift}.$$

(4) The transmittance in response to a pulse below $X_{100}$ can be calculated by addition and/or subtraction. More specifically, a pixel having a transmittance of 0%, when supplied sequentially With a 60% white-writing pulse and a 30% black-writing pulse, is approximately caused to have a transmittance of 30% (=60–30%).

The above condition (3) shows that a smaller $X_{P+\beta}$ provides a broader range of compensation. Hereinbelow, a technique for decreasing the maximum value of β will be described. Herein, “white” represents a bright state, “black” represents a dark state, “whole white” represents that a pixel or sub-pixel is wholly in the bright state, and “whole black” represents that a pixel or sub-pixel is wholly in the dark state.

Figure 31:
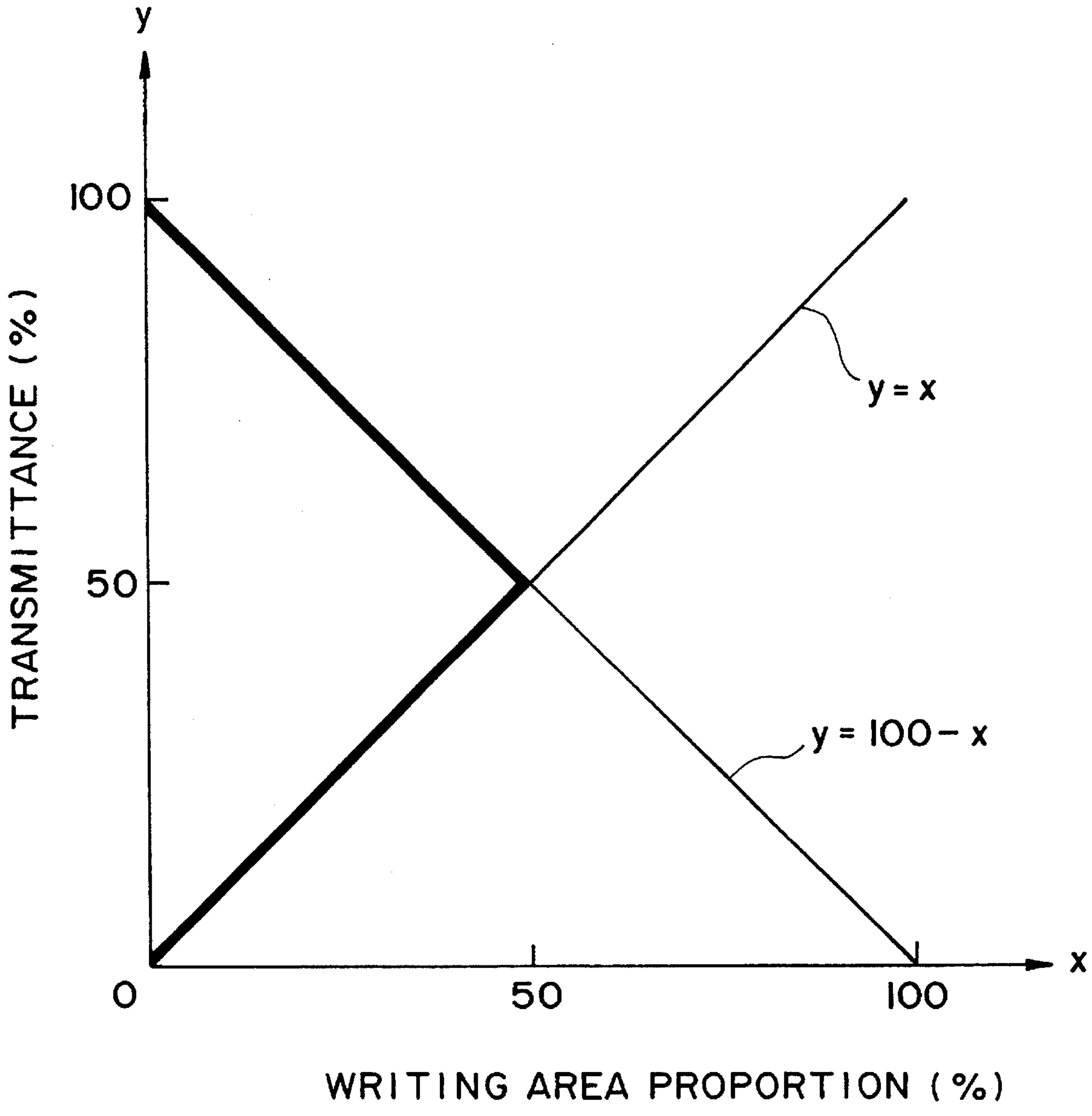
FIGS. 31–36 are respective graphs for illustrating a driving method according to the third or fourth embodiment of the invention.
Figure 32:
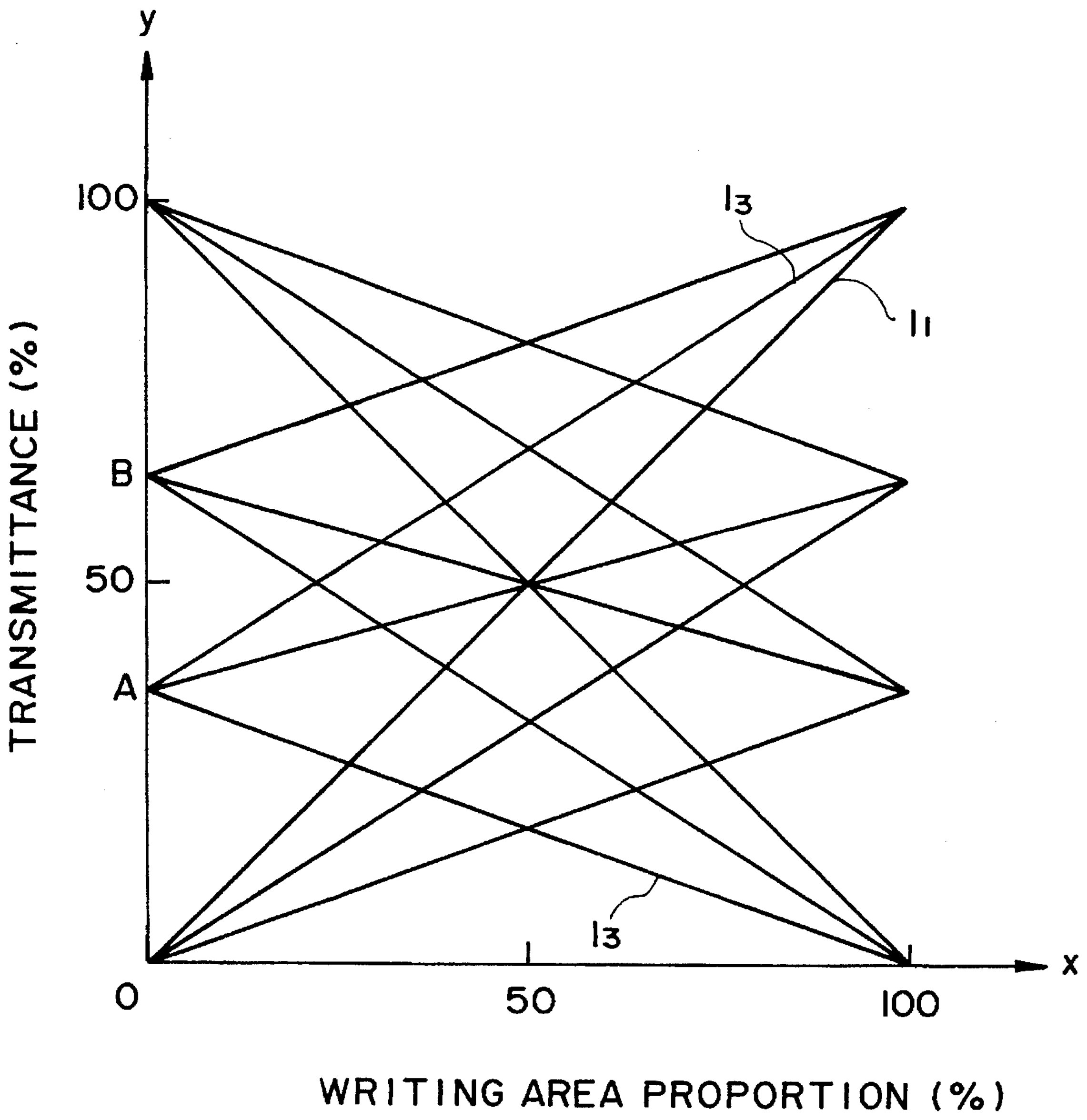

In case where a pixel is not divided, assuming that the wholly white state provides a transmittance of 100%, the following relationship exists between a white-written area ratio x% after the black reset and a transmittance, $$y=x(0\leqq y\leqq 100,\ 0\leqq x\leqq 100)$$

and a black-written area ratio x % after white reset and a transmittance y % show a relationship of $y=100-x.$ This is illustrated in FIG. 31. In this instance, a transmittance of at most 50% is displayed by resetting to whole black and then writing white, and a transmittance of at least 50% is displayed by resetting to whole white and then writing black. As a result, a thick line portion in FIG. 31 is used, and a transmittance in the range of 0–100% is displayed while suppressing the writing area ratio to at most 50%. In FIG. 31, one line (segment) means one drive means, and an intersection of two lines represent a point at which the drive means is changed. An important point of this technique is that, if an identical transmittance can be displayed by using different drive means, one of the drive means requiring a smaller writing area ratio is used. In other words, a transmittance y in the range of $0 \leqq y \leqq 100$ is displayed by always using a line closer to the y axis in FIG. 31.

Figure 33:
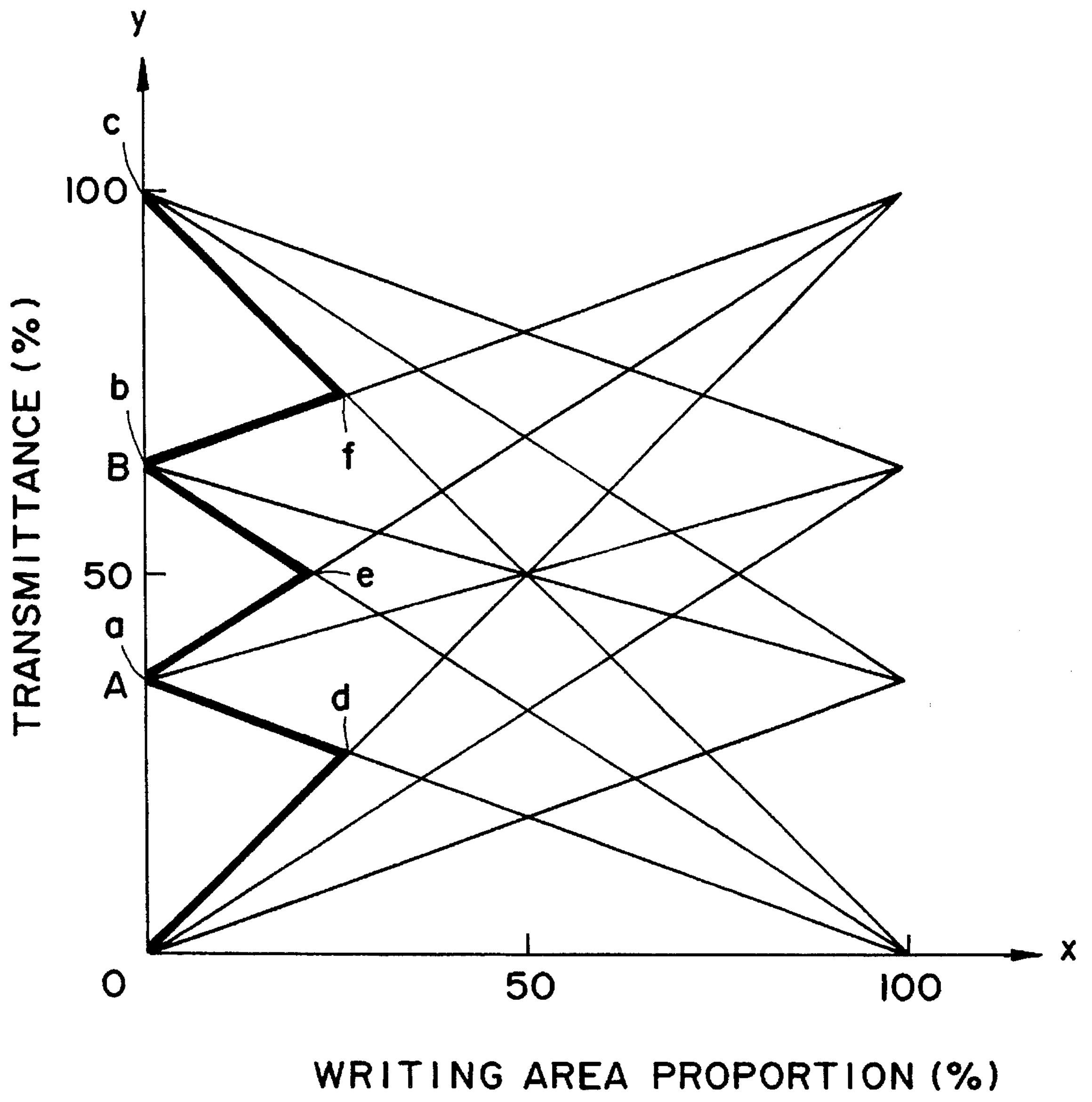

Next, when a pixel is divided into two sub-pixels a and h in an areal ratio of A:B ($A \leqq B$, A+B =100), various lines each representing a drive means are drawn. For example, a line $l_1$ represents a means for resetting both sub-pixels to whole black and then writing x% of white in each sub-pixel; a line $l_2$ represents a means for keeping sub-pixel a in whole white and resetting sub-pixel b to whole black and then writing x% of white in the sub-pixel b; and a line $l_3$ represents a means for keeping sub-pixel b in whole black and resetting sub-pixel a to whole white and then writing x% of black in the sub-pixel a. In this instance, a transmittance y in the range of $0 \leqq y \leqq 100$ may be displayed by thick lines in FIG. 33 as lines closer to the y axis. In FIG. 33, points a–f are intersections of lines, and respective line segments may be represented by the following formulae:

segment od: $y=x$, segment ad: $y=-(A/100)x+A$ segment ae: $y=(B/100)x+A$ segment be: $y=-(B/100)x+B$ segment bf: $y=(A/100)x+B$ segment cf: $y=100-x$.

As a result, the intersections d, e and f find coordinates as follows:

$$d\equiv(dx, dy)=(100A/(100+A), 100A/(100+A))$$

$$e\equiv(ex, ey)=(50(100-2A)/(100-A), 50)$$

$$f\equiv(fx, fy)=(100A/(100+A), 10000/(100+A))$$

Figure 34:
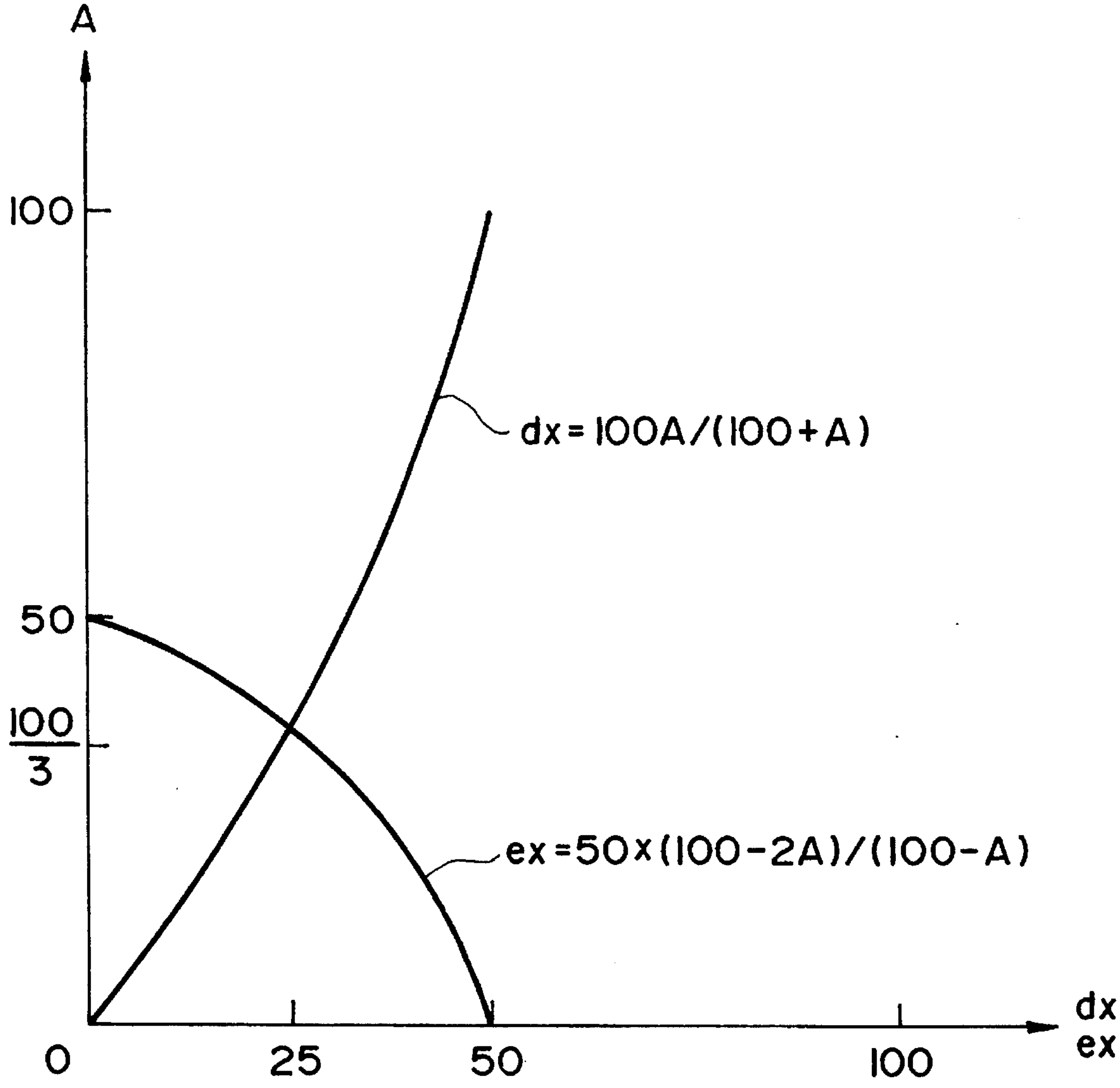

The largest one of dx, ex and fx provides a maximum of x. As is understood from curves dx= 100A/(100+A) and ex=50(100-2A)/(100-A) shown in FIG. 34, the largest value of x becomes minimum when dx=ex=fx. At this time, dx=ex=fx=25 and A= 100/3. Thus, B=100×⅔. In other words, the writing area proportion x becomes minimum when a pixel is divided into two sub-pixels in an areal ratio of 1:2. As a result, a transmittance y in the range of 0 –100% can be displayed by a change of x in the range of 0–25%. It is important in this technique to set a pixel division ratio so that the x-coordinates of the respective intersections for switching between drive means are equal to each other.

Figure 35:
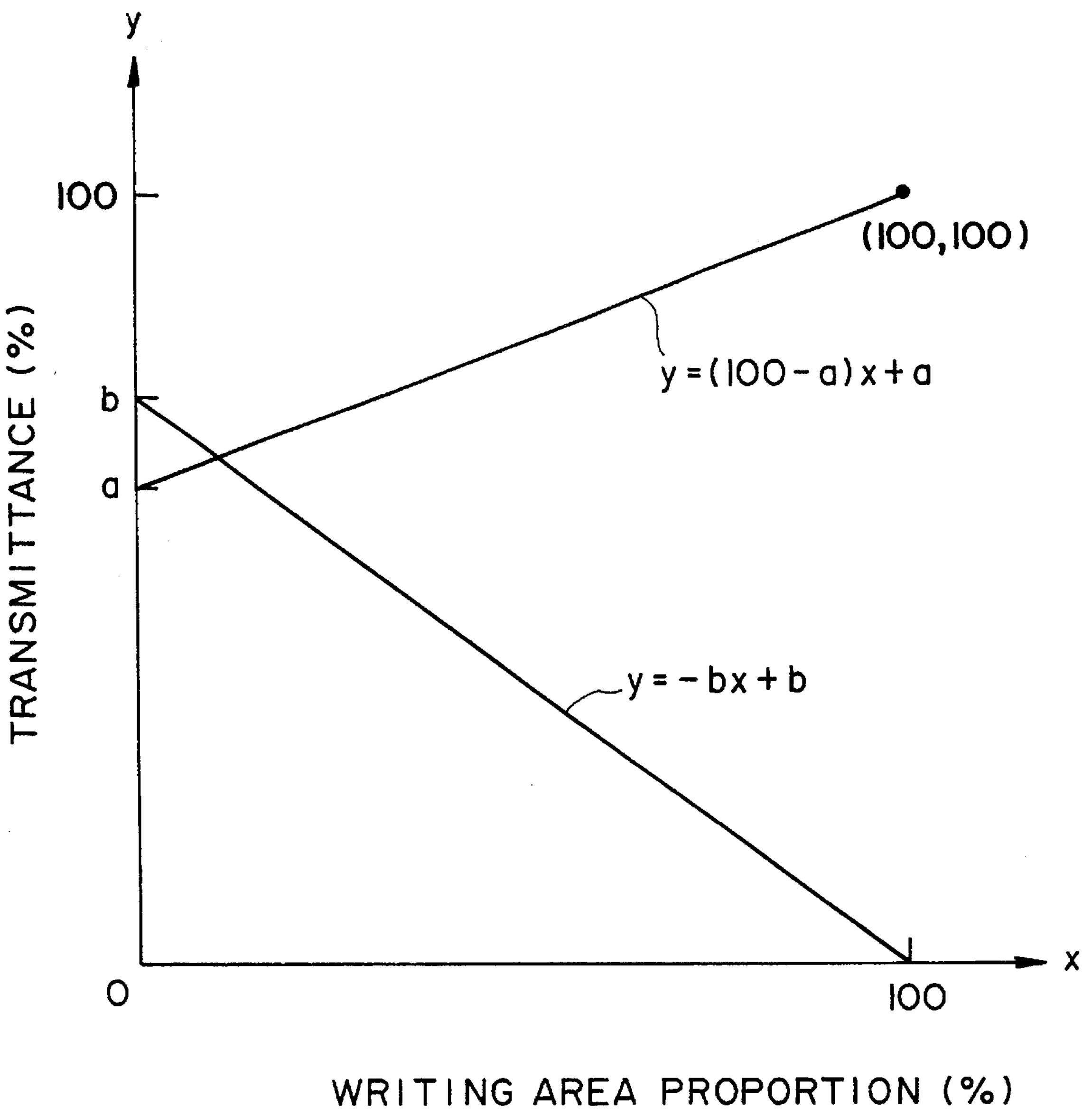

There have been explained two important points of using a drive means represented by a line closer to the y-axis and using equal x-coordinates of points for exchanging the drive means. The use of a line closest to the y-axis means the use of a line having the steepest slope among lines passing an identical y-intercept. This means the use of a line passing the y-intercept and a coordinate (100, 0) or (100, 100). Accordingly, a condition for providing a constant x at points a and b satisfying 0<a<b < 100 and shown in FIG. 35 is determined as follows.

An intersection (x, y) of straight lines y= (100-a)x+a and y=–bx+b is given by:

$$(x, y)=(b-a/\{100+(b-a)\}, 100b/\{100+(b-a)\}.$$

Thus, if (b–a) is constant x is also constant. Further, substitution of $a=a_i$ and $b=a_{i+1}$ is effected, when the transmittances $a_i$ assumed by a whole pixel by resetting the respective sub-pixels to either whole white or whole black can be expressed by an arithmetic series represented by $a_{i+1}=a_i+c$ (constant), x is constant, wherein $a_1=0$, $a_j=100$, i is an integer satisfying $0 \leqq i \leqq j$, and j is a positive integer.

An example of pixel division giving arithmetic series of transmittances is division of a pixel into sub-pixels with an equal area. If a pixel is constituted by n sub-pixels, it is possible to provide n+1 reset states so that $a_1=0$, $a_{n+1}=100$, and $a_i=100(i-1)/n$ wherein i is an integer satisfying $0 \leqq i \leqq n+1$. In this instance, there are n intersections of $x \neq 0$ and the coordinates thereof are represented by $$(x_m, y_m)=(1/(n+1), 100m/(n+1)),$$

wherein m is an integer satisfying $0 \leqq m \leqq n$.

There are n–1 intersections on the y axis, and the y-coordinates thereof form an arithmetic series of $a_i=100(i-1)/n$.

On the other hand, n sub-pixels having respectively different sizes provide $2^n$ reset states. Now, division ratios are set to 1:2:4: . . . : $2^n$ in order to provide an arithmetic series of transmittances. In this case, the two states of white and black of each sub-pixel correspond to 1 and 0 of each digit according to the binary system. If $2^n=N$, $a_1=0$, $a_N=100$, $a_i=100(i-1)/(N-1)$ wherein i is an integer satisfying $0 \leqq i \leqq N$. In this case, there are N–1 intersections with $x \neq 0$, and the coordinates $(x_m, y_m)$ thereof are as follows:

$$(x_m, y_m)=(1/N, 100(m+1)/N)$$
$$=(1/2^n, 100(m+1)/2^n),$$

wherein m is an integer satisfying $0 \leqq m \leqq 2^n-2$.

There are N–2 intersections on the y-axis, and the y-coordinates thereof are given by an arithmetic series of $a_i=100(i-1)/(N-1)$ except for $a_1$ and $a_N$.

Figure 36:
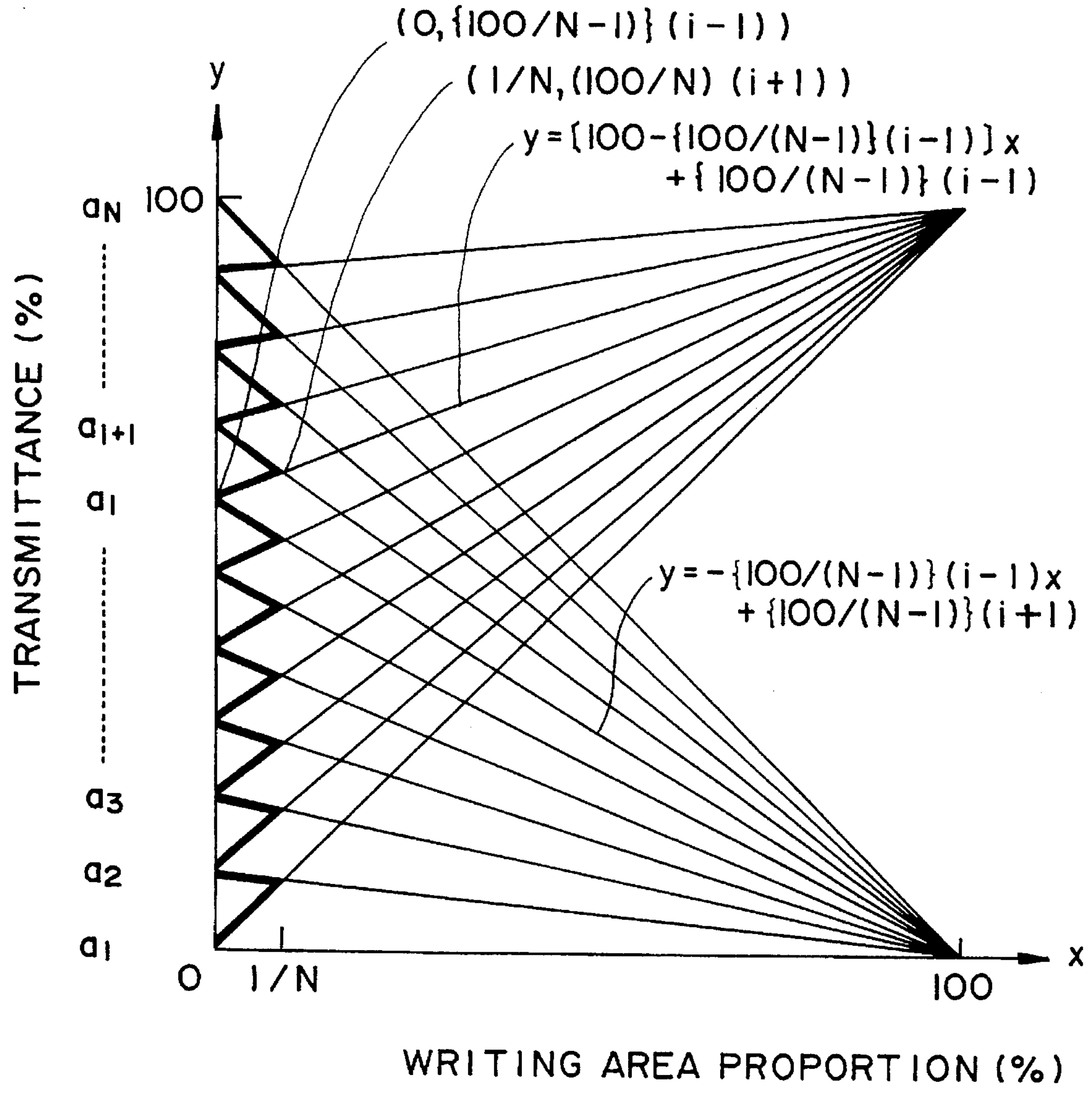

The relationship is illustrated in FIG. 36.

Repeatedly saying, the above-described condition (3) means that a smaller $X_{P+\beta}$ provides a broader range of compensation so that the range allowed for β may also be desirably smaller. This is why a pixel is divided into sub-pixels having different areas in this embodiment. In case where a pixel is divided into n sub-pixels having equal areas, the range of β required for an arbitrary transmittance α% ($0 \leqq \alpha \leqq 100$) is expressed by $0 \leqq \beta \leqq 100/(n+1)$. However, if a pixel is divided into n sub-pixels having different areas, a smaller range of β is required than in the case of the equal division. For example, if n sub-pixels are set to have areal ratios of 1:2:4: . . . : $2^{n-2}$:$2^{n-1}$, the range of β is given by $0 \leqq \beta \leqq 100/2^n$. In the following is described a case wherein a pixel constituted by n sub-pixels $A_1$, $A_2$, $A_3$, . . . $A_n$ having areal ratios of 1:2:4: . . . : $2^{n-1}$ is driven to display an arbitrary transmittance α% ($0 \leqq \alpha \leqq 100$).

1) Case of $\{100/(2^n-i)\}\times i \leqq \alpha \leqq (100/2^n) \leqq (i+1)$, wherein i=0, 1, 2, . . . , $2^n-2$.

The integer i is expressed according to the binary system so that the first digit corresponds to sub-pixel $A_1$, the second digit corresponds to sub-pixel $A_2$, the third digit corresponds to sub-pixel $A_3$, . . . and the n-th digit corresponds to sub-pixel $A_n$, and the respective sub-pixels are driven in the following manner.

(i) A sub-pixel having a corresponding digit value of 0 is supplied with the waveform at FIG. 12(1) with $\beta=\{(2^n-1)\alpha-100i\}/(2^n-1-i)$.

(ii) A sub-pixel having a corresponding digit value of 1 is supplied with the waveform at FIG. 12(2) with $\beta=0$.

As a result, from the above condition (i), a sub-pixel occupying an areal proportion of $(2^n-1-i)/(2^n-1)$ of the total area of the pixel shows a transmittance of $\{(2^n-1)\alpha-100i\}/(2^n-1-i)\%$ and, from the condition (ii), a sub-pixel occupying an areal proportion of $i/(2^n-1)$ of the total area of the pixel shows a transmittance of 100%, so that the overall transmittance of the pixel is $\{(2^n-1-i)/(2^n-1)\}\{(2^{n-1})\alpha-100i\}/(2^n-1-i)+\{i/(2^n-1)\}\times100=\{(2^n-1)\alpha-100i\}/(2^n-1)+100i/(2^n-1)=\alpha\%$.

Under the condition (i), $\beta$ assumes a minimum of 0 when $\alpha=\{100/(2^n-1)\}i$ and assumes a maximum of $100/2^n$ when $\alpha=(100/2^n)(i+1)$.

2) Case of $(100/2^n)i\leqq\alpha\leqq\{100/(2^n-1)\}i$, wherein i= 1, 2, 3, . . . , $2^n-1$.

The integer i is expressed according to the binary system so that the first digit corresponds to sub-pixel $A_1$, the second digit corresponds to sub-pixel $A_2$, the third digit corresponds to sub-pixel $A_3$ . . . and the n-th digit corresponds to sub-pixel $A_n$, and the respective sub-pixels are driven in the following manner.

(i) A sub-pixel having a corresponding digit value of 0 is supplied with the waveform at FIG. 12(1) with $\beta=0$.

(ii) A sub-pixel having a corresponding digit value of 1 is supplied with the waveform at FIG. 12(2) with $\beta=100-\{(2^n-1)/i\}\alpha$.

As a result, from the above condition (i), a sub-pixel occupying an areal proportion of $(2^n-1-i)/(2^n-1)$ of the total area of the pixel shows a transmittance of 0% and, from the condition (ii), a sub-pixel occupying an areal proportion of $i/(2^n-1)$ of the total area of the pixel shows a transmittance of $\{(2^n-1)/i\}\alpha\%$, so that the overall transmittance of the pixel is $\{(2^n-1-i)/(2^n-1)\}\times0+\{i/(2^n-1)\}\times\{(2^n-1)/i\}\alpha=\alpha\%$.

Under the condition (ii), $\beta$ assumes a minimum of 0 when $\alpha=\{100/(2^n-1)\}i$ and assumes a maximum of $100/2^n$ when $\alpha=(100/2^n)i$.

As a specific example, there will be described a case of constituting a pixel with sub-pixels $A_1$ and $A_2$ having a display area ratio of 1:2.

(i) In case of $0\leqq\alpha\leqq25$

Sub-pixel $A_1$ is supplied with the waveform at FIG. 12(1) with $\beta=\alpha$, and Sub-pixel $A_2$ is supplied with the waveform at FIG. 12(1) with $\beta=\alpha$.

(ii) In case of $25\leqq\alpha\leqq100/3$

Sub-pixel $A_1$ is supplied with the waveform at FIG. 12(2) with $\beta=100-3\alpha$, and Sub-pixel $A_2$ is supplied with the waveform at FIG. 12(1) with $\beta=0$.

(iii) In case of $100/3\leqq\alpha\leqq50$

Sub-pixel $A_1$ is supplied with the waveform at FIG. 12(2) with $\beta=0$, and Sub-pixel $A_2$ is supplied with the waveform of FIG. 12(1) with $\beta=(3\alpha-100)/2$.

(iv) In case of $50\leqq\alpha\leqq200/3$

Sub-pixel $A_1$ is supplied with the waveform at FIG. 12(1) with $\beta=0$, and Sub-pixel $A_2$ is supplied with the waveform at FIG. 12(2) with $\beta=$100-(3/2)a.

(v) In case of $200/3\leqq\alpha\leqq75$

Sub-pixel $A_1$ is supplied with the waveform at FIG. 12(1) with $\beta=3\alpha-200$, and Sub-pixel $A_2$ is supplied with the waveform at FIG. 12(2) with $\beta=0$.

(vi) In case of $75\leqq\alpha\leqq100$

Sub-pixel $A_1$ is supplied with the waveform at FIG. 12(2) with $\beta=100-\alpha$, and Sub-pixel $A_2$ is supplied with the waveform of FIG. 12(2) with $\beta=100-\alpha$.

As a result, based on the areal ratio of 1:2 between the sub-pixels $A_1$ and $A_2$, the overall transmittance at the pixel becomes $\alpha\%$ in any case as will be understood from the following analysis.

Case of $0\leqq\alpha\leqq25$ $(1/3)\alpha+(2/3)\alpha=\alpha\%$

Case of $25\leqq\alpha\leqq100/3$ $(1/3)\times3\alpha+(2/3)\times0=\alpha\%$

Figure 37:
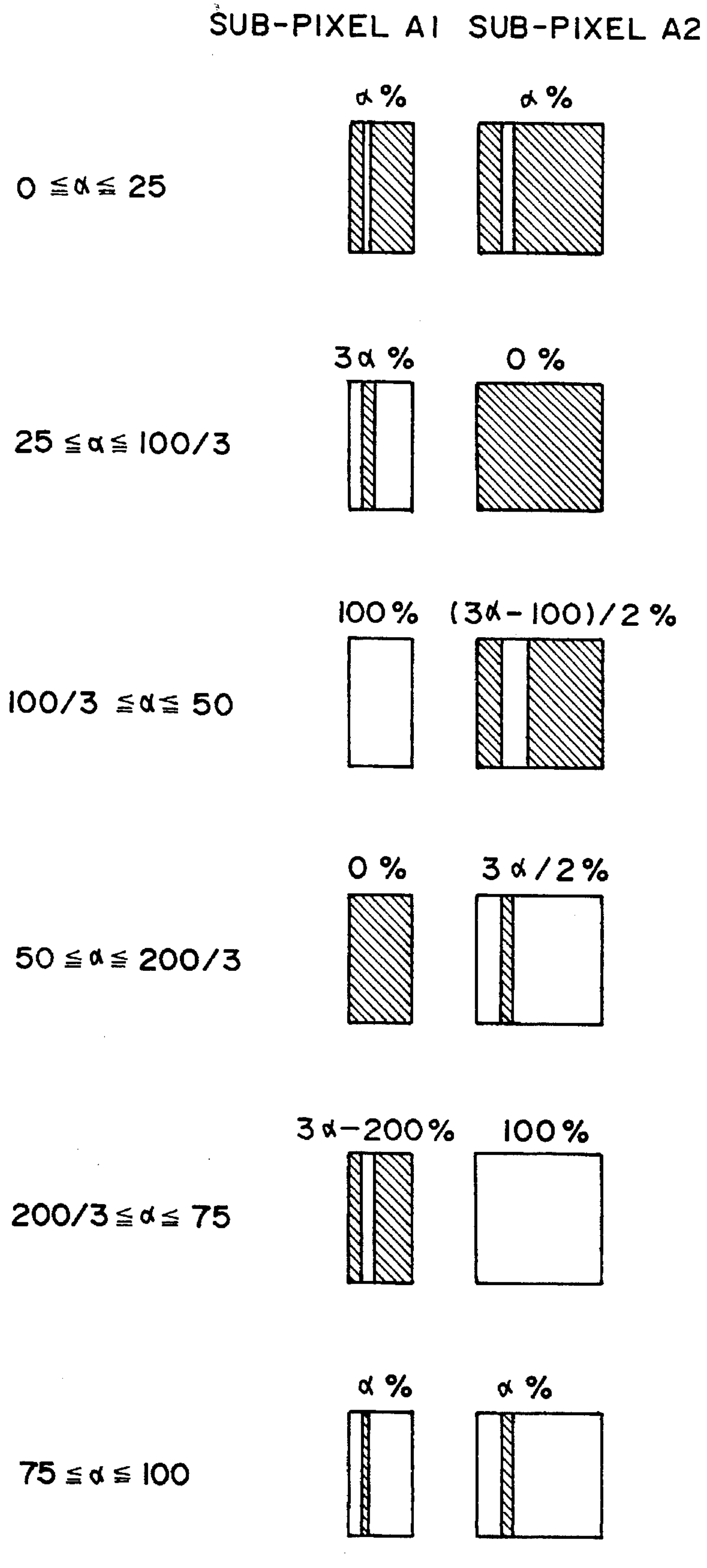
FIG. 37 is a set of plan views showing pixel states according to the fourth embodiment of the invention.

Case of $100/3\leqq\alpha\leqq50$ $(1/3)\times100+(2/3)(3\alpha-100)/2=\alpha\%$ Case of $50\leqq\alpha\leqq200/3$ $(1/3)\times0+(2/3)\times(3/2)\alpha=\alpha\%$ Case of $200/3\leqq\alpha\leqq75$ $(1/3)\times(3\alpha-200)+(2/3)100=\alpha\%$ Case of $75\leqq\alpha\leqq100$ $(1/3)\alpha+(2/3)\alpha=\alpha\%$ The appearances of the respective pixels in the above-described states are shown in FIG. 37. In the above example, $\beta$ assumes a minimum of 0 when $\alpha$ is 0, 100/3, 200/3 or 100, and $\beta$ assumes a maximum of 25 when $\alpha$ is 25, 50 or 75.

As described above, according to this embodiment, a uniform gradation display is possible at each sub-pixel even when sub-pixel is accompanied with a change in threshold characteristic, and the compensation can be applicable to a wider range of threshold change by dividing a pixel into unequal areas of sub-pixels.

Next, a case of applying combined voltage waveforms as shown at FIGS. 12(1) and (2) by using an electrode matrix will be described. As mentioned above, the range allowed for $\beta$ in case of division into unequal n sub-pixels, the range allowed for $\beta$ is expressed by $0\leqq\beta\leqq100/2^n$. Hereinbelow, the value $100/2^n$ is represented by R ($R\equiv100/2^n$).

Pulse P1 for resetting all the pixels on a scanning line has an amplitude $$V_1\geqq X_{100},$$

pulse P2 for writing P+$\beta$% in sub-pixel A or setting sub-pixel A to white satisfies $$X_P\leqq V_2\leqq X_{P+R} \text{ or } V_2\geqq X_{100},$$

pulse P3 for writing P% or P+$\beta$% in sub-pixel A satisfies $$V_3=X_P \text{ or } X_P\leqq V_3\leqq X_{P+R}, \text{ and}$$

pulse P4 for not writing in sub-pixel A or writing P% in sub-pixel A (with the proviso that X shift $\leqq X_Q-X_R$) satisfies $$V_4\leqq X_0-(X_Q-X_R) \text{ or } V_4=X_P.$$

FIG. 26 shows an example of a scanning selection signal (1) and a data signal (2) satisfying the above-mentioned requirements.

In FIG. 26, the respective signals have the following amplitudes:

$$V_{1com}=1.3X_{100}$$

$$V_{2com}=1/2(X_{100}+X_P)$$

$$V_{3com}=1/2(X_{P+R}+X_P)$$

$$V_{4com} = \tfrac{1}{2}[X_P + \{X_0 - (X_Q - X_{P+R})\}] - \tfrac{1}{2}(X_{100} - X_P) \leqq V_{2seg} \leqq \tfrac{1}{2}(X_{100} - X_P) - \tfrac{1}{2}(X_{P+25} - X_P \leqq V_{3seg} \leqq \tfrac{1}{2}(X_{P+R} - X_P) - \tfrac{1}{2}[X_P - \{X_0 - (X_Q - X_{P+50})\}] \leqq V_{4seg} \leqq \tfrac{1}{2}[X_P - \{X_0 - (X_Q - X_{P+50})\}].$$

Further, in order to retain the transmittance at pixel β in a scanning non-selection period, the following conditions must be satisfied:

$$X_0 - X_{Shift} \geqq V_{2seg}$$

$$X_0 - X_{Shift} \geqq V_{3seg}$$

$$X_0 - X_{Shift} \geqq V_{4seg}.$$

Figure 38A:
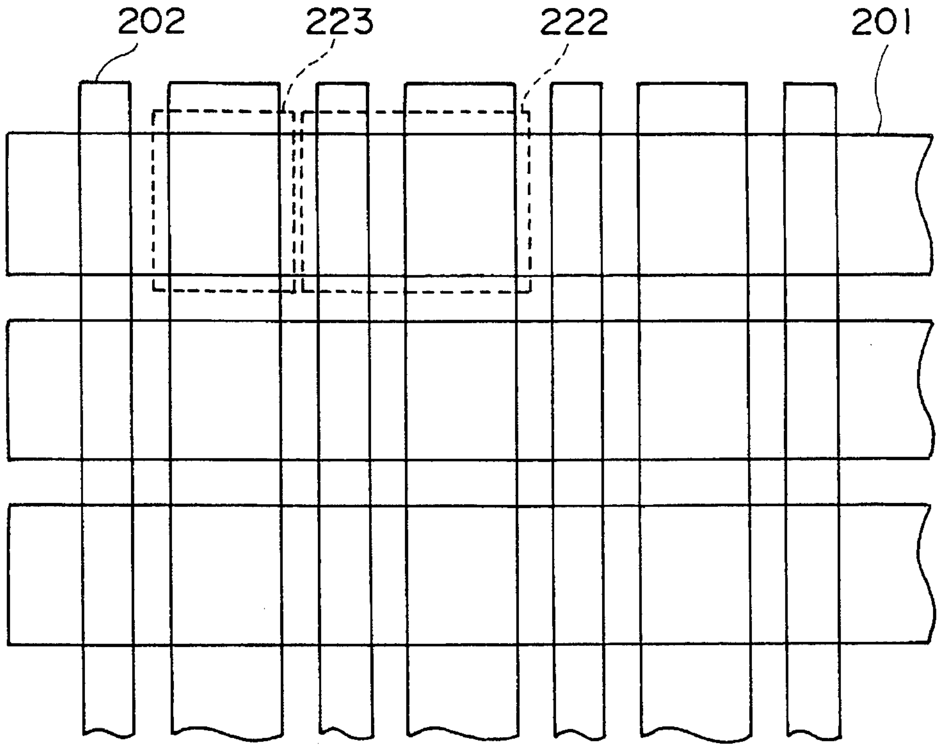
FIGS. 38A and 38B are respective schematic plan views showing a matrix electrode pattern used in the fourth embodiment of the invention.
Figure 38B:
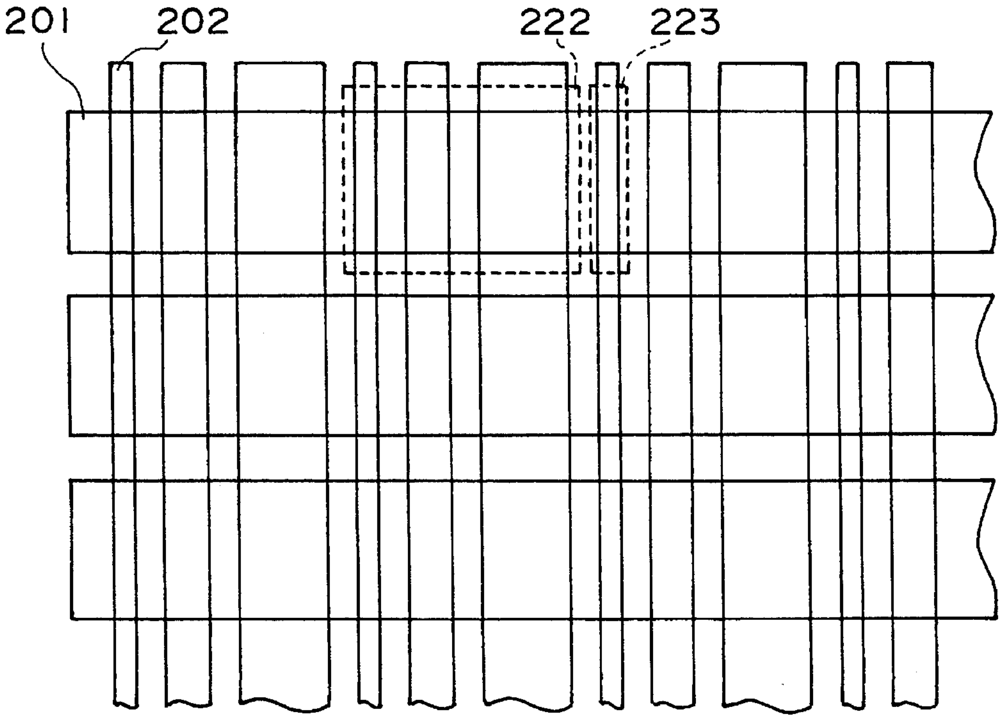

FIGS. 38A and 38B are respectively an enlarged partial view of a liquid crystal display unit (panel) 101 in FIG. 10. FIG. 38A shows a panel in which one pixel 222 is constituted by two sub-pixels 223, and FIG. 38B shows a panel in which one pixel 222 is constituted by three sub-pixels 223. Each sub-pixels 223 is constituted at an intersection of a scanning electrode 201 and a data electrode 202. The display unit has a sectional structure similar to the one shown in FIG. 28.

The display unit may be driven by a set of time-serial driving waveforms as shown in FIG. 29 already described based on signal waveforms shown in FIG. 14. Referring to FIG. 29, at $S_1$–$S_3$ are scanning signal waveforms applied to scanning electrodes $S_1$–$S_3$ and at $I_1$ is shown a data signal waveform applied to a data electrode $I_1$ in synchronism with the scanning signals $S_1$–$S_3$. As is apparent from the figure, a period 1H for display at one sub-pixel is 6 times one writing pulse width (=Δt), i.e., 6Δt.

FIG. 30 is a set of time-serial waveforms in case where a sub-pixel is not written continuously.

In the case of division into two sub-pixels with reference to FIGS. 26, 29 and 30, it is possible to effect a stable gradation display even if accompanied with a temperature difference of about 7° C., by using the following set of conditions:

$$\Delta T = 50\ \mu s,$$

$$V_{1com} = 24.0\ V < V_{2com} = 15.2\ V,\ V_{3com} = 12.7\ V,\ V_{4com} = 9.4\ V,$$

$$|V_{2seg}| \leqq 3.5\ V,\ |V_{3seg}| \leqq 1.0\ V,\ |V_{4seg}| \leqq 2.8\ V.$$

Further, in the case of division into three sub-pixels with reference to FIGS. 26, 29 and 30, it is possible to effect a stable gradation display even if accompanied with a temperature difference of about 10° C., by using the following set of conditions:

$$\Delta T = 50\ \mu s,$$

$$V_{1com} = 24.0\ V,\ V_{2com} = 15.2\ V,\ V_{3com} = 12.4\ V,\ V_{4com} = 9.1\ V,$$

Experimental Example

A liquid crystal device was prepared in the following manner.

A glass plate was coated by sputtering with an about 150 nm-thick ITO film (so as to provide a sheet resistivity of about 20 Ω-square) which was then patterned into stripe electrodes. The electrodes were then coated with a 1%-aqueous solution of PVA (polyvinyl alcohol) ("R-2105", mfd. by Kurary K. K.) by a spinner coater rotating at 1000 rpm, followed by about 30 min. of pre-baking at 100° C. and 30 min. of post-baking at 180° C. to form a PVA film, which was then rubbed in one direction with a rubbing roller cloth planted with nylon 6 yarn of 1.5 mm in length rotating at 1000 rpm.

Figure 39:
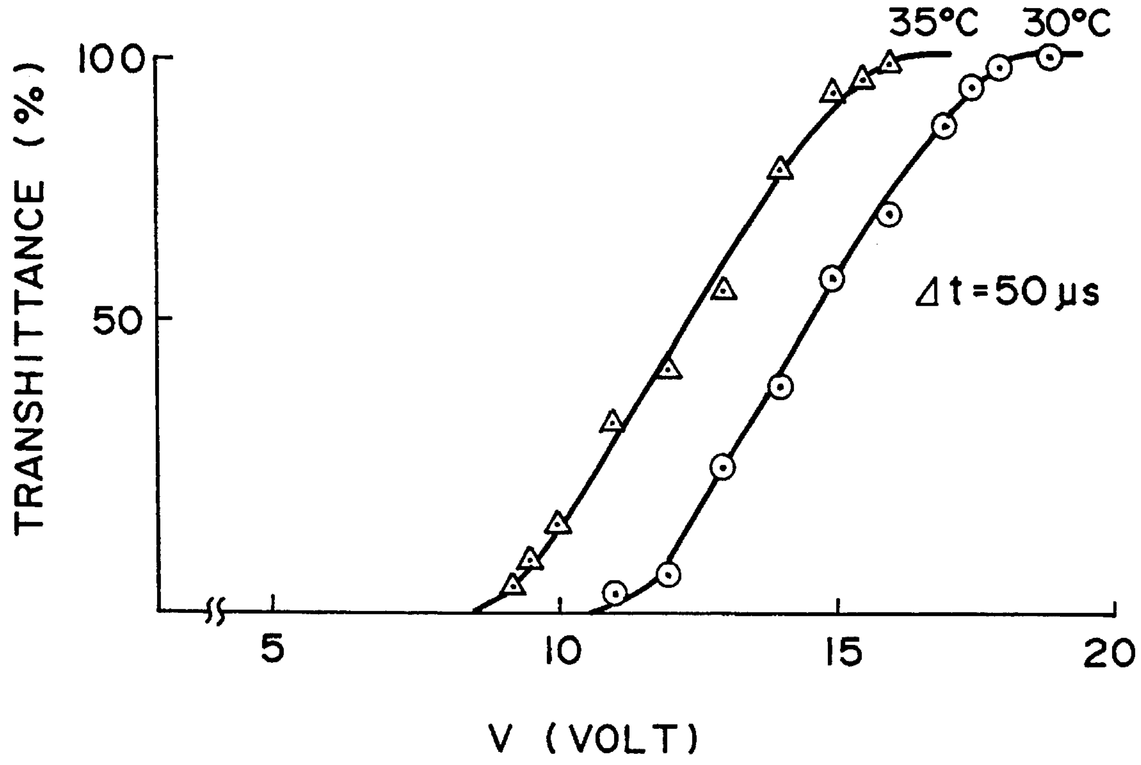
FIG. 39 is a graph showing a V-T characteristic of a liquid crystal used in the invention.

A pair of the thus-treated electrode plates were applied to each other with a spacing of about 1.1 μm therebetween so that their rubbing directions were parallel and identical to each other to form a blank cell (panel), which was then filled with a multi-component FLC composition comprising a phenyl benzoate liquid crystal as a principal component, showing the following phase transition series and properties in SmC* phase and showing a V-T characteristic as shown in FIG. 39.

1) Phase transition series $$\text{Cryst.} \xrightarrow[-25^\circ\,C.]{} S_3 \xrightarrow[-6.4^\circ\,C.]{} \text{SmC*} \xrightarrow[48.1^\circ\,C.]{} \text{SmA} \xrightarrow[61.4^\circ\,C.]{} \text{Ch} \xrightarrow[65.6^\circ\,C.]{} \text{Iso}$$

2) Properties in SmC* phase

| Temperature | 10° C. | 20° C. | 30° C. | 40° C. |
|---|---|---|---|---|
| Ps (nc/cm²) | 42 | 32 | 24 | 15 |
| Ⓗ cone angle (deg.) | 24.9 | 24.1 | 22.2 | 19.1 |

The thus-prepared cell was supplied with an AC electric field of ±20 volts and 10 Hz as a treatment for changing a layer structure. When gradually cooled from isotropic phase, the cell showed a chevron alignment layer structure but, under application of the electric field, generated a splashed pattern texture and resulted in a uniform texture in pixels with increased splashed pattern texture on continual application for about 1 min. of the AC electric field. This process was considered as a process wherein the chevron structure was re-aligned into the bookshelf structure. However, a partially distributed layer structure tended to remain and provided a substantial threshold distribution, thus making easier the gradation display. The above type of treatment had been proposed as effective for an FLCD, e.g., in Japanese Laid-Open Patent Application (JP-A) 62-133426.

The thus-prepared liquid crystal cell after the AC electric field application showed an apparent tilt angle of 19.5 degrees (at 30° C.).

The thus-prepared liquid crystal cell was incorporated in an apparatus as shown in FIG. 10 and subjected to gradation display according to the above-mentioned first to fourth embodiments, whereby analog gradational display could be realized. Further, the gradational display was very stable against a change in threshold characteristic due to a temperature change or cell thickness change.

The present invention has been described principally with reference to a display device but can suitably be applied to a light valve for a liquid crystal printer also requiring a medium level of transmittance.

What is claimed is:

1. A driving method for a liquid crystal device of the type including pixels comprising a liquid crystal having a first and a second stable state, comprising the steps of:

(A) providing a pixel having a transmittance (Ts) smaller than a prescribed transmittance (Tm), and sequentially applying to the pixel:

a first signal for resetting the pixel to the first stable state, a second signal for inverting a portion of the reset pixel to the second stable state, a third signal for partially inverting the invented portion of the pixel to the first stable state, and a fourth signal for substantially not causing. inversion, and (B) providing a pixel showing a transmittance ($T_1$) larger than the prescribed transmittance (Tm), and sequentially applying to the pixel:

a first signal for resetting the pixel to the first stable state, a second signal for a resetting the pixel to the second stable state, a third signal for inverting a portion of the pixel to the first stable state, and a fourth signal for partially inverting the inverted portion of the pixel to the second stable state.

2. A method according to claim 1, wherein said prescribed transmittance is set to 50%.

3. A method according to claim 1, wherein the first to fourth signals are applied continuously.

4. A method according to claim 1, wherein the first to fourth signals are applied non-continuously.

5. A method according to claim 4, wherein the signals are applied with a time interval of at least 100 μs.

6. A method according to claim 1, wherein said pixels each have a distribution of inversion thresholds.

7. A method according to claim 1, wherein at least two of said pixels of equal areas are used as sub-pixels constituting one larger pixel.

8. A method according to claim 1, wherein at least two of said pixels of mutually different areas are used as sub-pixels constituting one larger pixel.

9. A method according to claim 1, wherein said liquid crystal comprises a ferroelectric liquid crystal.

10. A driving method for a liquid crystal device of the type including pixels comprising a liquid crystal having a first and a second stable state, comprising the steps of:

(A) providing a pixel having a transmittance (Ts) smaller than a prescribed transmittance (Tm), and sequentially applying to the pixel:

a first signal for resetting the pixel to the first stable state, a second signal for inverting a p+β% of the reset pixel to the second stable state, a third signal for inverting a p% of the inverted pixel to the first stable state, and a fourth signal for substantially not causing inversion, and (B) providing a pixel having a transmittance ($T_1$), and sequentially applying to the pixel:

a first signal for resetting the pixel to the first stable state, a second signal for resetting the pixel to the second stable state, a third signal for inverting a p+α% of the pixel to the first stable state, and a fourth signal for inverting a p% of the pixel to the second stable state:

wherein p% represents a maximum inversion (%) below which a linear applied voltage-transmittance characteristic of a pixel is not attained, β% represents an inversion of a pixel corresponding to the transmittance (Ts), and α% represents an inversion of a pixel corresponding to the transmittance ($T_1$).

11. A driving method for a liquid crystal device of the type including pixels comprising a liquid crystal having a first and a second stable state, comprising the steps of:

(A) providing a pixel showing a transmittance (Ts) smaller than a prescribed transmittance (Tm), and sequentially applying to the pixel:

a first signal of a first polarity for resetting to the first stable state, a second signal of a second polarity for inverting to the second stable state, a third signal of the first polarity for inverting to the first stable state, and a fourth signal of the second polarity not causing inversion, and (B) providing a pixel showing a transmittance (T1) larger than the prescribed transmittance (Tm), and sequentially applying to the pixel:

a first signal of the first polarity for resetting to the first stable state, a second signal of the second polarity for resetting to the first stable state, a third signal of the first polarity for inverting to the first stable state, and a fourth signal of the second polarity for inverting to the second stable state.

* * * * *

UNITED STATES PATENT AND TRADEMARK OFFICE

CERTIFICATE OF CORRECTION

PATENT NO. : 5,469,281

DATED : November 21, 1995

INVENTOR(S) : KAZUNORI KATAKURA ET AL.

It is certified that error appears in the above-identified patent and that said Letters Patent is hereby corrected as shown below:

COLUMN 1

Line 34, "plats" should read ---plates--.

COLUMN 3

Line 19, "for" should be deleted.
Line 24, "for" should be deleted.

COLUMN 4

Line 24, "FIG. 13, views" should read --FIGS. 13--.
Line 27, "FIG. 14 is" should read --FIGS. 14(1) and (2) are--.
Line 29, "each are respective show an examples" should read --are each examples--.
Line 35, "FIG. 18 is a" should read --FIGS. 18(1) and (2) are--.
Line 37, "FIG. 19, views" should read --FIGS. 19--. and "FIG. 20, views" should read --20--.
Line 43, "each are respective show an" should read --are each--.
Line 50, "FIG. 26 is a" should read --FIGS. 26(1) and (2) are--.
Line 60, "each are respective" should read --are each--.
Line 61, "matrix" should read -a matrix--.

UNITED STATES PATENT AND TRADEMARK OFFICE

CERTIFICATE OF CORRECTION

PATENT NO. : 5,469,281

DATED : November 21, 1995

INVENTOR(S) : KAZUNORI KATAKURA ET AL.

It is certified that error appears in the above-identified patent and that said Letters Patent is hereby corrected as shown below:

COLUMN 5

Line 43, "curve h" should read --curve b--.

COLUMN 6

Line 4, "while" should read --whole--.
Line 9, "O-P%" should read --0-P%--.

COLUMN 8

Line 31, "$\alpha$%" should read --$\beta$%--.

COLUMN 9

Line 13, "$X_O$-$X_{Shif}$" should read --$X_O$-$X_{shift}$"--.

COLUMN 10

Line 43, "$\mu$ps." should read --$\mu$s.--.

COLUMN 11

Line 4, "pixel S." should read --pixel A.--.
Line 5, "$_{x'Q}$" should read --$X^1_Q$--.
Line 36, "(G-i)" should read --(G-1)--.
Line 37, "(H-i)" should read --(H-1)--.

UNITED STATES PATENT AND TRADEMARK OFFICE

CERTIFICATE OF CORRECTION

PATENT NO. : 5,469,281

DATED : November 21, 1995

INVENTOR(S) : KAZUNORI KATAKURA ET AL.

It is certified that error appears in the above-identified patent and that said Letters Patent is hereby corrected as shown below:

COLUMN 12

Line 2, "O-P%" should read --0-P%--.
Line 33, "O-P%" should read --0-P%--.
Line 42, "P4P6." should read --P4-P6.-- and "Shapes" should read --shapes--.
Line 43, "O-P%" should read --0-P%--.

COLUMN 13

Line 56, "O-P%" should read --0-P%--.
Line 57, "O-P%" should read --0-P%--.
Line 66, "O-P%" should read --0-P%--.

COLUMN 14

Line 1, "O-P%" should read --0-P%--.
Line 30, "$(X_1-X_{p+50})$," should read --$(X_Q-X_{p+50})$,--.
Line 54, "satisfying." should read --satisfying:--.

COLUMN 15

Line 24, "$\Delta T=50\mu$," should read --$\Delta T=50\mu s$,--.

COLUMN 16

Line 7, "voltage(V)5" should read --voltage(V)--.

UNITED STATES PATENT AND TRADEMARK OFFICE

CERTIFICATE OF CORRECTION

PATENT NO. : 5,469,281

DATED : November 21, 1995

INVENTOR(S) : KAZUNORI KATAKURA ET AL.

It is certified that error appears in the above-identified patent and that said Letters Patent is hereby corrected as shown below:

COLUMN 17

Line 63, "$\beta$=100-3+/2," should read --$\beta$=100-3$\alpha$/2,--.

COLUMN 19

Line 27, "$X_P \leq V_2 \leq X_{P+}100/3$" should read --$X_P \leq V_2 \leq X_{P+100/3}$--.
Line 36, "$V_4 \leq X_0-(X_1-X_{P+}100/3)$" should read --$V_4 \leq X_0-(X_Q-X_{P+100/3})$--.
Line 48, "P+$\alpha$%" should read --P+$\beta$%--.
Line 56, "$V_4 \leq X_0-(X_1-X_{P+25})$" should read --$V_4 \leq X_0-(X_Q-X_{P+25})$--.

COLUMN 20

Line 51, "(=$\beta$t)," should read --($\Delta$+),

COLUMN 21

Line 49, "and having" should read --and B having--.

COLUMN 22

Line 48, "With" should read --with--.

COLUMN 23

Line 17, "a and h" should read --a and b--.

UNITED STATES PATENT AND TRADEMARK OFFICE

CERTIFICATE OF CORRECTION

PATENT NO. : 5,469,281

DATED : November 21, 1995

INVENTOR(S) : KAZUNORI KATAKURA ET AL.

It is certified that error appears in the above-identified patent and that said Letters Patent is hereby corrected as shown below:

COLUMN 27

Line 21, "sub-pixels 223" should read --sub-pixel 223--.
Line 55, insert --$|V_{2seg}| \leq 3.5V$, $|V_{3seg}| \leq 0.4V$, $|V_{4seg}| \leq 3.0V$.--.

COLUMN 29

Line 4, "invented" should read --inverted--.

COLUMN 30

Line 35, "(T1)" should read --($T_1$)--.

Signed and Sealed this

Twenty-third Day of April, 1996

Attest:

BRUCE LEHMAN

Attesting Officer

Commissioner of Patents and Trademarks